US009391377B2

(12) United States Patent
McGregor et al.

(10) Patent No.: US 9,391,377 B2
(45) Date of Patent: Jul. 12, 2016

(54) CONNECTOR HAVING A STABILIZER IN CONTACT WITH A CONTACT HOLDER OR AN ENGAGEMENT MEMBER OF A CABLE TRAY

(71) Applicant: Lowe's Companies, Inc., Mooresville, NC (US)

(72) Inventors: Jean Tuck McGregor, Waxhaw, NC (US); James Michael Broughman, Huntersville, NC (US); Allen R. Nelson, Charlotte, NC (US); Darren Michael Mark, Cornelius, NC (US); Laura Winfield Alexander, Sunbury, OH (US); Donald Collins Meves, Gahanna, OH (US)

(73) Assignee: LOWE'S COMPANIES, INC., Mooresville, NC (US)

( * ) Notice: Subject to any disclaimer, the term of this patent is extended or adjusted under 35 U.S.C. 154(b) by 0 days.

(21) Appl. No.: 14/502,762

(22) Filed: Sep. 30, 2014

(65) Prior Publication Data

US 2015/0099392 A1 Apr. 9, 2015

Related U.S. Application Data

(62) Division of application No. 14/047,767, filed on Oct. 7, 2013, now Pat. No. 8,876,546, which is a division of application No. 13/302,794, filed on Nov. 22, 2011, now Pat. No. 8,616,905.

(60) Provisional application No. 61/525,115, filed on Aug. 18, 2011.

(51) Int. Cl.

*H01R 4/24* (2006.01)
*H01R 9/03* (2006.01)

(Continued)

(52) U.S. Cl.

CPC ................ *H01R 4/2408* (2013.01); *H01R 4/24* (2013.01); *H01R 9/031* (2013.01); *H01R 12/616* (2013.01); *H01R 13/5833* (2013.01); *Y10T 24/39* (2015.01)

(58) Field of Classification Search

CPC ............ H01R 4/24; H01R 4/26; H01R 11/20; H01R 13/5833; H01R 9/03; H01R 9/031; H01R 12/616; H01R 4/2408

USPC .......................................... 439/207–211, 419

See application file for complete search history.

(56) References Cited

U.S. PATENT DOCUMENTS 5,107,408 A 4/1992 Vernondier
5,340,326 A 8/1994 LeMaster (Continued)

FOREIGN PATENT DOCUMENTS

CA 2311979 12/2001

OTHER PUBLICATIONS

Chinese Patent Office; Office Action issued on Oct. 28, 2015, to Chinese Patent Application No. 2012800512189.

(Continued)

*Primary Examiner* — Chandrika Prasad

(74) *Attorney, Agent, or Firm* — Moore & Van Allen PLLC; W. Kevin Ransom

(57) ABSTRACT

A connector includes a cable tray configured to receive and retain a cable in a stable position and couple with a top cap configured to create an electrical connection with the cable as the top cap is manipulated in a predetermined manner while coupled with the cable tray. An upper surface of the cable tray is configured to receive the cable. The cable tray also includes a finger extending beyond the first end for some distance longitudinally. The finger includes a protrusion that protrudes to some extent in a transverse direction so that a cable-accommodating gap is defined between the protrusion and the first end. The protrusion is configured to bear against the cable and retain the cable in the stable position when the cable is inserted between the protrusion and the first end (before, during and/or after an electrical connection is established).

19 Claims, 46 Drawing Sheets

(51) Int. Cl.
*H01R 12/61* (2011.01)
*H01R 13/58* (2006.01)

(56) References Cited

U.S. PATENT DOCUMENTS

| | | | | |
|---|---|---|---|---|
| 5,439,389 | A | 8/1995 | Chang et al. | |
| 5,474,467 | A | 12/1995 | Chen | |
| 5,492,483 | A * | 2/1996 | Cheng | H01R 33/22 439/339 |
| 5,526,250 | A | 6/1996 | Ting et al. | |
| 5,634,812 | A * | 6/1997 | Chen | F21V 21/002 439/419 |
| 5,670,847 | A * | 9/1997 | Lin | H01R 13/4534 315/185 S |
| 6,022,231 | A | 2/2000 | Williams et al. | |
| 6,062,711 | A | 5/2000 | Huang | |
| 6,074,073 | A | 6/2000 | Huang | |
| 6,267,342 | B1 | 7/2001 | Huang | |
| 6,280,249 | B1 | 8/2001 | Pan | |
| 6,830,468 | B2 | 12/2004 | Schaerer et al. | |
| 7,470,859 | B1 | 12/2008 | Gretz | |
| 7,575,362 | B1 | 8/2009 | Hsu | |
| 7,635,279 | B1 | 12/2009 | Wong et al. | |
| 7,740,503 | B1 | 6/2010 | Tsai | |
| 8,616,905 | B2 * | 12/2013 | McGregor | H01R 4/2408 439/207 |
| 8,876,546 | B2 * | 11/2014 | McGregor | H01R 4/2408 439/419 |
| 2011/0095020 | A1 * | 4/2011 | Yang | H02G 3/088 220/3.2 |

OTHER PUBLICATIONS

Photographs and Reviews of "Connector A", available at least as of Dec. 30, 2010, as evidenced by the date of the earliest review.

Photographs of "Connector B1", available at least as of Aug. 18, 2011, filing date of provisional application.

Photographs and Reviews of "Connector B2", available at least as of Jul. 31, 2011, as evidenced by the date of the earliest review.

Photographs and Reviews of "Connector C", available at least as of Aug. 18, 2011, filing date of provisional application.

Photographs of "Connector D", available at least as of Aug. 18, 2011, filing date of provisional application.

International Search Report for PCT/US2012/051415, dated Nov. 12, 2012.

International Search Report for PCT/US2012/051415, dated Feb. 18, 2014.

* cited by examiner

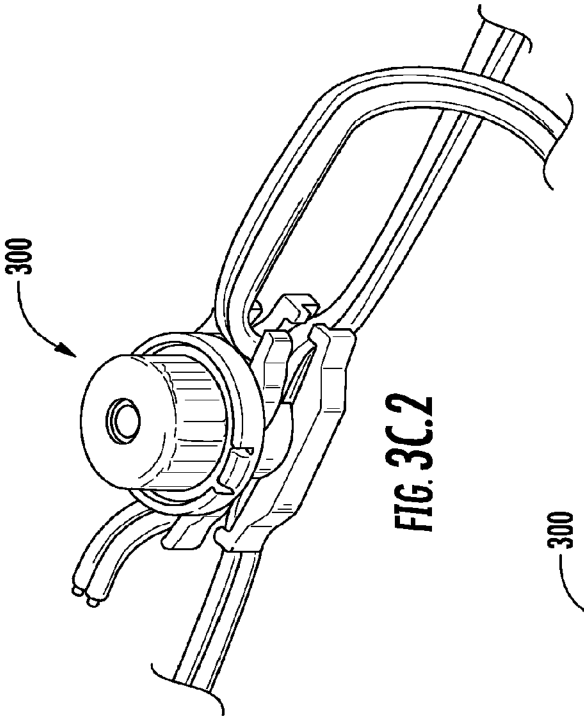
FIG. 3C.2
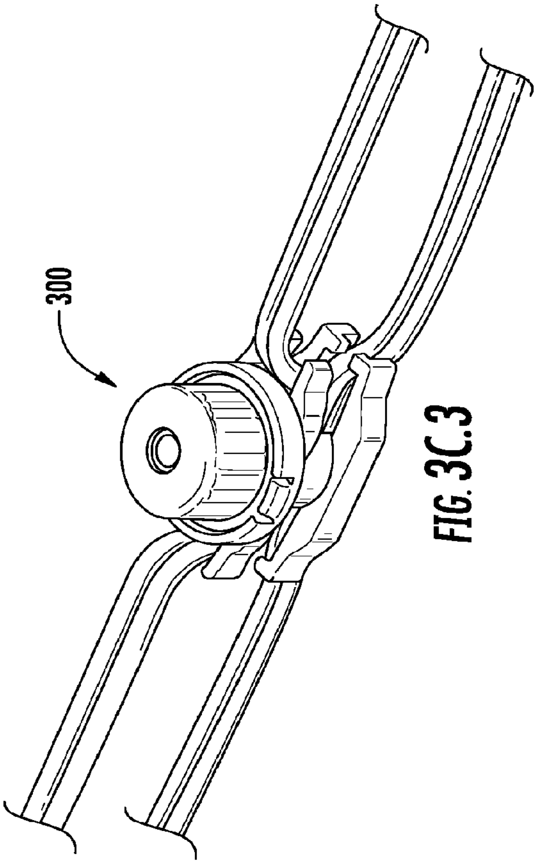
FIG. 3C.3
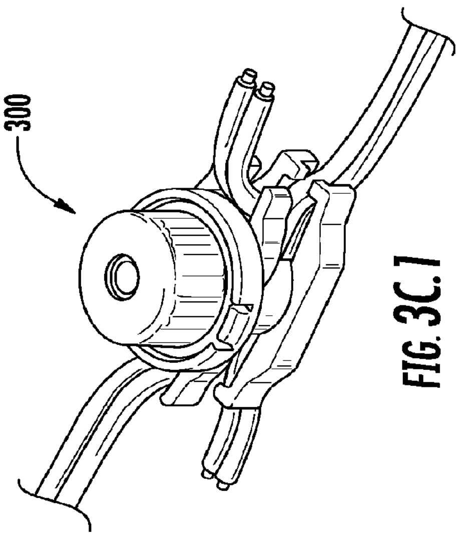
FIG. 3C.1

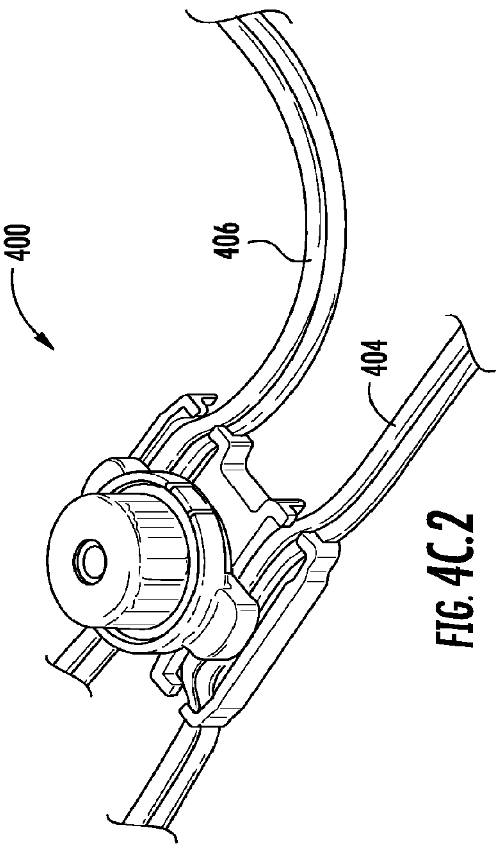
FIG. 4C.2
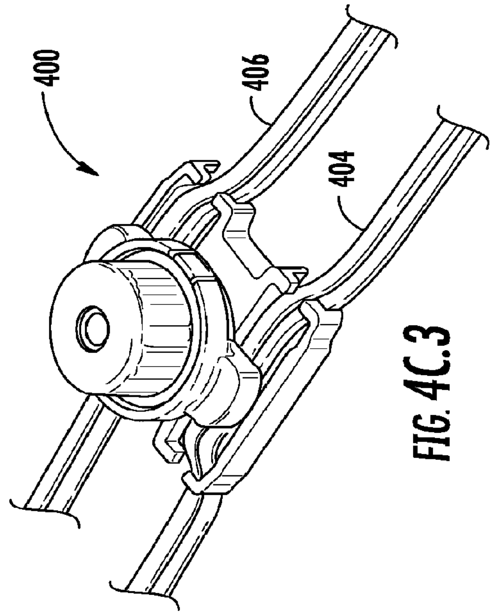
FIG. 4C.3
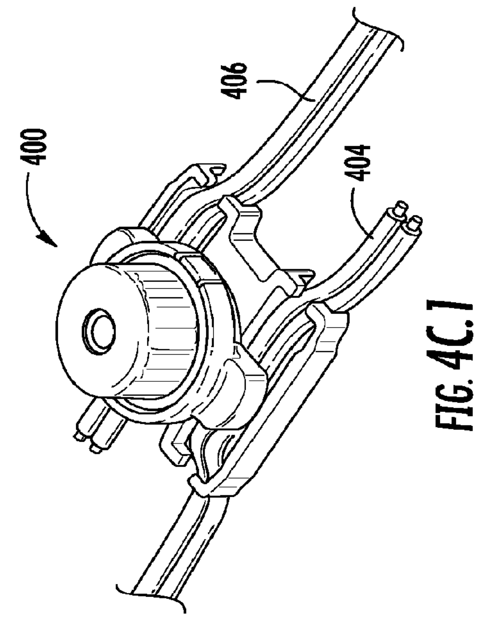
FIG. 4C.1

CONNECTOR HAVING A STABILIZER IN CONTACT WITH A CONTACT HOLDER OR AN ENGAGEMENT MEMBER OF A CABLE TRAY

CROSS-REFERENCE TO RELATED APPLICATIONS

This U.S. Non-Provisional patent application is a divisional of and claims priority to U.S. Non-Provisional patent application Ser. No. 14/047,767, filed Oct. 7, 2013, entitled CONNECTORS FOR LANDSCAPE LIGHTING SYSTEMS, which, in turn, is a divisional of and claims priority to U.S. Non-Provisional patent application Ser. No. 13/302,794, filed Nov. 22, 2011, entitled CONNECTOR HAVING A TOP CAP TO CREATE AN ELECTRICAL CONNECTION BETWEEN AN ELECTRICAL CABLE AND AN ELECTRICAL CONTACT, now U.S. Pat. No. 8,616,905, which, in turn, claims priority to U.S. Provisional Patent Application No. 61/525,115, filed Aug. 18, 2011, entitled "CONNECTOR FOR LANDSCAPE LIGHTING", assigned to the assignee hereof and the content of each of the above is hereby expressly incorporated by reference herein.

FIELD

In general, embodiments of the invention relate to systems for landscape lighting. More specifically, the invention relates to connectors for cable-to-fixture and/or cable-to-cable electrical connection and cable end caps.

BACKGROUND

Landscape lighting systems, and in particular low-voltage landscape lighting systems generally include one or more connectors configured to establish and maintain an electrical connection between a source power cable and another cable. For example, in some applications, connectors are configured to receive a source power cable and form a connection between the source power cable and a low-voltage branch cable, such as a branch cable running to a fixture such as a light. In another example, connectors are configured to receive a source power cable proximate its end and provide a connection between the source power cable and a second power cable such that the second power cable can effectively extend the reach of the power supply. Furthermore, in some landscape lighting configuration it is necessary to run multiple power lines in parallel in order to ensure sufficient power supply for several fixtures or other devices.

Various connector solutions are modular and require different components for a particular size or gauge of cables. For example, some connectors require different tray sizes for receiving different gauge cables or different size and/or shape fasteners to be used in securing different cables to the connector. Furthermore, various connectors provide insufficient means for retaining the cable in a stable position such that an electrical connection may be established with the conductive wires inside the cable. In many connectors, the cable must be held in a stable position in relation to the connector before and during establishment of the electrical connection or else the electrical connection may not be established or may be established incorrectly. For example, if the cable becomes twisted with respect to the connector such that one or more contacts establish an electrical connection with an undesired conductive wire of the cable, improper function of the system will generally follow, either immediately or later in time.

Additionally, many connectors, because the connectors provide insufficient stability for the cable before, during and/or after installation or establishment of the electrical connection, require excessive manual manipulation and/or require significant amounts of time for proper and effective installation. Other problems, such as corrosion among connector components and general connector failure, such as, insufficient or non-existent electrical connection hinder proper landscape lighting system functionality. Likewise, exposed or improperly covered cable ends require proper attention, thereby eliminating concern regarding undesired power leakage, short circuits and the like.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

According to embodiments of the invention a connector includes a cable tray configured to receive and retain a cable in a stable position and couple with a top cap configured to create an electrical connection between the cable and a contact as the top cap is manipulated in a predetermined manner while coupled with the cable tray. The cable tray includes an upper surface that extends longitudinally from a first end to a second end and a finger extending beyond the first end for some distance longitudinally. The finger has a protrusion that protrudes to some extent in a transverse direction so that a cable-accommodating gap is defined between the protrusion and the first end. The protrusion is configured to bear against the cable and retain the cable in the stable position when the cable is inserted between the protrusion and the first end.

In some embodiments, the connector also includes a second finger extending beyond the first end for some distance longitudinally. The second finger has a second protrusion that protrudes to some extent in a transverse direction so that the cable-accommodating gap is defined among the first protrusion, the second protrusion and the first end. The second protrusion is configured to bear against the cable and retain the cable in the stable position when the cable is inserted between the second protrusion and the first end. In some embodiments, the connector also includes a second finger extending beyond the second end for some distance longitudinally. The second finger has a second protrusion that protrudes to some extent in a transverse direction so that a second cable-accommodating gap is defined between the second protrusion and the second end. The second protrusion is configured to bear against the cable and retain the cable in the stable position when the cable is inserted between the second protrusion and the second end.

In some embodiments, the connector includes a third finger extending beyond the second end for some distance longitudinally. The third finger has a third protrusion that protrudes to some extent in a transverse direction so that the cable-accommodating gap is defined among the second protrusion, the third protrusion and the second end. The third protrusion is configured to bear against the cable and retain the cable in the stable position when the cable is inserted between the third protrusion and the second end.

In some embodiments, the connector is structured to accommodate cables having a width dimension that exceeds a thickness of the cable, and the protrusion is configured to facilitate insertion of the cable into the cable-accommodating gap while the cable is oriented in a first orientation and is configured to facilitate twisting of the cable into a second orientation which effects retention of the cable in the cable-accommodating gap.

In some embodiments, the connector also includes a rib extending from the upper surface of the cable tray and oriented along or generally parallel with the longitudinal axis of the cable tray. The rib is configured to engage a groove in the cable and assist in maintaining alignment of the cable in the stable position. In some embodiments, the cable tray also includes a first wall extending from a first side of the upper surface of the cable tray and a second wall extending from a second side of the upper surface of the cable tray. The first wall and the second wall are angled such that a distance between the first wall and the second wall proximate the upper surface is smaller than a distance between the first wall and the second wall distal from the upper surface. The first wall and the second wall in combination are configured to assist in maintaining alignment of the cable in the stable position as the top cap is manipulated in the predetermined manner while coupled with the cable tray.

In some embodiments, the cable tray is configured to retain the cable in the stable position regardless of which cable width is selected within a predetermined range of cable widths, and without requiring a different size of cable tray for each cable width.

In some embodiments, the cable tray also includes a first engagement member extending from the cable tray and a second engagement member extending from the cable tray. The first engagement member and the second engagement member, in combination, are configured to mate with the top cap as the top cap is manipulated in a predetermined manner while coupled with the cable tray. In some such embodiments, the connector also includes one or more support guides configured to prevent decoupling of one or both the first engagement member and the second engagement member and the top cap, when the top cap is manipulated in the predetermined manner.

In some embodiments, the connector also includes the contact in a configuration which facilitates piercing of the cable by the contact to create an electrical connection with the cable and a contact holder configured to retain the contact such that when the top cap is manipulated in the predetermined manner while coupled with the cable tray, the contact pierces the cable to create the electrical connection with the cable. In some such embodiments, the contact is further configured to create an electrical connection with a second cable, and thereby create an electrical connection between the cable and the second cable. In other such embodiments, the connector also includes a gasket disposed between the contact holder and the cable tray and configured such that, as the top cap is manipulated in the predetermined manner while coupled with the cable tray, the contact extends through the gasket and into the cable to provide a seal around the electrical connection.

In some embodiments, the cable tray has a first side and a second side opposite the first side both extending between the first and second ends. The first side includes an exterior surface comprising a plurality of ribs configured to improve a user's grip as the top cap is coupled with the cable tray.

In some embodiments, the connector includes the top cap in a configuration which facilitates coupling of the top cap with the cable tray. The top cap includes a first cap portion comprising the contact holder configured to retain a contact such that when the top cap is manipulated in the predetermined manner while coupled with the cable tray, the contact pierces the cable to create an electrical connection with the cable and a second cap portion coupled to the first cap portion and rotatable relative to the first cap portion. In some such embodiments, the cable tray also includes an engagement member extending from the cable tray and the second cap portion includes a threaded aperture for coupling with the engagement member of the cable tray.

In some embodiments, the connector includes a second finger extending beyond the first end for some distance longitudinally, where the second finger includes a distal portion that extends toward the protrusion of the first finger and that is spaced apart from the protrusion by an amount that is smaller than the width of each cable within a range of cable sizes accommodated by the cable tray and large enough to allow passage of a thickness dimension of each cable within the range. This is so that any cable within the range can be inserted between the protrusion and the distal portion and into the cable-accommodating gap for secure retention of the cable without requiring a different size of cable tray for each cable width accommodated by the connector.

According to embodiments of the invention, a connector includes a first cable tray configured to receive and retain a first cable in a stable position and couple with a top cap configured to create an electrical connection between the first cable and a contact as the top cap is manipulated in a predetermined manner while coupled with the first cable tray. The first cable tray includes a cable-facing surface that extends longitudinally from a first end to a second end of the cable-facing surface and a first finger extending beyond the first end for some distance longitudinally. The first finger has a protrusion that protrudes to some extent in a transverse direction so that a cable-accommodating gap is defined between the protrusion and the first end. The protrusion is configured to bear against the first cable and retain the first cable in the stable position when the first cable is inserted between the protrusion and the first end. The connector also includes a second cable tray configured to receive and retain a second cable in a stable position and create an electrical connection between the second cable and the contact as the top cap is manipulated in the predetermined manner while coupled with the first cable tray. The second cable tray includes an upper surface that extends longitudinally from a first end to a second end of the upper surface, and the connector also includes the contact in a configuration that facilitates creation of an electrical connection between the first cable and the second cable.

In some embodiments, the connector also includes a second finger extending beyond the first end of the cable-facing surface of the first cable tray for some distance longitudinally. The second finger has a second protrusion that protrudes to some extent in a transverse direction so that the cable-accommodating gap is defined among the protrusion of the first finger, the second protrusion and the first end of the cable-facing surface of the first cable tray. The second protrusion is configured to bear against the first cable and retain the first cable in the stable position when the first cable is inserted between the second protrusion and the first end of the cable-facing surface.

In some embodiments, the connector also includes a second finger extending beyond the second end of the cable-facing surface of the first cable tray for some distance longitudinally. The second finger has a second protrusion that protrudes to some extent in a transverse direction so that a second cable-accommodating gap is defined between the second protrusion and the second end of the cable-facing surface. The second protrusion is configured to bear against the first cable and retain the first cable in the stable position when the first cable is inserted between the second finger and the second end of the cable-facing surface.

In some embodiments, the connector includes a second finger extending beyond the first end of the cable-facing surface of the first cable tray for some distance longitudinally, the second finger having a second protrusion that protrudes to some extent in a transverse direction so that the cable-accommodating gap is defined among the protrusion of the first finger. The second protrusion and the first end of the cable-facing surface of the first cable tray, the second protrusion is configured to bear against the first cable and retain the first cable in the stable position when the first cable is inserted between the second protrusion and the first end of the cable-facing surface. A third finger extending beyond the second end of the cable-facing surface of the first cable tray for some distance longitudinally. The third finger has a third protrusion that protrudes to some extent in a transverse direction so that a second cable-accommodating gap is defined between the third protrusion and the second end of the cable-facing surface. The third protrusion is configured to bear against the first cable and retain the first cable in the stable position when the first cable is inserted between the third finger and the second end of the cable-facing surface. In some such embodiments, the connector also includes a fourth finger extending beyond the second end of the cable-facing surface of the first cable tray for some distance longitudinally. The fourth finger has a fourth protrusion that protrudes to some extent in a transverse direction so that the second cable-accommodating gap is defined among the third protrusion, the fourth protrusion and the second end of the cable-facing surface. The fourth protrusion is configured to bear against the first cable and retain the first cable in the stable position when the first cable is inserted between the fourth finger and the second end of the cable-facing surface.

In some embodiments, the connector also includes a second finger extending beyond the first end of the upper surface of the second cable tray for some distance longitudinally. The second finger has a second protrusion that protrudes to some extent in a transverse direction so that a second cable-accommodating gap is defined between the second protrusion and the first end of the upper surface of the second cable tray. The second protrusion is configured to bear against the second cable and retain the second cable in a stable position when the second cable is inserted between the second protrusion and the first end of the upper surface of the second cable tray.

In some embodiments, the connector is structured to accommodate cables having a width dimension that exceeds a thickness of the cable, where the protrusion is configured to facilitate insertion of the first cable into the cable-accommodating gap while the first cable is oriented in a first orientation and is configured to facilitate twisting of the first cable into a second orientation which effects retention of the first cable in the cable-accommodating gap.

In some embodiments, the connector includes a rib extending from the cable-facing surface of the first cable tray and oriented along or generally parallel with the longitudinal axis of the first cable tray, the rib configured to engage a groove in the first cable and assist in maintaining alignment of the first cable in the stable position.

In some embodiments, the connector includes a first wall extending from a first side of the cable-facing surface of the first cable tray and a second wall extending from a second side of the cable-facing surface of the first cable tray, where the first wall and the second wall are angled such that a distance between the first wall and the second wall proximate the cable-facing surface is smaller than a distance between the first wall and the second wall distal from the cable-facing surface, the first wall and the second wall in combination configured to assist in maintaining alignment of the first cable in the stable position as the top cap is manipulated in the predetermined manner while coupled with the first cable tray.

In some embodiments, the first cable tray is configured to retain the first cable in the stable position regardless of which cable width is selected within a predetermined range of cable widths, and without requiring a different size of first cable tray for each cable width. In some embodiments, the connector includes a first engagement member extending from at least one of the first and second cable trays; and a second engagement member extending from at least one of the first and second cable trays. The first engagement member and the second engagement member in combination are configured to mate with the top cap as the top cap is manipulated in a predetermined manner while coupled with at least one of the first and second cable trays. In some such embodiments, the connector includes one or more support guides configured to prevent decoupling of one or both the first engagement member and the second engagement member and the top cap, when the top cap is manipulated in the predetermined manner.

In some embodiments, the connector includes the top cap in a configuration which facilitates coupling of the top cap with the first cable tray and a contact holder configured to retain the contact such that when the top cap is manipulated in the predetermined manner while coupled with the first cable tray, the contact pierces the first cable and the second cable to create an electrical connection between the first cable and the second cable. In which the top cap is rotatable relative to at least one of: the first cable tray, the second cable tray and the contact holder.

In some embodiments, the connector includes a contact holder configured to retain the contact such that when the top cap is manipulated in a predetermined manner while coupled with the first cable tray, the contact pierces the first cable and pierces the second cable to create an electrical connection between the first cable and the second cable. In some such embodiments, the connector includes a gasket disposed between the contact holder and the first cable tray, where the gasket is configured such that, as the top cap is manipulated in a predetermined manner while coupled with the first cable tray, the contact extends through the gasket and into the first cable to provide a seal around the electrical connection.

In some embodiments, the first cable tray has a first side and a second side opposite the first side, the first side includes an exterior surface comprising a plurality of ribs configured to improve a user's grip as the top cap is manipulated in a predetermined manner while coupled with the first cable tray.

According to embodiments of the invention, a connector includes a cable tray configured to receive and retain a cable in a stable position and couple with a top cap configured to create an electrical connection between the cable and a contact as the top cap is manipulated in a predetermined manner while coupled with the cable tray. The cable tray includes an upper surface that extends longitudinally from a first end to a second end and a rib extending from the upper surface of the first cable tray and oriented along or generally parallel with the longitudinal axis of the cable tray. The rib is configured to engage a groove in the cable, and assist in maintaining alignment of the cable in the stable position. The cable tray also includes a first wall extending from a first side of the upper surface of the cable tray and a second wall extending from a second side of the upper surface of the cable tray, where the first wall and the second wall are angled such that a distance between the first wall and the second wall proximate the upper surface is smaller than a distance between the first wall and the second wall distal from the upper surface. The first wall and the second wall in combination are configured to assist in maintaining alignment of the cable in the stable position as the top cap is manipulated in the predetermined manner while coupled with the cable tray.

In some embodiments, the cable tray is configured to retain the cable in the stable position regardless of which cable width is selected within a predetermined range of cable widths, and without requiring a different size of cable tray for each cable width.

In some embodiments, the cable tray includes a finger extending beyond the first end for some distance longitudinally. The finger has a protrusion that protrudes to some extent in a transverse direction so that a cable-accommodating gap is defined between the protrusion and the first end. The protrusion is configured to bear against the cable and retain the cable in the stable position when the cable is inserted between the protrusion and the first end.

In some such embodiments, the connector includes a second finger extending beyond the first end for some distance longitudinally. The second finger has a second protrusion that protrudes to some extent in a transverse direction so that the cable-accommodating gap is defined among the first protrusion, the second protrusion and the first end. The second protrusion is configured to bear against the cable and retain the cable in the stable position when the cable is inserted between the second protrusion and the first end.

In other such embodiments, the connector includes a second finger extending beyond the second end for some distance longitudinally. The second finger has a second protrusion that protrudes to some extent in a transverse direction so that a second cable-accommodating gap is defined between the second protrusion and the second end. The second protrusion is configured to bear against the cable and retain the cable in the stable position when the cable is inserted between the second protrusion and the second end. In some of these embodiments, the connector also includes a third finger extending beyond the second end for some distance longitudinally, where the third finger has a third protrusion that protrudes to some extent in a transverse direction so that the cable-accommodating gap is defined among the second protrusion, the third protrusion and the second end. The third protrusion is configured to bear against the cable and retain the cable in the stable position when the cable is inserted between the third protrusion and the second end.

In some embodiments, the connector is structured to accommodate cables having a width dimension that exceeds a thickness of the cable, and the protrusion is configured to facilitate insertion of the cable into the cable-accommodating gap while the cable is oriented in a first orientation and is configured to facilitate twisting of the cable into a second orientation which effects retention of the cable in the cable-accommodating gap.

In some embodiments, the cable tray also includes a first engagement member extending from the cable tray and a second engagement member extending from the cable tray, where the first engagement member and the second engagement member, in combination, are configured to mate with the top cap as the top cap is manipulated in the predetermined manner while coupled with the cable tray.

In some embodiments, the connector includes the contact in a configuration which facilitates piercing of the cable by the contact to create an electrical connection with the cable and a contact holder configured to retain the contact such that when the top cap is manipulated in the predetermined manner while coupled with the cable tray, the contact pierces the cable to create the electrical connection with the cable. In some such embodiments, the contact is further configured to create an electrical connection with a second cable, and thereby create an electrical connection between the cable and the second cable. In other such embodiments, the connector includes a gasket disposed between the contact holder and the cable tray and configured such that, as the top cap is manipulated in the predetermined manner while coupled with the cable tray, the contact extends through the gasket and into the cable to provide a seal around the electrical connection.

In some embodiments, the cable tray has a first side and a second side opposite the first side both extending between the first and second ends, the first side including an exterior surface comprising a plurality of ribs configured to improve a user's grip as the top cap is coupled with the cable tray.

In some embodiments, the connector includes the top cap in a configuration which facilitates coupling of the top cap with the cable tray and a contact holder configured to retain the contact such that when the top cap is manipulated in the predetermined manner while coupled with the cable tray, the contact pierces the cable to create an electrical connection with the cable. The top cap is rotatable relative to at least one of: the first cable tray and the contact holder. In some such embodiments, the cable tray also includes an engagement member extending from the cable tray and the top cap includes a threaded aperture for coupling with the engagement member of the cable tray. In some such embodiments, the connector also includes one or more support guides configured to prevent decoupling of one or both the first engagement member and the second engagement member and the top cap, when the top cap is manipulated in the predetermined manner.

In some embodiments, the connector includes a first finger extending beyond the first end for some distance longitudinally, the first finger having a first protrusion that protrudes to some extent in a transverse direction so that a cable-accommodating gap is defined between the first protrusion and the first end, the first protrusion being configured to bear against the cable and retain the cable in the stable position when the cable is inserted between the first protrusion and the first end and a second finger extending beyond the first end for some distance longitudinally, where the second finger includes a distal portion that extends toward the first protrusion of the first finger and that is spaced apart from the first protrusion by an amount that is smaller than the width of each cable within a range of cable sizes accommodated by the cable tray and large enough to allow passage of a thickness dimension of each cable within the range, so that any cable within the range can be inserted between the first protrusion and the distal portion, and into the cable-accommodating gap for secure retention of the cable without requiring a different size of cable tray for each cable width accommodated by the connector.

According to embodiments of the invention, a connector includes a cable tray configured to receive and retain a first cable in a stable position, to receive and retain a second cable in a stable position, and to couple with a top cap configured to create an electrical connection among the first cable, a contact, and the second cable as the top cap is manipulated in a predetermined manner while coupled with the cable tray. The cable tray includes a first upper surface that extends longitudinally from a first end to a second end of the first upper surface and configured to receive and retain the first cable in a stable position. The cable tray also includes a second upper surface that extends longitudinally from a first end to a second end of the second upper surface and configured to receive and retain the second cable in a stable position. The contact is configured to create the electrical connection between the first cable and the second cable as the top cap is manipulated in the predetermined manner while coupled with the cable tray. The first upper surface and the second upper surface are disposed in a side-by-side configuration.

In some embodiments, the connector includes a finger extending beyond the first end of at least one of the first and second upper surfaces for some distance longitudinally, where each finger has a protrusion that protrudes to some extent in a transverse direction so that a cable-accommodating gap is defined between the protrusion and the first end. Each protrusion is configured to bear against the first or second cable and retain the first or second cable in the stable position when the first or second cable is inserted between the protrusion and the first end. In some such embodiments, the connector includes a second finger extending beyond the first end of at least one of the first and second upper surfaces for some distance longitudinally, where each second finger has a second protrusion that protrudes to some extent in a transverse direction so that the cable-accommodating gap is defined among the first protrusion, the second protrusion and the first end of at least one of the first and second upper surfaces. Each second protrusion is configured to bear against the first or second cable and retain the first or second cable in the stable position when the first or second cable is inserted between the second protrusion and the first end.

In some embodiments, the connector includes a second finger extending beyond the second end of at least one of the first and second upper surfaces for some distance longitudinally, where each second finger has a second protrusion that protrudes to some extent in a transverse direction so that the cable-accommodating gap is defined between the second protrusion and the second end. Each second protrusion is configured to bear against the first or second cable and retain the first or second cable in the stable position when the first or second cable is inserted between the second protrusion and the second end.

According to embodiments of the invention, a connector has a first cable tray configured to receive and retain a first cable in a stable position and couple with a top cap configured to create a first electrical connection between the first cable and a contact as the top cap is manipulated in a predetermined manner while coupled with the first cable tray. The first cable tray includes a cable-facing surface that extends longitudinally from a first end to a second end of the cable-facing surface and a second cable tray configured to receive and retain a second cable in a stable position and create a second electrical connection between the second cable and the contact as the top cap is manipulated in the predetermined manner while coupled with the first cable tray. The second cable tray includes an upper surface that extends longitudinally from a first end to a second end of the upper surface. A finger extends beyond the first end of the cable-facing surface for some distance longitudinally or the first end of the upper surface for some distance longitudinally, where the finger has a protrusion that protrudes to some extent in a transverse direction so that a cable-accommodating gap is defined between the protrusion and the first end of the cable-facing surface or the first end of the upper surface. The protrusion is configured to bear against the first cable or the second cable and retain the first cable or second cable in the stable position when the first cable or second cable is inserted between the protrusion and the first end of the cable-facing surface or the first end of the upper surface. The first cable tray and the second cable tray are disposed in a stacked configuration.

In some such embodiments, the connector includes a second finger extending from the second end of the cable-facing surface for some distance longitudinally, where the second finger has a second protrusion that protrudes to some extent in a transverse direction so that a second cable-accommodating gap is defined between the second protrusion, and the second end. The second protrusion is configured to bear against the first cable and retain the first cable in the stable position when the first cable is inserted between the second protrusion and the second end.

In some embodiments, the connector includes a second finger extending beyond the first end of the cable-facing surface for some distance longitudinally, where the second finger has a second protrusion that protrudes to some extent in a transverse direction so that the cable-accommodating gap is defined among the first protrusion, the second protrusion and the first end. The second protrusion is configured to bear against the first cable and retain the first cable in the stable position when the first cable is inserted between the second protrusion and the first end.

According to embodiments of the invention, a cable end cap receives an end of a cable and includes a housing configured to receive the end of the cable and a spring clip configured to couple with the housing. The spring clip at least partially defines an opening for receiving the end of the cable inside the housing, and the spring clip is arranged so as to apply a compression force to the cable after the cable is inserted through the opening, to secure the end of the cable inside the housing.

In some embodiments, the spring clip includes a spring tab and the spring tab is arranged so that when the housing is in a first position with respect to the spring clip, the opening allows the end of the cable to be inserted into the housing and past the spring tab. When the housing is in a second position with respect to the spring clip, the spring clip is urged in a direction that constricts the opening more than when the housing is in the first position.

In some embodiments, the housing comprises a detent extending from an interior wall of the housing, the spring clip comprises a spring tab, and the detent is configured to apply a force to the spring tab, which thereby applies a compression force to the cable. In some such embodiments, the spring tab is arranged so that: when the housing is in a first position with respect to the spring clip, the opening allows the end of the cable to be inserted into the housing and past the spring tab. When the housing is in a second position with respect to the spring clip, the spring tab is urged in a direction that constricts the opening more than when the housing is in the first position to apply a compression force to the cable. When the spring clip is configured so that a greater amount of the spring clip is disposed outside the housing when the housing is in the first position than in the second position.

In some embodiments, the spring clip includes a detent-engaging structure that is configured to resist or prevent removal of the spring clip from the housing when the second position of the housing with respect to the spring clip is achieved.

In some embodiments, the spring clip comprises a spring tab configured to apply a compression force to the cable, and the housing comprises a snap configured for applying a force on the spring tab. In some such embodiments, the snap is configured to couple with an aperture defined in a wall of the housing and enter the interior of the housing, to apply the force to the spring tab. In some such embodiments, the snap is attached to the housing by a hinge, whereby the snap is configured to couple with the aperture defined in the wall by rotation about the hinge.

According to embodiments of the invention, a connector includes a top cap, a cable tray configured to receive and retain a cable in a stable position and couple with the top cap. The top cap is configured to create an electrical connection between the cable and a contact as the top cap is manipulated in a predetermined manner while coupled with the cable tray. The cable tray includes an upper surface that extends longitudinally from a first end to a second end and an engagement member extending from the cable tray; where the top cap includes a threaded aperture for coupling with the engagement member of the cable tray. The top cap includes a brace configured to prevent decoupling of the engagement member and the threaded aperture of the top cap when the top cap is manipulated in the predetermined manner.

In some embodiments, the brace includes a protrusion with a circumferential ridge. In some embodiments, the brace includes a protrusion with a circumferential platform. In some embodiments, the cable tray also includes a finger extending beyond the first end for some distance longitudinally, where the finger has a protrusion that protrudes to some extent in a transverse direction so that a cable-accommodating gap is defined between the protrusion and the first end. The protrusion is configured to bear against the cable and retain the cable in the stable position when the cable is inserted between the protrusion and the first end. In some embodiments, the connector includes one or more support guides configured to prevent decoupling of the engagement member and the threaded aperture of the top cap, when the top cap is manipulated in the predetermined manner.

According to embodiments of the invention, a connector includes a top cap and a cable tray configured to receive and retain a cable in a stable position and couple with the top cap, the top cap is configured to create an electrical connection between the cable and a contact as the top cap is manipulated in a predetermined manner while coupled with the cable tray. The cable tray includes an upper surface that extends longitudinally from a first end to a second end of the upper surface and an engagement member extending from the cable tray; where the top cap includes a threaded aperture for coupling with the engagement member of the cable tray. The connector includes an intermediate component configured to retain the contact such that when the top cap is manipulated in a predetermined manner while coupled with the cable tray, the contact pierces the cable to create the electrical connection with the cable. The intermediate component includes a stabilizer configured to substantially prevent rotation of the intermediate component and the contact when the top cap is manipulated in the predetermined manner while coupled with the cable tray. In some embodiments, the cable tray also includes a finger extending beyond the first end for some distance longitudinally. The finger has a protrusion that protrudes to some extent in a transverse direction so that a cable-accommodating gap is defined between the protrusion and the first end, where the protrusion is configured to bear against the cable and retain the cable in the stable position when the cable is inserted between the protrusion and the first end.

In some embodiments, the connector also includes one or more support guides configured to prevent decoupling of the engagement member and the threaded aperture of the top cap, when the top cap is manipulated in the predetermined manner. In some embodiments, the connector also includes a second cable tray configured to receive and retain a second cable in a stable position and create a second electrical connection between the second cable and the contact as the top cap is manipulated in the predetermined manner while coupled with the first cable tray. The second cable tray includes a cable-facing surface that extends longitudinally from a first end to a second end of the cable facing surface. The first cable tray and the second cable tray are disposed in a stacked configuration. In some such embodiments, the cable tray also includes a finger extending beyond the first end for some distance longitudinally. The finger has a protrusion that protrudes to some extent in a transverse direction so that a cable-accommodating gap is defined between the protrusion and the first end of the upper surface. The protrusion is configured to bear against the cable and retain the cable in the stable position when the cable is inserted between the protrusion and the first end.

The following description and the annexed drawings set forth in detail certain illustrative features of one or more embodiments of the invention. These features are indicative, however, of but a few of the various ways in which the principles of various embodiments may be employed, and this description is intended to include all such embodiments and their equivalents.

BRIEF DESCRIPTION OF THE DRAWINGS

Figure 7:
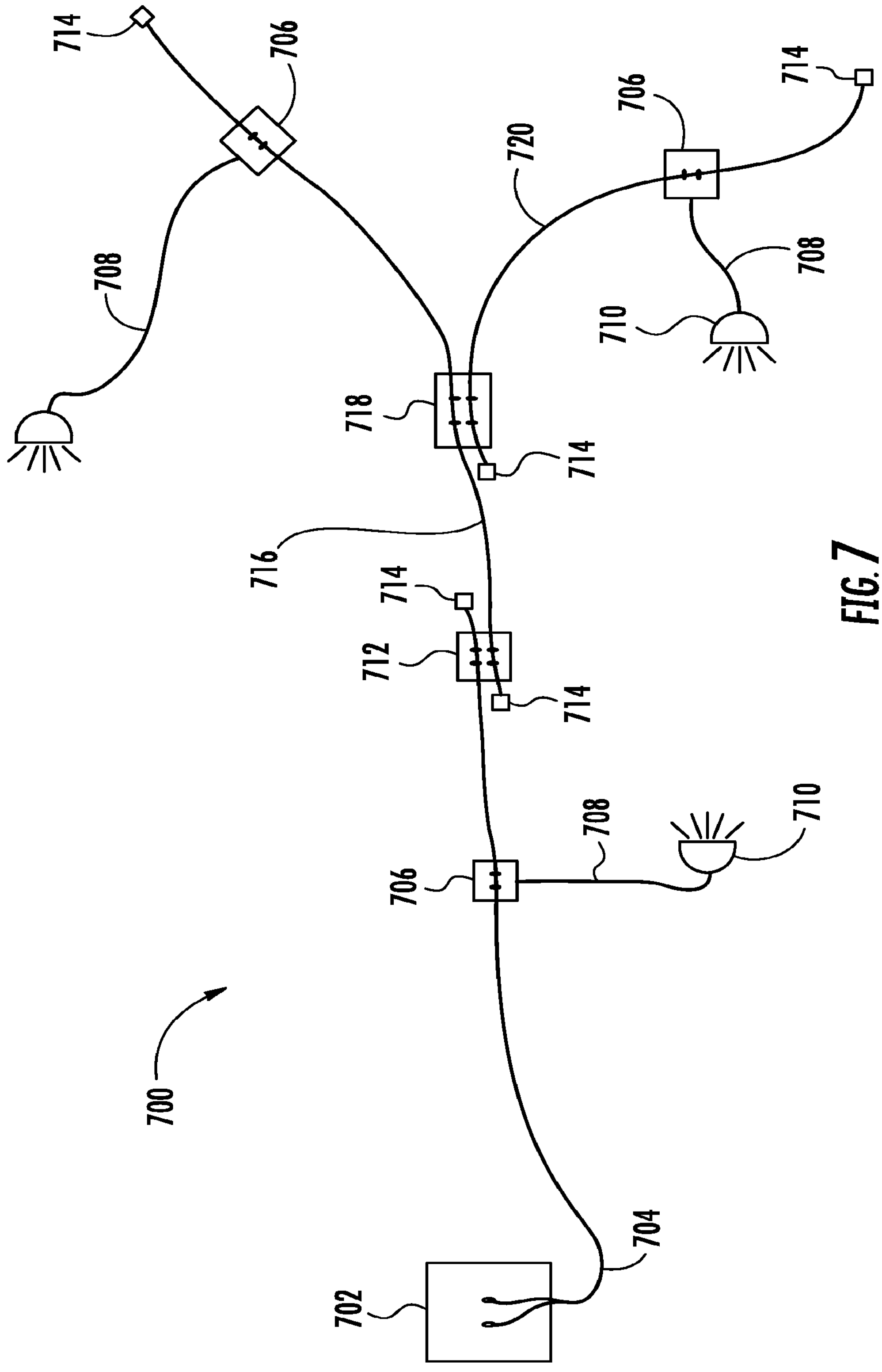
Figure 10:
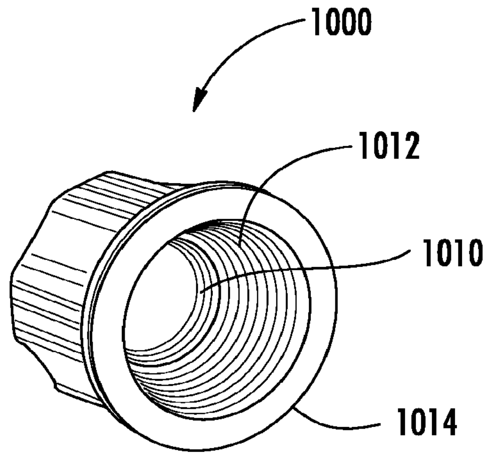
Figure 11:
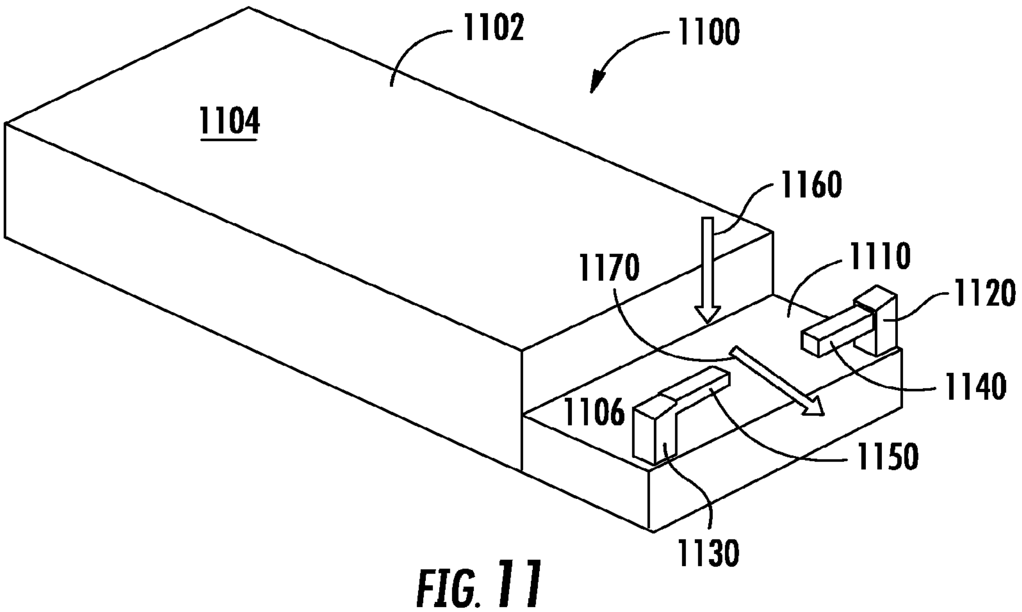

Having thus described embodiments of the invention in general terms, reference will now be made to the accompanying drawings, wherein:

FIGS. 1A-1H illustrate a connector configured to provide an electrical connection between a cable and a fixture according to embodiments of the invention;

FIGS. 2A-2K illustrate another connector configured to provide an electrical connection between a cable and a fixture according to embodiments of the invention;

FIGS. 3A-3I illustrate another connector configured to provide an electrical connection between a first cable and a second cable according to embodiments of the invention;

FIGS. 4A-4F illustrate another connector configured to provide an electrical connection between a first cable and a second cable according to embodiments of the invention;

FIGS. 5A-5F illustrate a cable end cap configured to receive and secure an end of a cable according to embodiments of the invention;

FIGS. 6A-6F illustrate another cable end cap configured to receive and secure an end of a cable according to embodiments of the invention;

FIG. 7 illustrates an environment in which a landscape lighting system functions;

FIGS. 8A-8E illustrate another connector configured to provide an electrical connection between a cable and a fixture according to embodiments of the invention;

FIGS. 9A-9F illustrate another connector configured to provide an electrical connection between a first cable and a second cable;

FIG. 10 illustrates a top cap according to embodiments of the invention;

FIG. 11 illustrates a cable tray according to embodiments of the invention;

FIGS. 12A-12D illustrate another connector configured to provide an electrical connection between a cable and a fixture according to embodiments of the invention; and FIGS. 13A-13D illustrate another connector configured to provide an electrical connection between a first cable and a second cable.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Referring now to FIGS. 1A-1H, a connector 100 is shown according to embodiments of the invention. In some embodiments, the connector 100 is configured to provide a cable-to-fixture electrical connection. In other words, a cable 102 provides a power supply to one or more fixtures in various applications. The cable 102 is retained by the connector 100 and a sheath of the cable 102 is punctured. An electrical connection is established between the conductive wires of the cable 102 and one or more contacts within the connector 100. The contacts are also electrically coupled with one or more additional cables 104 and 106, which provide power to one or more fixtures. In the embodiment shown, the connector 100 has a top cap 108 configured to couple with a cable tray 110. The top cap 108 has a hollow aperture and threads configured to receive and couple with one or more engagement members of the cable tray 110. As the top cap 108 is manipulated in a predetermined manner while coupled with the cable tray 110, for example, by rotating the cap 108 in the direction of arrow 111, the sheath of the cable 102 is pierced by one or more contacts, thereby establishing an electrical connection. The contacts are housed by a contact holder 112.

Figure 1A:
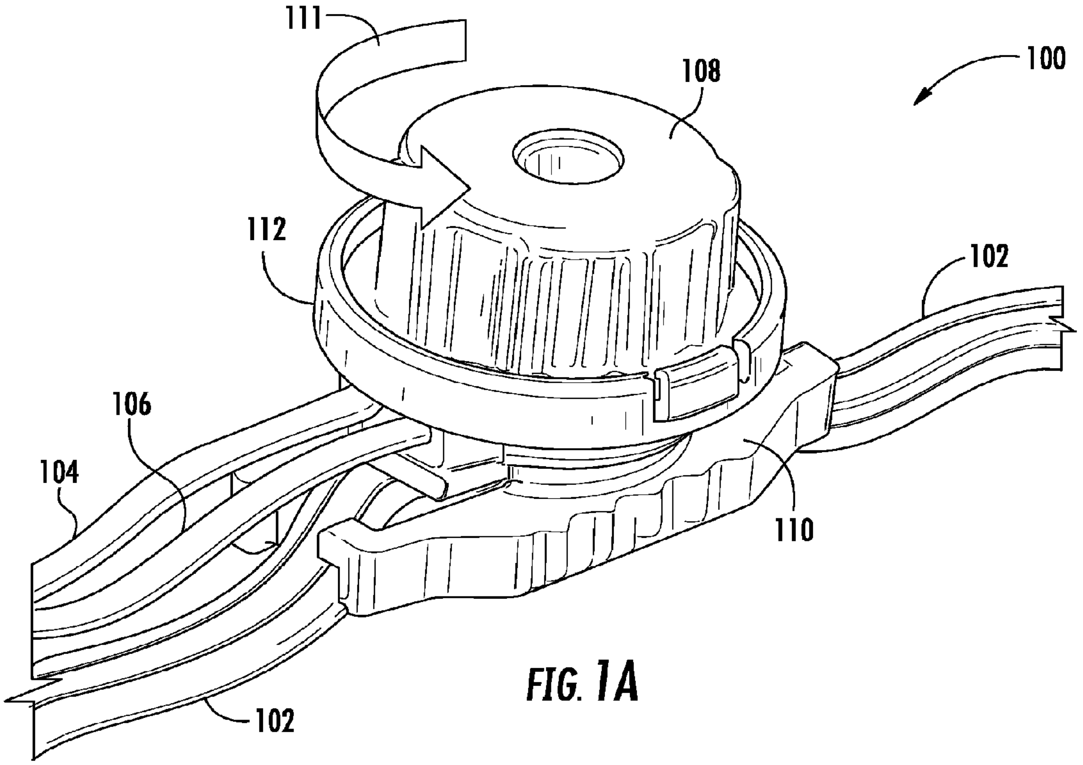
Figure 1B:
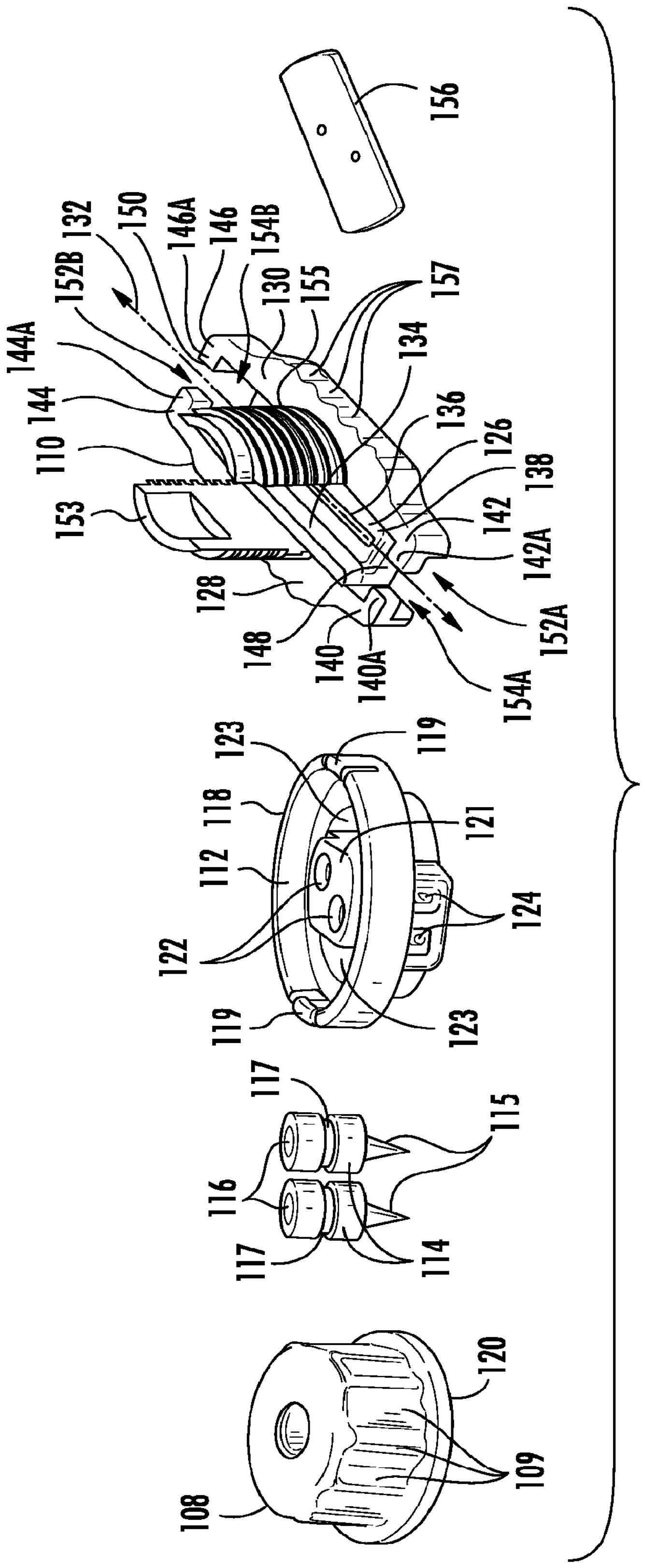

Referring now to FIG. 1B, various components of the connector 100 are shown disassembled. The top cap 108, in the embodiment shown, includes a plurality of gripping features 109, such as ribs, that are configured to provide enhanced grip for the user when turning the top cap 108 onto the engagement members of the cable tray 110. According to the embodiment shown, contacts 114 include points 115 configure to pierce the sheath of a cable, such as cable 102, in order to establish an electrical connection with the conductive wires inside the cable 102. The contacts 114 are generally made of a conductive material. In some embodiments, the contacts define apertures or holes 116 configured to receive conductive wires from another cable and/or to receive attachment devices configured to secure conductive wires from another cable. For example, in some embodiments, the contacts 114 define holes 116 having threaded interior surfaces for receiving screws. The heads of the screws clamp the conductive wires of one or more cable to the contacts as they are tightened into the holes 116, thereby establishing and maintaining an electrical connection with the conductive wires from the other cable. In this regard, the contacts 114 establish an electrical connection with the wires of the cable 102 by piercing the sheath of the cable 102 with the points 115 and also establish an electrical connection with conductive wires from one or more other cables, such as cables 104 and 106 by receiving screws in holes 116, thereby securing the conductive wires from cables 104 and 106 to the contacts. Thus, an electrical connection is established between the conductive wires of cable 102 and cables 104 and 106. In another embodiment, the contacts 114 are configured to receive conductive wires from one or more cables by wrapping the conductive wires about the contacts 114. For example, in some embodiments, the contacts define circumferential troughs 117 configured to receive and wrap conductive wires from one or more cables. The circumferential troughs 117 also can be configured (and arranged with respect to the contact holder 112) so that, if the contact holder 112 is manufactured by molding the contact holder 112 around the contacts 114, the circumferential troughs 117 receive some of the molded material and will retain the contacts 114 in position after the molded material solidifies.

The contact holder 112 includes, in this embodiment, a rim 118 around its outer circumference. The rim 118 is configured to receive the top cap 108 and includes one or more arms 119 configured to fit over the edge 120 of the top cap as it is coupled with the contact holder 112. The contact holder 112 also has a center portion 121 that defines one or more contact apertures 122 configured to receive and retain one or more contacts 114. The contact holder 112 also, in this embodiment, includes one or more cable tray apertures 123 configured to receive the engagement members of the cable tray 110 such that the top cap 108 can be coupled with the cable tray 110 engagement members. The contact holder 112 also defines one or more cable apertures 124 configured to receive one or more cables, such as cables 104 and 106.

As will be understood, the cable 102 is typically formed of two individual conductors in a side-by-side configuration. The conductors are electrically separated from each other by a dielectric. The individual conductors are also covered by a dielectric material. For proper electric coupling, one of the conductors of the cable 102 should be connected with one of the contacts 114, such as the contact electrically connected to cable 104 and the other contact 114 should be connected to the contact electrically connected to cable 106 in such a manner as to maintain electrical separation between the two conductors of the cable 102, the contacts 114 and the cables 104 and 106. This is achieved by proper alignment between the cable 102 and the top cap 108 during installation. Proper alignment not only means alignment in a longitudinal direction, but also includes maintaining the cable 102 in a flat, non-twisted configuration.

To facilitate proper alignment, the connector further includes the cable tray 110, which, in the embodiment shown, includes an elongate platform 126 having an upper surface having two ends and configured to receive a cable, such as cable 102. A first side wall 128 and a second side wall 130 extend from the sides of the elongate platform generally parallel to its longitudinal axis 132. In the embodiment shown, both the first side wall 128 and the second side wall 130 include a slanted portion 134. The slanted portion 134 or portions are configured to receive cables and/or wires having various gauges or sizes. Thus, as the top cap 108 is manipulated in the predetermined manner (e.g., by rotating the top cap 108 while it is coupled with the cable tray 110) and as the top cap 108 applies a compression force against the cable, such as cable 102, the side walls 128 and 130 assist to maintain the cable 102 in a fixed position such that the contacts may establish an electrical connection effectively. Furthermore, once the top cap 108 has been tightened (by rotating it) enough to achieve the desired electrical connection(s), the side walls 128 and 130 are configured to assist in maintaining the cable 102 in the same position so that the established electrical connection(s) are not disturbed.

The cable tray 110 also has a rib 136 extending from an upper surface 138 of the elongate platform 126 and generally parallel to (or aligned with) the longitudinal axis 132 of the elongate platform 126. The rib 136 is configured to couple with a trough defined in a cable, such as cable 102. In many double-wire cables, such as cable 102, the two wires of the cable are attached by a sheath defining a trough on one or both sides of the cable. The rib 136 is configured to couple with the cable's trough, thereby assisting in maintaining the cable in a fixed position during coupling of the top cap 108 and the cable tray 110 and/or during manipulation of the top cap 108 in the predetermined manner (e.g., by rotating the top cap 108 so that it threadedly tightens against the cable tray 110). In some embodiments, such as the one shown, the rib 136 works in combination with the side walls 128 and 130 to maintain the cable in a fixed position during coupling of the top cap 108 and the cable tray 110 and/or during the predetermined manipulation of the top cap 108.

In some embodiments, one or more extending fingers may be used to stabilize the cable in the cable tray. As illustrated in the embodiment shown, the side walls 128 and 130 may extend past the end(s) of the upper surface 138 of the elongate platform 126 thereby forming fingers 140, 142, 144, and 146. The fingers 140, 142, 144, and 146, in combination with the ends or edges 148 and 150 of the upper surface 138 of the elongate platform 126 define an aperture having both a horizontal component and a vertical component. Such an aperture is also referred to as a cable-accommodating gap. In other words, the fingers 140, 142, 144, and 146 in combination with the edges 148 and 150 define cable accommodating gap 152A and 152B and cable-accommodating gap 154A and 154B.

A user installs the cable 102 with the cable tray 110, thereby securing the cable tray 110 in a stable position with respect to the cable 102 and/or securing the cable 102 in a stable position with respect to the cable tray 110. In order to install the cable 102 with the cable tray 110, the user may twist the cable 102 so that it fits between two opposing fingers, such as fingers 140 and 142. Similarly, the user may twist the cable 102 so that it fits between the two opposing fingers 144 and 146 at the opposite end of the elongate platform 126. Generally, the cable 102 includes two sheathed wires attached to one another, and thus, the cable has a first side longer than a second side. During installation of the cable 102, the user may twist the cable 102 such that the cable 102 passes between the fingers by passing the cable's shorter, second side between the fingers. Once the cable has been passed between the fingers, the user may un-twist the cable such that the cable's longer, first side lays flat against the elongate platform 126. In this regard, the cable 102 is retained by the fingers 140, 142, 144, and 146 working in combination with the edge 148 and 150 of the elongate platform 126. Furthermore, once the cable 102 has been installed with regard to the fingers on the opposite end of the elongate platform 126, the cable 102 lies flat against the elongate platform 126 and is retained by the combination of all the fingers, for example, fingers 140, 142, 144, and 146, as well as the other features included in some embodiments of the cable tray 126, such as the rib 136 and the slanted portions 134 of walls 128 and 130. As discussed above, proper alignment of the cable 102 before, during and/or after establishing the electrical connection is beneficial and is facilitated by the features described herein.

One or more of the fingers 140, 142, 144, and 146 in some embodiments, include a portion extending generally or substantially parallel with the longitudinal axis 132 of the elongate platform 126. Further, in some embodiments, one or more of fingers 140, 142, 144, and 146 include a second portion extending generally or substantially non-parallel with the longitudinal axis 132 of the elongate platform 126. In the embodiment shown, the fingers 140, 142, 144, and 146 include both portions and the second portions extend generally perpendicular to the longitudinal axis 132 of the elongate platform 126 and point toward the second portion of another finger. For example, finger 140 has a second portion 140A that generally points toward a second portion 142A of finger 142, and similarly, the second portion 142A of finger 142 generally points toward the second portion 140A of finger 140. The combination of the fingers, for example, fingers 140 and 142, is configured to assist in retaining the cable, such as cable 102 in a fixed position during coupling of the top cap 108 and the cable tray 110, during the predetermined manipulation of the top cap 108, and also after an electrical connection is established. In some embodiments, one or more of the fingers extend beyond one end of the upper surface of the cable tray for some distance longitudinally. In some such embodiments, one or more of the fingers 140, 142, 144, and 146 have a protrusion 140A, 142A, 144A, and/or 146A protruding to some extent in a transverse direction so that a cable-accommodating gap is defined between the protrusion (s) 140A, 142A and one end of the upper surface and another cable-accommodating gap is defined between the protrusions 144A, 146A and the other end of the upper surface. As shown in FIG. 1H, the protrusions 140A, 142A, 144A and/or 146A of the fingers 140, 142, 144 and 146 can be configured to bear against the cable 102 and retain the cable 102 in a stable position upon insertion of the cable 102 between the protrusions 140A,142A and the edge 148, and between the protrusions 144A,146A and the second edge 150. This facilitates retention of the cable 102 by the cable tray 110 before, during and after the electrical connection is established between the contacts 114 and the cable 102.

In some embodiments, a single finger, such as finger 140, extends from the elongate platform 126 from a side, such as side 128, of the elongate platform 126 generally or substantially parallel to the longitudinal axis 132 of the elongate platform 126. In some such embodiments, the finger 140 includes a protrusion 140A or second portion generally not parallel to the longitudinal axis 132 of the elongate platform 126.

While the illustrated embodiment includes four fingers 140, 142, 144, and 146, in other embodiments, the cable tray 110 may include one finger on each of the first and second ends 148, 150 of the cable tray 110 on opposite sides of the cable tray 110, such as for example, fingers 140 and 146, such that only one finger on each end 148,150 of the cable tray 110 is used to retain the cable and due to the opposite orientations of the fingers, they collectively hold the cable in place.

Returning again to FIGS. 1A-1H, the cable tray 110 also includes two engagement members 153 and 155 in the embodiment shown. The engagement members 153 and 155 are configured to engage with the top cap 108 as the top cap 108 is coupled to the cable tray 110 and is manipulated in the predetermined manner (e.g., rotated) by a user. The engagement members 153 and 155 are configured to fit through apertures 123 in the contact holder 112 such that the engagement members 153 and 155 protrude over the contact holder 112, thereby allowing the top cap 108 to couple with the engagement members 153 and 155 of the cable tray 110. As the top cap 108 is rotated by the user, the contact holder 112 is pressed toward the cable 102 until the contacts 114 establish an electrical connection with the cable 102. One or more gripping features 157 are disposed along one or both edges of the cable tray 110, thereby providing the user with enhanced grip. Such enhanced grip may be beneficial while the user is rotating the top cap 108 and/or coupling it with the engagement members 153 and 155.

Finally, a gasket 156 is shown. The gasket 156 is configured to fit between the contact holder 112 and the cable tray 110 and is configured to provide a seal about the contacts 114 as they establish and maintain an electrical connection with the cable. The seal is established by pressure exerted by the top cap 108 onto the contact holder 112 as the top cap 108 is manipulated in the predetermined manner (e.g., rotated) while coupled with the cable tray 110.

Figure 1C:
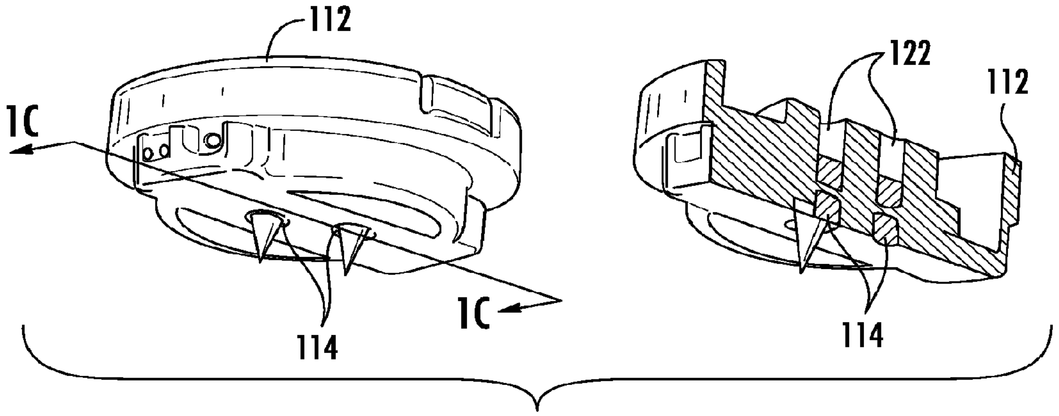
Figure 1D:
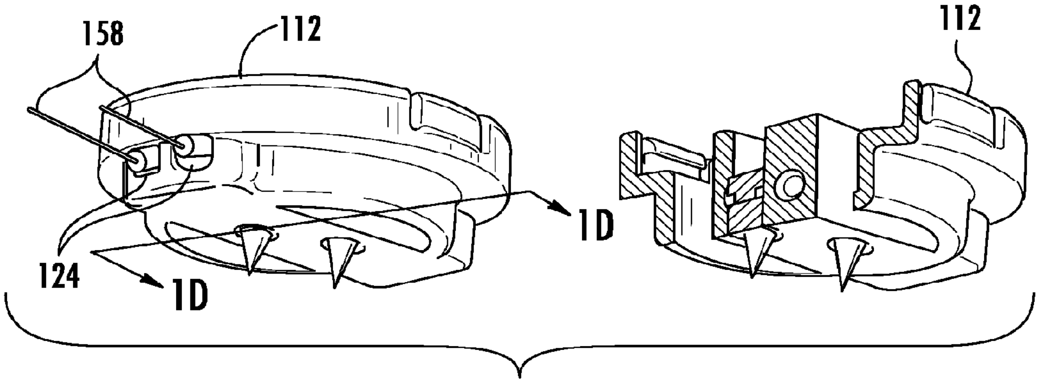
Figure 1E:
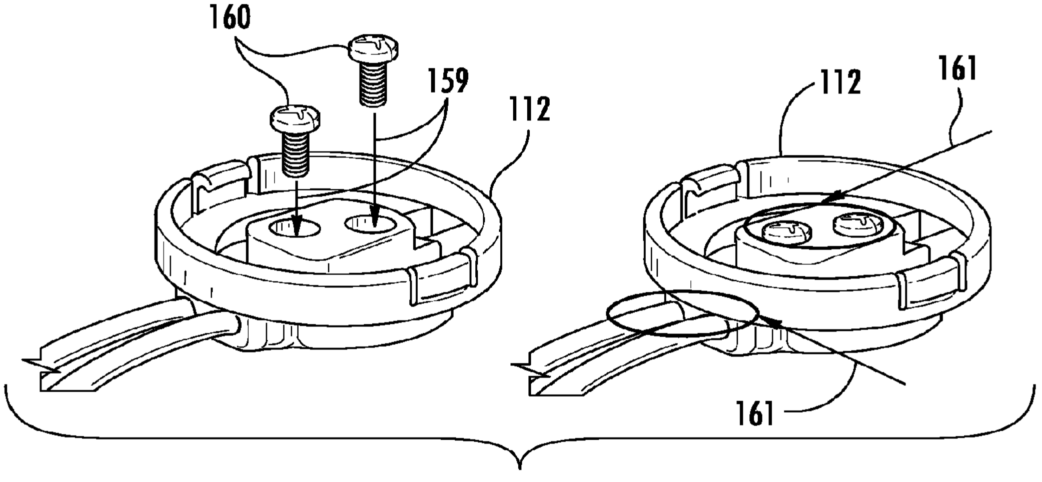

Referring now to FIG. 1C, the contact holder 112 is shown side-by-side with a cross section of the contact holder 112 taken along line 1C-1C. As shown, the contacts 114 are disposed within holes 122 such as by an insert molding process. Referring now to FIG. 1D, the contact holder 112 is shown side-by-side with a cross section of the contact holder 112 taken along line 1D-1D. Arrows 158 illustrate the direction of forming holes 124, which are defined in the contact holder 112. Referring now to FIG. 1E, a contact holder 112 has received two cables 104 and 106 via the holes 158. Cables 104 and 106 may represent in combination, for example, a lamp cable or other fixture cable. The cables are secured inside the contact holder 112 by attachment devices such as screws 160, which are inserted into holes 122 in the direction of arrows 159. The screws 160 secure the conductive wires of the cables 104 and 106 against the contacts 114, thereby establishing an electrical connection. As indicated by arrows 161, the highlighted areas are potted in order to protect against corrosion in some embodiments.

Figure 1F:
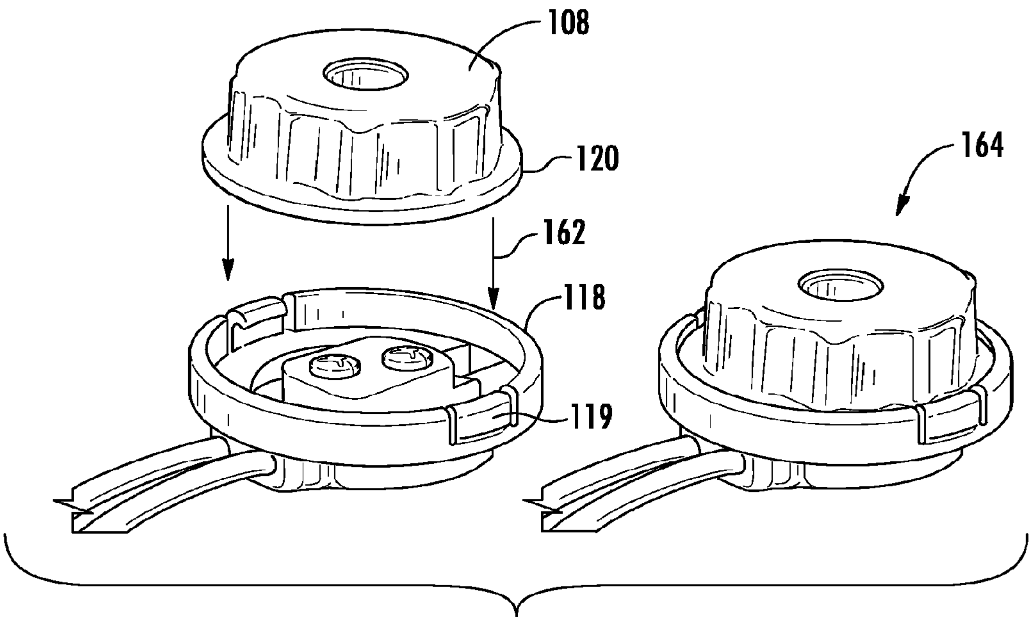
Figure 1G:
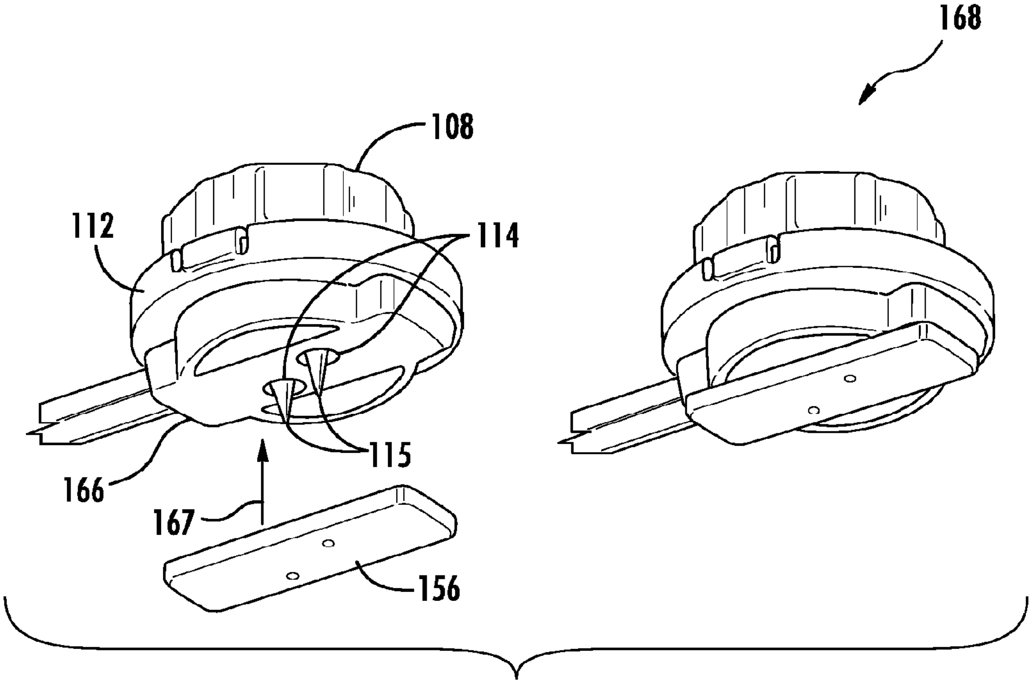
Figure 1H:
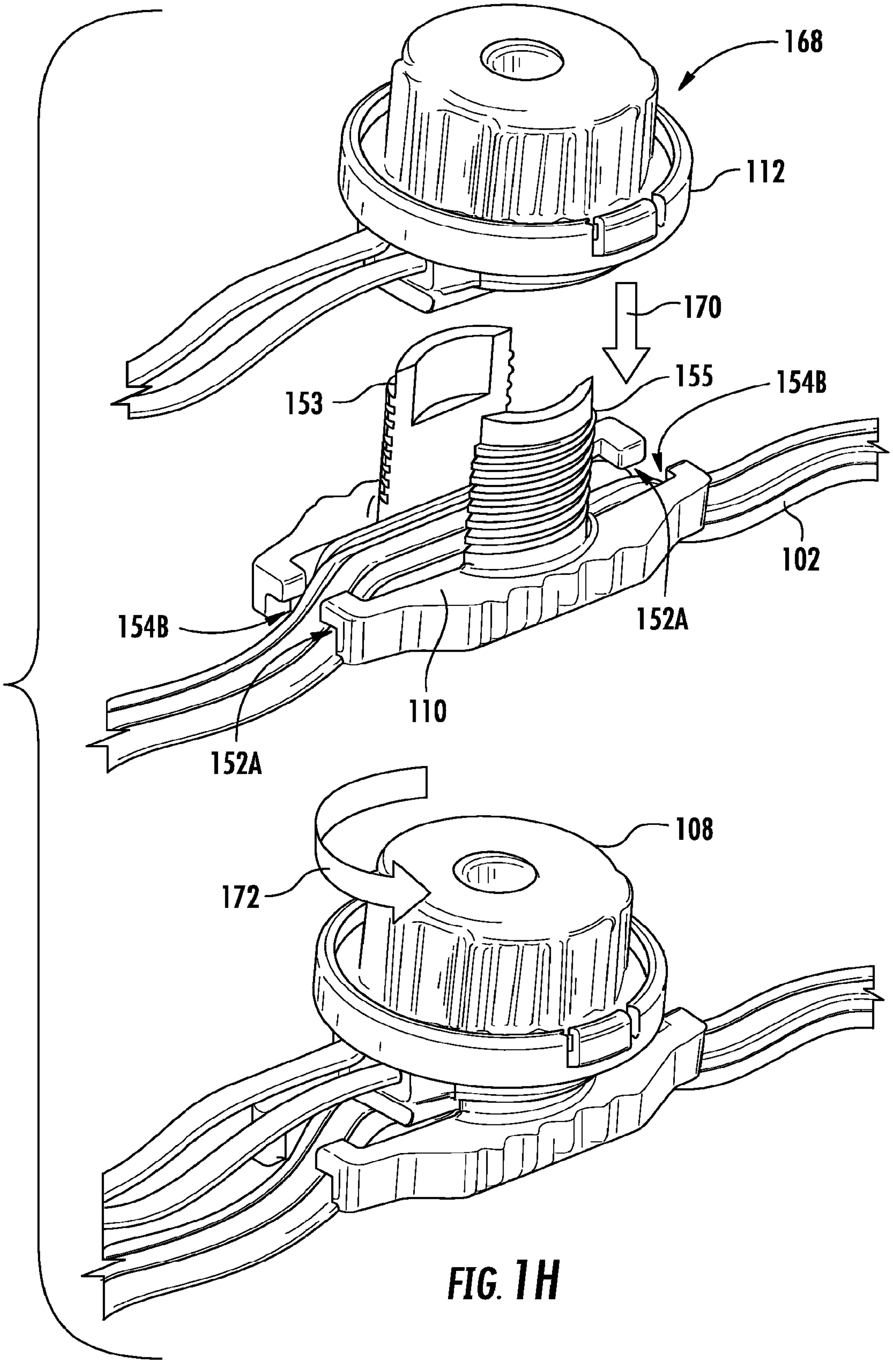

Referring now to FIG. 1F, the top cap 108 is secured against the contact holder 112 by depressing the top cap 108 onto the contact holder 112 in the direction of arrows 162. The contact holder includes a rim 118 as well as one or more arms 119 configured for securing the top cap 108 by snapping over the edge 120 of the top cap 108, thereby resulting in a top cap assembly 164 as shown on the right-hand side of FIG. 1F. Referring now to FIG. 1G, the gasket 156 is disposed against a bottom surface 166 of the contact holder 112 in the direction of arrow 167 such that the contact 114 points 115 pierce and protrude through the gasket 156, thereby resulting in a top cap assembly 168 as shown on the right-hand side of FIG. 1G.

Referring now to FIG. 1H, a cable tray is shown having a cable 102 secured therein. Notably, the cable 102 is positioned such that the cable 102 passes through both cable-accommodating gaps 152A and 152B and the cable-accommodating gaps 154A and 154B on both sides of the cable tray 110. This configuration assists in retaining the cable 102 in the desired position during coupling, manipulation in the predetermined manner (e.g., rotating) and thereafter. In this figure, the top cap assembly 168 is coupled with the cable tray 112 by positioning the top cap assembly 168 in the direction of arrow 170. The cable tray 112 engagement members 153 and 155, as discussed above, pass through the contact holder 112 and couple with the top cap 108 as it is rotated in the direction of arrow 172. As the top cap 108 is rotated, the contacts 114 establish an electrical connection with the conductive wires of the cable 102.

Referring now to FIGS. 2A-2L, a connector 200 is shown according to an embodiment of the invention. A top cap 208 couples with a cable tray 210. The top cap 208 also couples with a contact holder 212, which in turn couples with a top clamp 207. The top clamp 207 couples with the cable tray 210 as the top cap 208 is coupled with the cable tray 210 as discussed in greater detail below.

Figure 2A:
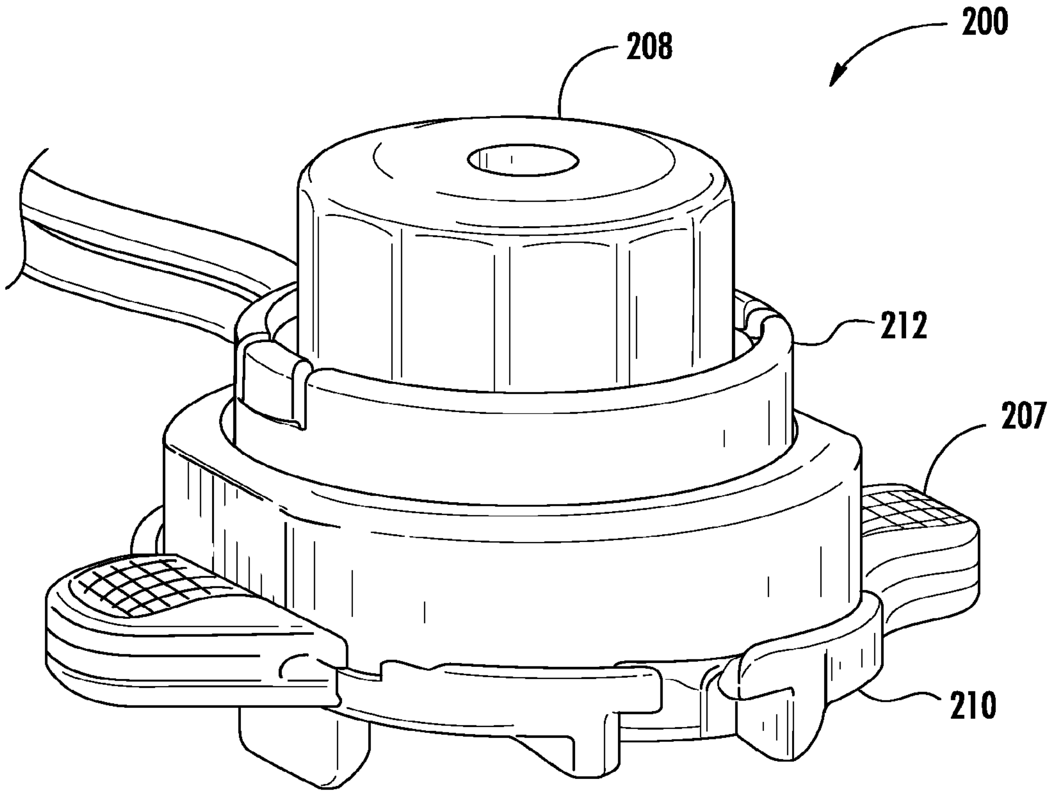
Figure 2B:
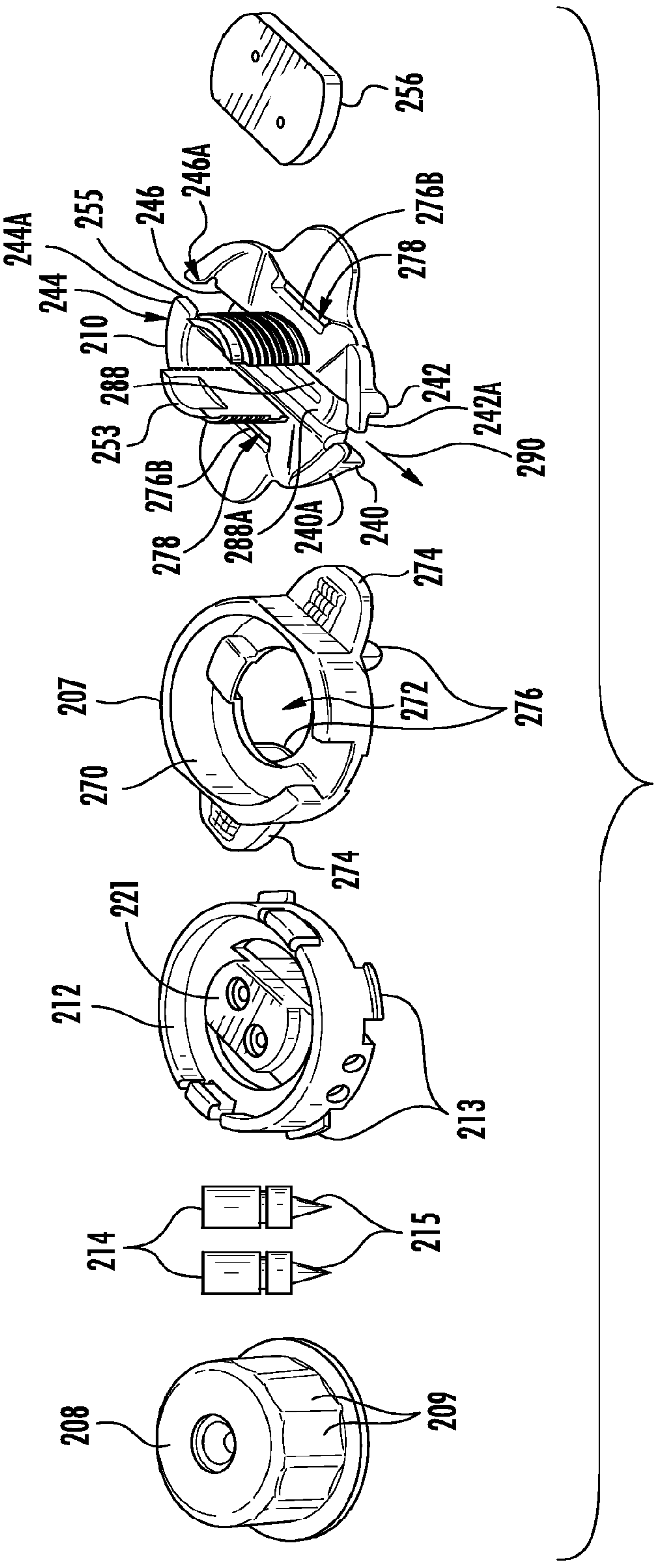

Referring now to FIG. 2B, various components making up the connector 200 are shown. The top cap 208, in various embodiments, includes gripping features such as a plurality of ribs 209 formed around the circumference of the top cap 208 in order to provide additional gripping for the user. Similar to the contacts discussed above, the contacts 214 include points 215 configured to pierce a sheath of a cable thereby creating an electrical connection between the conductive wires of the cable and the contact 214. A contact holder 212 is similar to the contact holder 112 of FIG. 1B, however the contact holder 212 also includes several lower arms 213 configured to snap into pockets 213A (or other forms of receivers) of a top clamp 207 as shown in FIG. 2G. The top clamp 207 also defines an aperture 272 configured to receive the engagement members 253 and 255 of the cable tray 210 as well as part of the center portion 221 and the contacts 214. The top clamp 207 also includes handles 274 extending from the sides of the top clamp 207 and configured to provide a place for the user to handle the connector 200. The top clamp 207 also includes, in some embodiments, alignment tabs 276 extending from the bottom surface of the top clamp 207 and configured to provide another place for the user to handle the connector 200. Alignment tabs 276, in some applications, are also configured to seat the connector in the desired location, such as by penetrating the ground and retaining the connector 200 in the desired location in the ground. The cable tray 210 includes many features similar to those discussed above with regard to the cable tray 110 and also includes some additional features. For example, the cable tray 210 defines two apertures 278 configured to receive the alignment tabs 276 of the top clamp 207. The gasket 256 for connector 200 is larger than gasket 156 in order to account for the wider lower surface of the contact holder 212.

The alignment tabs 276 and apertures 278, in some applications, are arranged on the top clamp 207 and cable tray 210, respectively, in such a way that they facilitate proper alignment of the cable tray 210 with the top clamp 207 (and/or with the contact holder 212) and/or they prevent the connector 200 from being assembled in a state of misalignment (or reduce the likelihood of misalignment). Misalignment can be avoided, for example, by arranging the apertures 278 on the cable tray 210 in such a way that they receive the alignment tabs 276 and allow assembly of the connector 200 only when the cable tray 210 is properly oriented (rotationally) with respect to the top clamp 207 and/or with respect to the contact holder 212 (e.g., when oriented and positioned so that the contacts 214 reliably pierce the cable 202 and achieve the desired electrical connection in response to manipulation of the top cap 208 in the predetermined manner).

Figure 2C:
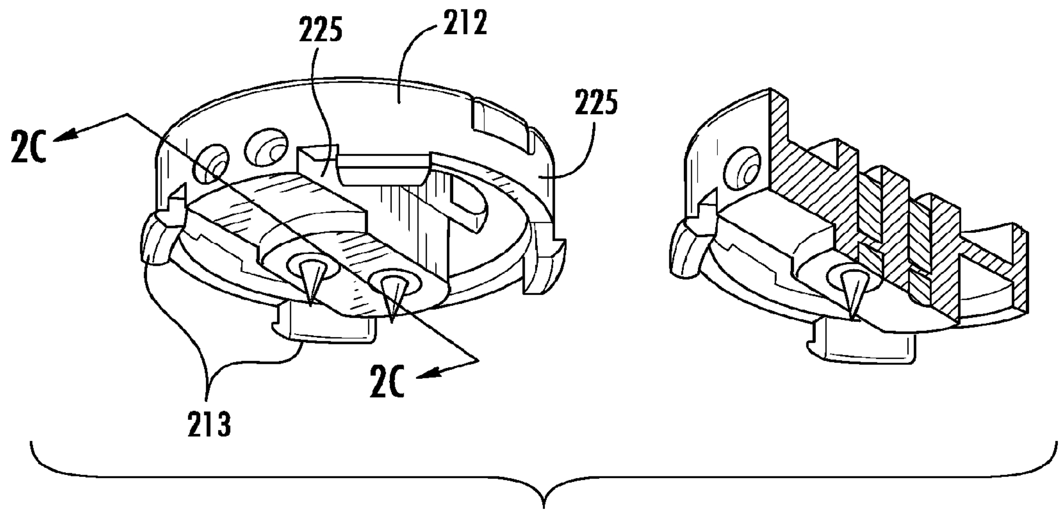

Referring now to FIG. 2C, the contact holder 212 is shown from below alongside a cross section of the contact holder 212 taken along line 2C-2C. The contacts 214 are shown disposed within the contact holder 212 such as by insert molding. Arms 213, as mentioned above, are configured to couple with the top clamp 207. The coupling can be implemented by providing the top clamp 207 with one or more pockets 213A (e.g., as shown in FIG. 2G) that receive tips of the arms 213 in a snap-fit configuration. In addition or as an alternative, the bottom of the contact holder 212 can include one or more keying structures 225 that prevent (or reduce the likelihood of) the arms 213 becoming locked to the top clamp 207 (and/or becoming locked to the pockets 213A) when the contact holder 212 and top clamp 207 are misaligned. The keying structure(s) 225 can prevent and/or diminish the likelihood of a misaligned snap-fitting of the contact holder 212 to the top clamp 207, by interfering with one or more corresponding keying features 225A located on the top clamp 207 when the top clamp 207 and contact holder 212 are not properly aligned and by allowing the snap-fit to occur only when the top clamp 207 and contact holder 212 are properly aligned. In addition or alternatively, the pockets 213A and arms 213 can be arranged with respect to one another to prevent the snap-fit engagement from occurring when the top clamp 207 and contact holder 212 are misaligned, and allowing it to occur only when proper alignment has been achieved.

Figure 2D:
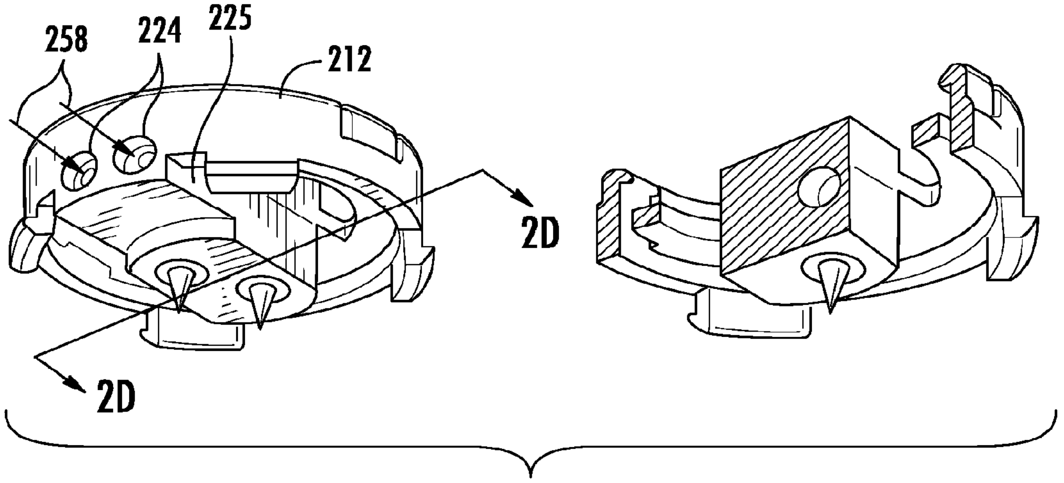
Figure 2E:
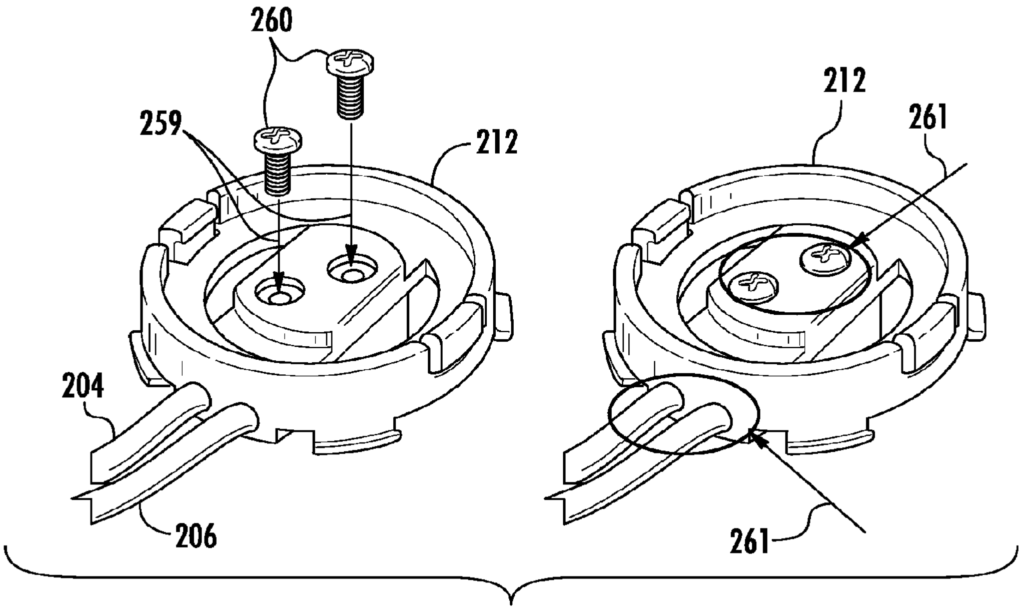

Referring now to FIG. 2D, the contact holder 212 is shown from below alongside a cross section of the contact holder 212 taken along line 2D-2D. Arrows 258 illustrate the direction in which holes 224 are formed in the contact holder 212, such as, for example, by drilling. Referring now to FIG. 2E, the contact holder 212 is shown after receiving cables 204 and 206. Attachment devices, such as screws 260 are inserted into the contact holder 212 in the direction of arrows 259 in order to secure the conductive wires of cables 204 and 206 and establish an electrical connection between the conductive wires of the cables 204 and 206 and the contacts 214. Once the cables 204 and 206 are secured by screws 260, in some embodiments, the areas identified by arrows 261 are potted for corrosion resistance.

Figure 2F:
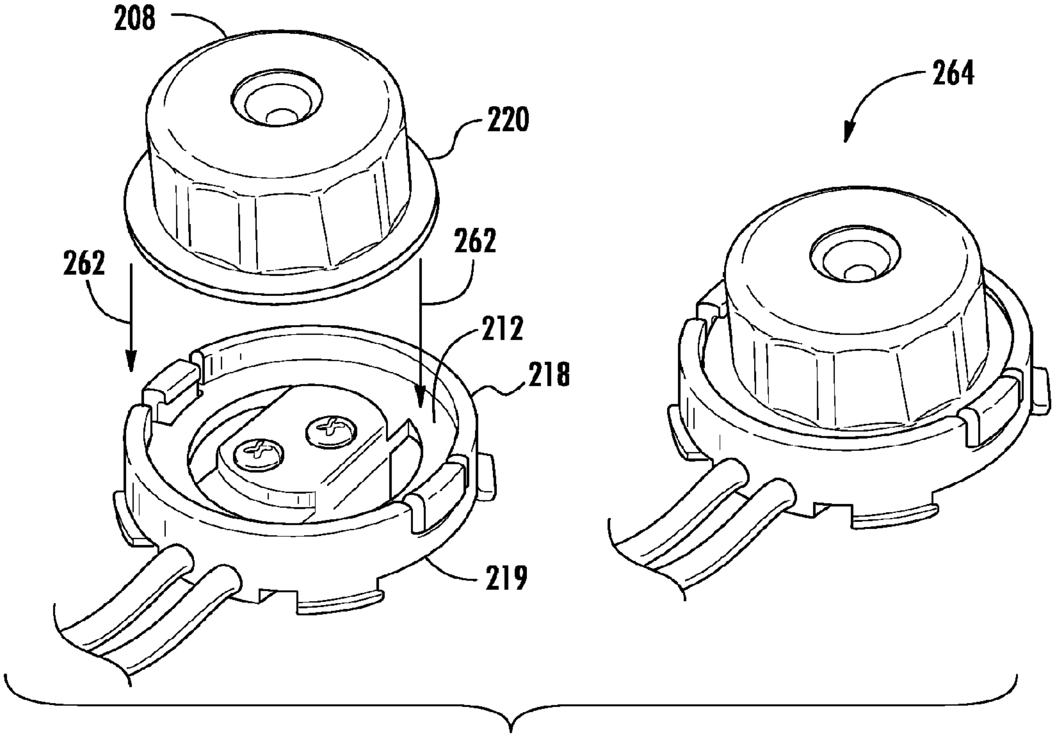
Figure 2G:
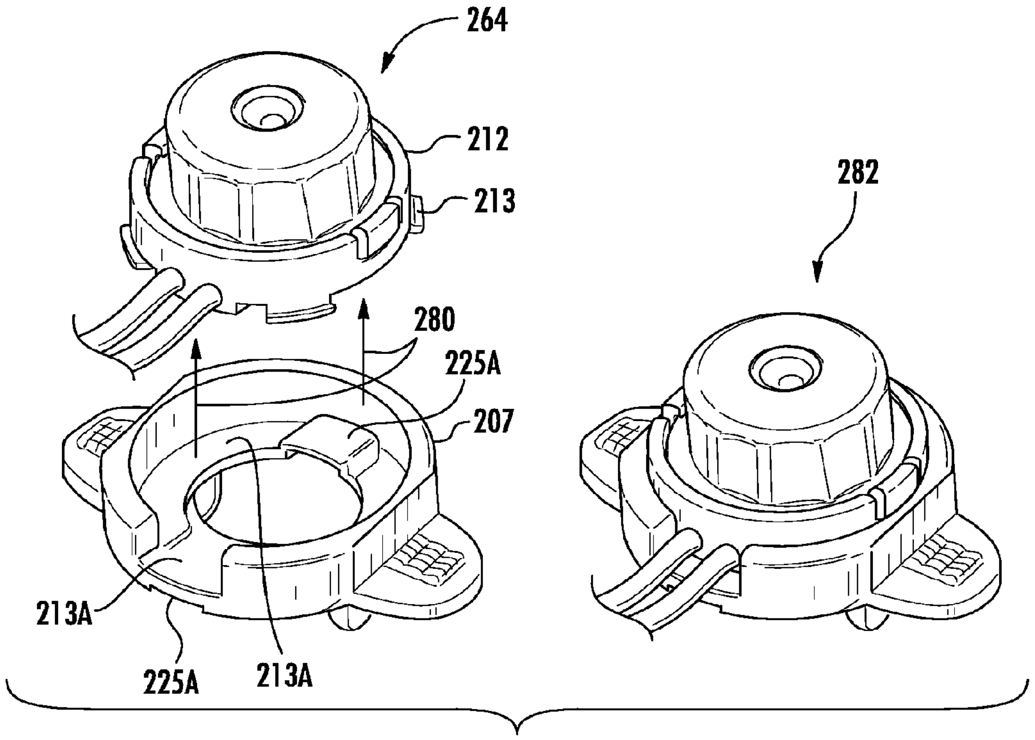

Referring now to FIG. 2F, the top cap 208 is coupled with the contact holder 212 as it is moved in the direction of arrows 262 such that the edge 220 of the top cap 208 fits inside the rim 218 of the contact holder 212. Arms 219 snap over the edge 220 of the top cap 208 as it is moved in the direction of arrows 262, thereby resulting in the top cap assembly 264. Referring now to FIG. 2G, the top clamp 207 is moved in the direction of arrows 280 to couple with the top cap assembly 264. Pockets 213A (or other forms of receivers) of the top clamp 207 receive and secure the arms 213 of the contact holder 212, thereby resulting in the top cap assembly 282.

Figure 2H:
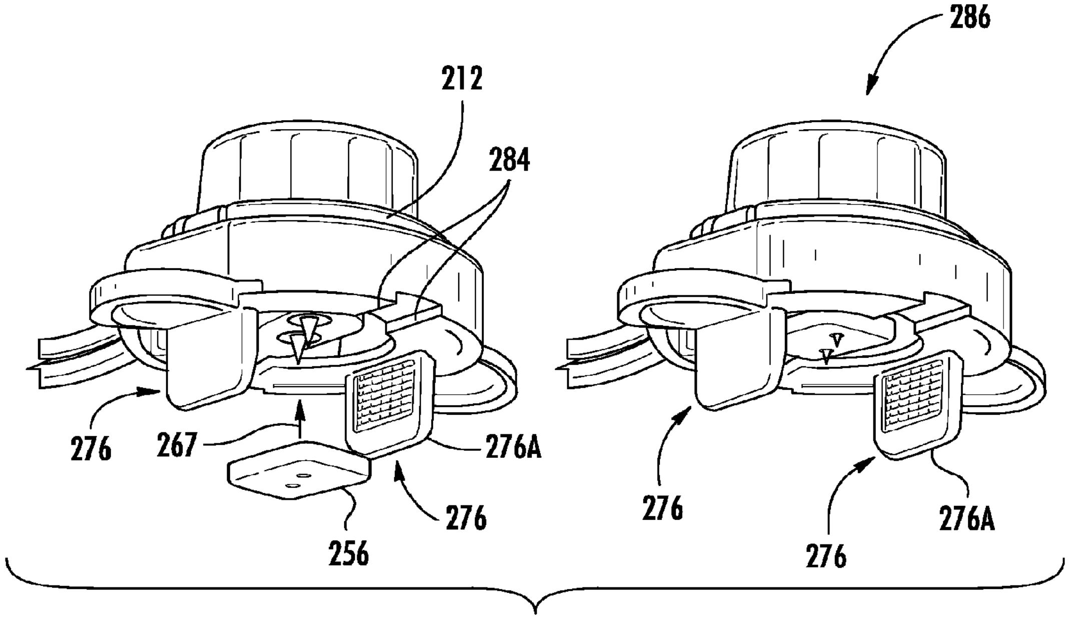

Referring now to FIG. 2H, the top clamp 207 is shown as part of the top cap assembly 282 from the underside. The top clamp 207 has two ribs 284 configured to provide a guide for a cable as the top cap assembly 282 couples with the cable tray 210. The gasket 256 is moved in the direction of arrow 267 in order to couple with the lower surface of the contact holder 212. The gasket 256 is configured to be pierced by the points 215 of the contacts 214 such that the contacts 214 protrude through the gasket 256, resulting in the top cap assembly 286.

Figure 2I:
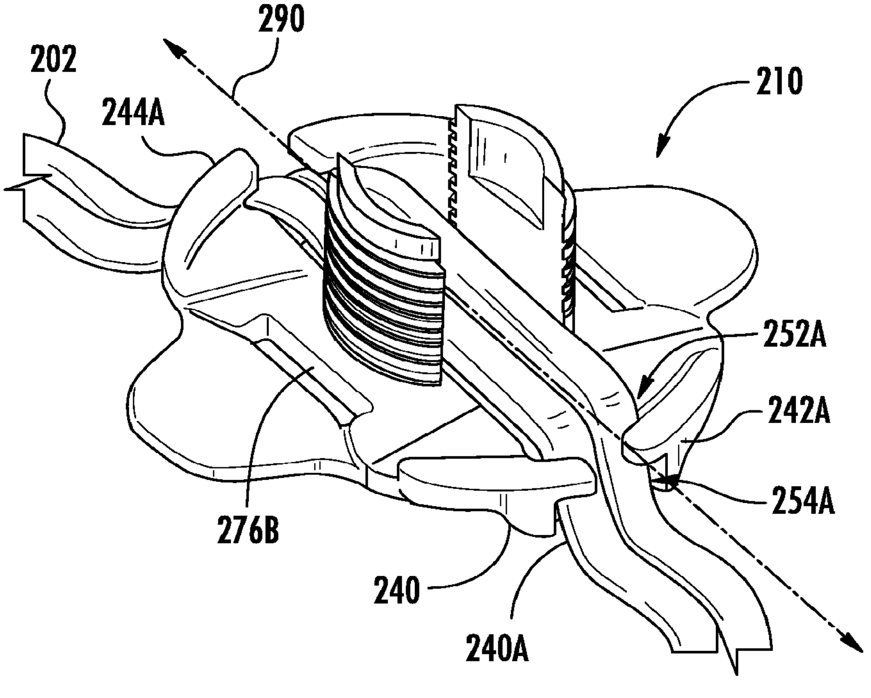
Figure 2J:
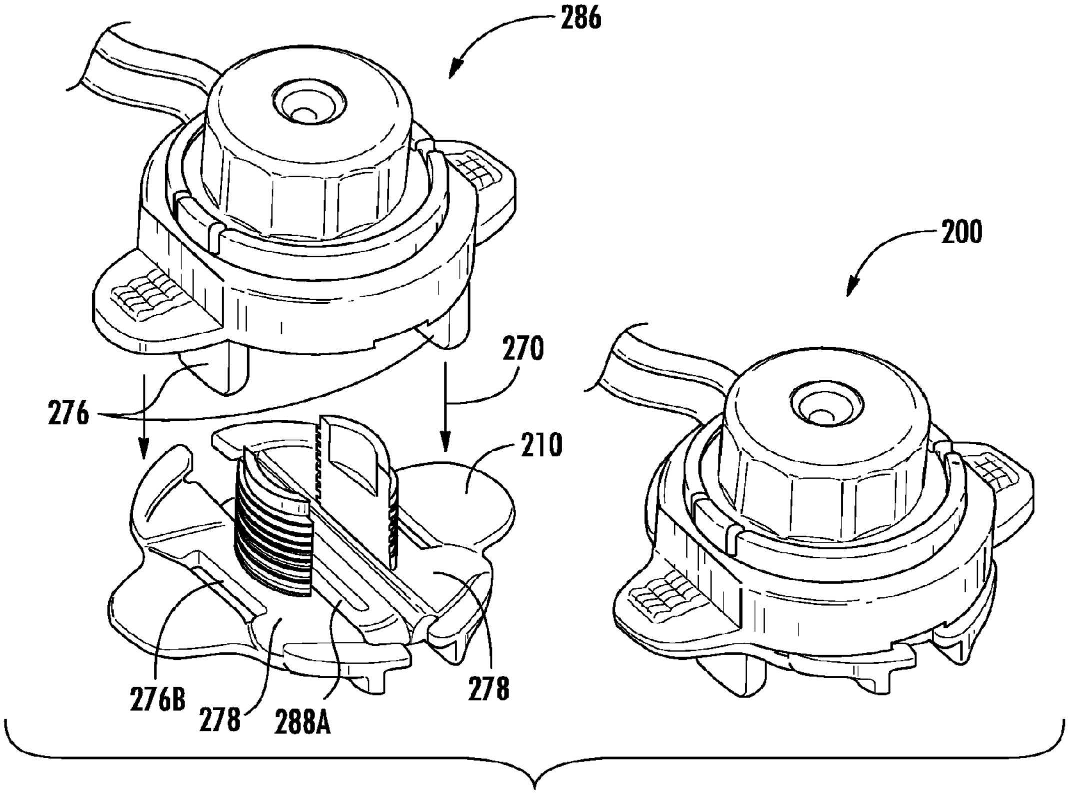
Figure 2K:
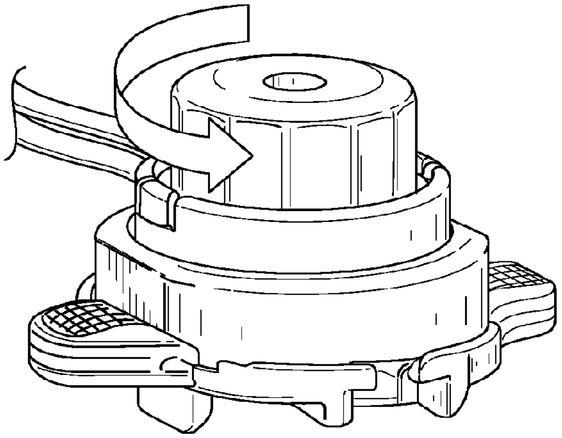

Referring now to FIG. 2I, the cable tray 210 is shown with a cable 202 attached. The cable 202 is disposed through a vertical aperture 254A as well as a horizontal aperture 252A. In the embodiment shown, the cable 202 is also disposed through a vertical aperture and a horizontal aperture on the other end of the cable tray 210. The cable 202 is further retained in the desired alignment within the cable tray 210 by a rib 288A (e.g., as shown in FIG. 2B) extending from an upper surface 288 of the cable tray 210 generally parallel (or aligned) with the longitudinal axis 290. Referring now to FIG. 2J, the top cap assembly 286 is coupled with the cable tray 210 as the top cap assembly 286 is moved in the direction of arrows 270. Alignment tabs 276 extend through apertures 278 as the top cap assembly 286 is coupled with the cable tray 210, thereby resulting in the connector 200. Referring now to FIG. 2K, the top cap 208 is rotated in the direction of arrow 294 in order to compress the gasket 256 and cause the contacts 214 to pierce the sheath of the cable 202 and establish an electrical connection with the conductive wires of the cable 202. The cable 202 has been omitted from FIGS. 2J and 2K to facilitate visualization of the component parts of the exemplary connector 200, but will be present in the cable tray 210 (as shown in FIG. 2I) when a connection is to be made using the connector 200.

Referring now to FIG. 2H, the alignment tabs 276 can be configured to include a series of ratchet teeth 276A on each tab 276. The ratchet teeth 276A can be provided on the inside surface of each alignment tab 276 (as shown in FIG. 2H) or can be located elsewhere on cable tray 210. As shown in FIGS. 2B, 2I and 2J, the cable tray 210 can include one or more tooth-engaging structures 276B (e.g., multiple tabs, multiple detents, a single tab, or the illustrated single detent) adapted to engage the ratchet teeth 276A as the alignment tabs 276 move through the apertures 278. The combination of ratchet teeth 276A and tooth-engaging structures 276B can be configured (e.g., as shown in FIGS. 2H and 2I) such that insertion of the alignment tabs 276 through the apertures 278 in the direction denoted by arrows 270 in FIG. 2J is facilitated whereas withdrawal of the alignment tabs 276 in the opposite direction is resisted or prevented. This interaction between the ratchet teeth 276A and the tooth-engaging structures 276B facilitates initial coupling of the top cap 208 with the cable tray 210 since it holds the joined components together (and in proper alignment) as the user moves his or her grip from the handles 274 to the top cap 208. This prevents (or reduces the likelihood) that the components of the connector 200 and/or the cable 202 will become misaligned or that the components will fall apart as the user adjusts his or her grip to couple the top cap 208 to the cable tray 210 and to begin manipulating the top cap 208 in the predetermined manner (e.g., rotating the top cap 208).

The cable tray 210 can include one or more fingers 240, 242, 244, and 246. The fingers 240, 242, 244, and/or 246, in some embodiments, include a portion extending generally or substantially parallel with the longitudinal axis 290 of the upper surface 288. Further, in some embodiments, one or more of fingers 240, 242, 244, and 246 include a second portion extending generally or substantially non-parallel with the longitudinal axis 290 of the upper surface 288. In the embodiment shown, the fingers 240, 242, 244, and 246 include both portions and the second portions extend generally perpendicular to the longitudinal axis 290 of the upper surface 288 and point toward the second portion of another one of the fingers 240, 242, 244, and 246. For example, finger 240 has a second portion 240A that generally points toward a second portion 242A of finger 242, and similarly, the second portion 242A of finger 242 generally points toward the second portion 240A of finger 240. The combination of the fingers, for example, fingers 240 and 242, is configured to assist in retaining the cable, such as cable 202 in a fixed position during coupling of the top cap 208 and the cable tray 210, during the predetermined manipulation of the top cap 208, and also after an electrical connection is established. In some embodiments, one or more of the fingers extend beyond one end (or edge) of the upper surface 288 of the cable tray for some distance longitudinally. In some such embodiments, one or more of the fingers 240, 242, 244, and 246 have a protrusion 240A, 242A, 244A, and 246A protruding to some extent in a transverse direction so that a cable-accommodating gap is defined between the protrusion(s) 240A, 242A and one end (or edge) of the upper surface 288 and another cable-accommodating gap is defined between the protrusions 244A, 246A and the other end (or edge) of the upper surface 288.

Figure 3A:
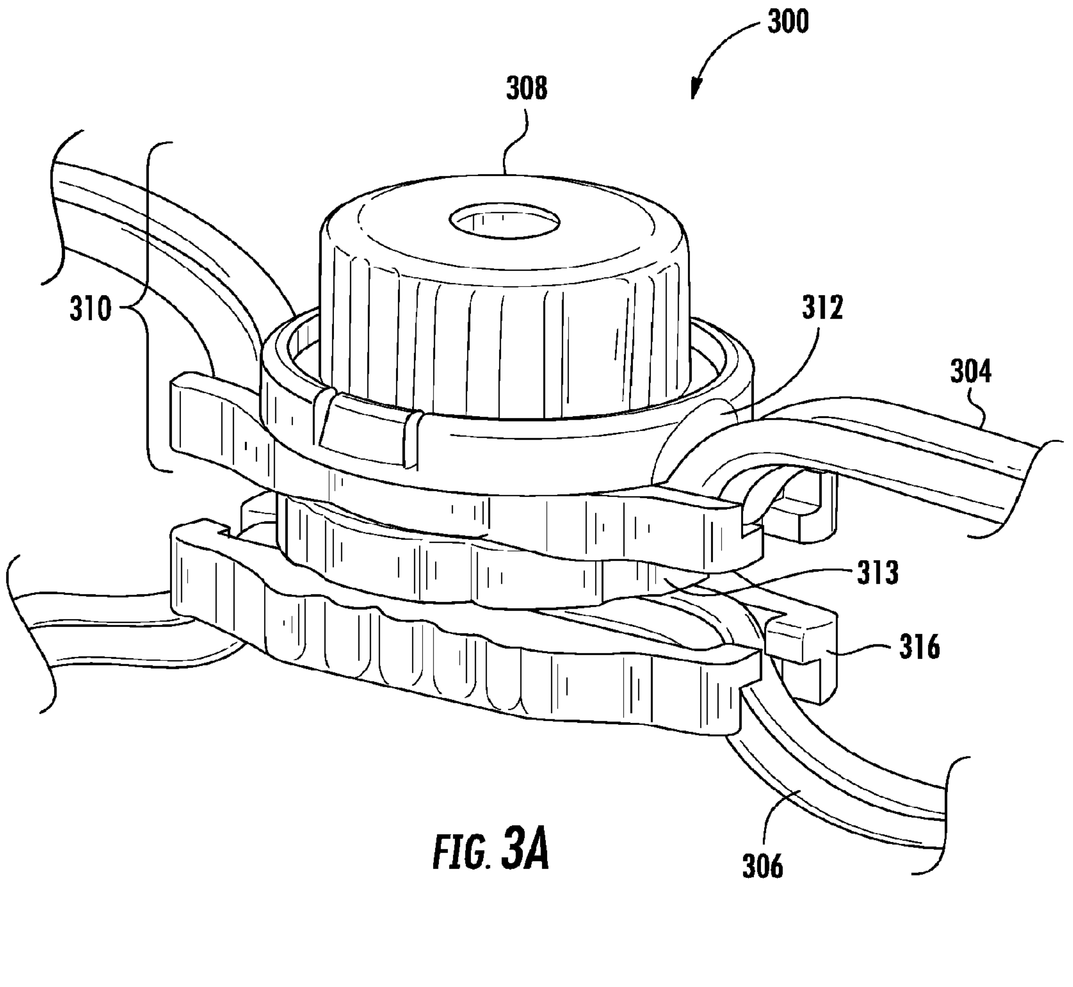
Figure 3B:
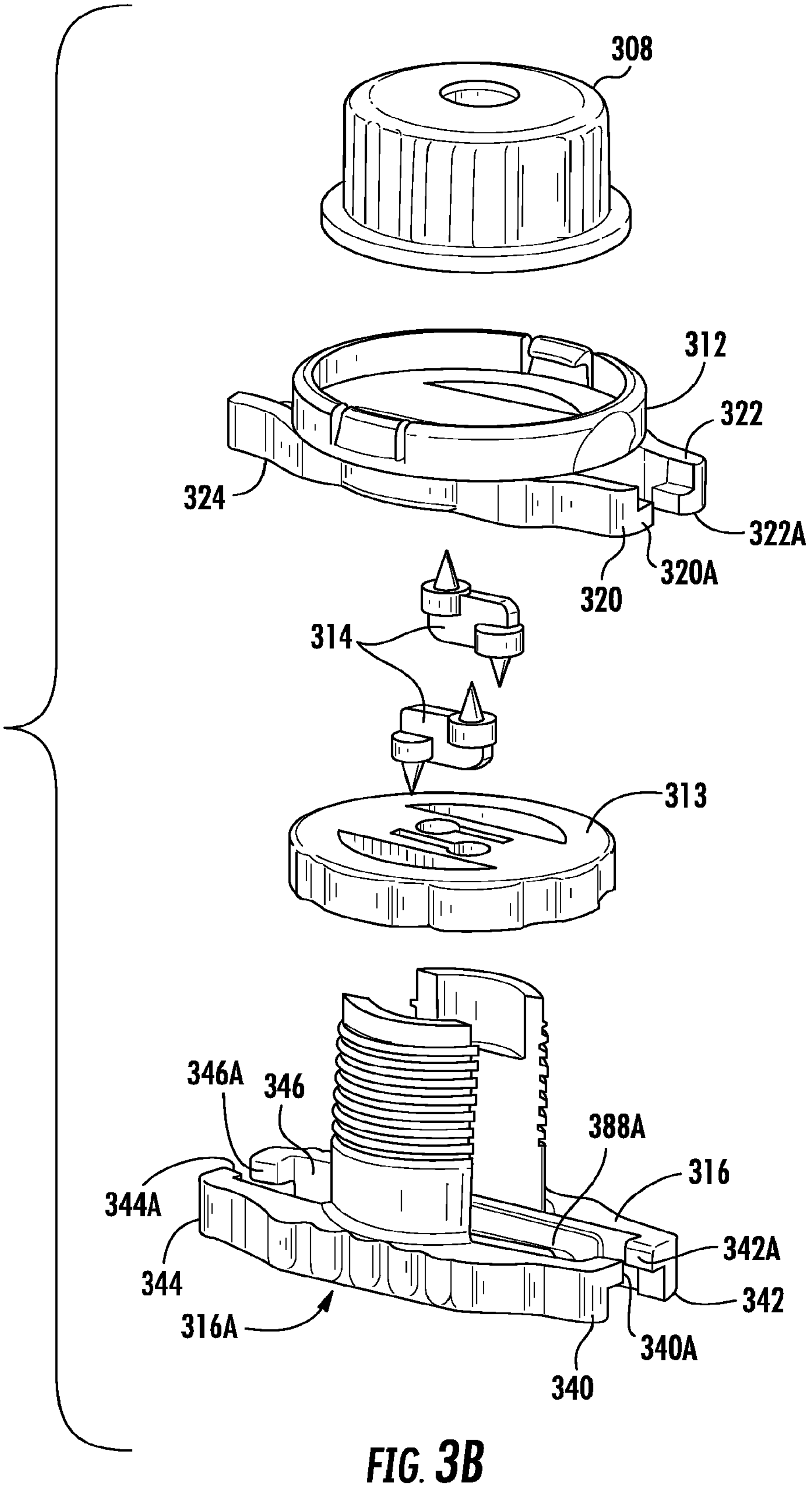

Referring now to FIGS. 3A-3I, a connector 300 according to another embodiment of the invention is shown. Referring now to FIGS. 3A and 3B, the connector 300 is configured to provide an electrical connection between two cables, such as cables 304 and 306. The connector 300 includes a top cap 308 coupled with a top clip 312 configured to retain a cable 304. The top cap 308 and the top clip 312 together are referred to as a top assembly 310. A contact holder can be provided in the form of a contact disc 313 which is configured to receive and retain one or more contacts 314. The contact holder can be implemented using shapes other than disc shapes.

A cable tray 316 is configured for receiving and retaining another cable 306. The cable tray 316 is similar to or identical to the cable tray 110 of FIG. 1A. Referring now to FIG. 3C.1, connector 300 is shown in use as a cable span lengthener. The exemplary use shown in FIG. 3C.1 allows two cables to be electrically coupled to deliver electrical power over a distance that is greater than the length of each individual cable. Additional distances can be accommodated using additional cable spans and additional connectors 300. Referring now to FIG. 3C.2, connector 300 is shown in use to create a branch line off of a primary power supply line. Referring now to FIG. 3C.3, connector 300 is shown in use to run two electrically parallel power lines, which facilitates, for example, distribution of power from one power source to electrical devices located in three or more directions away from the power source.

Figure 3D:
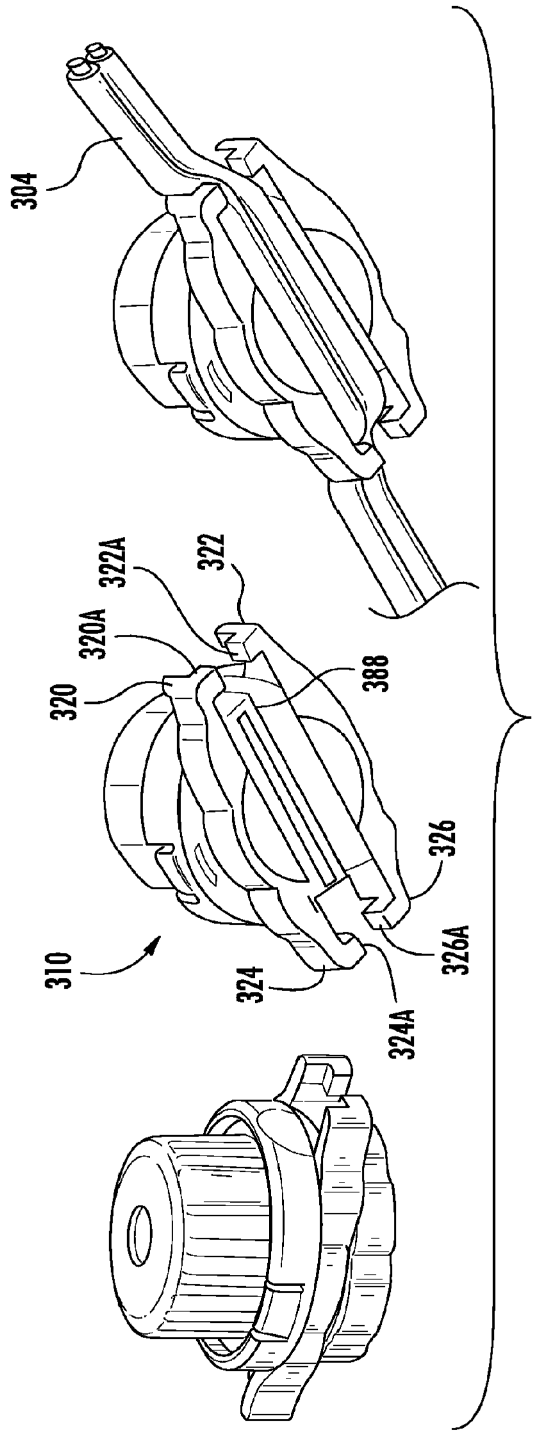
Figure 3E:
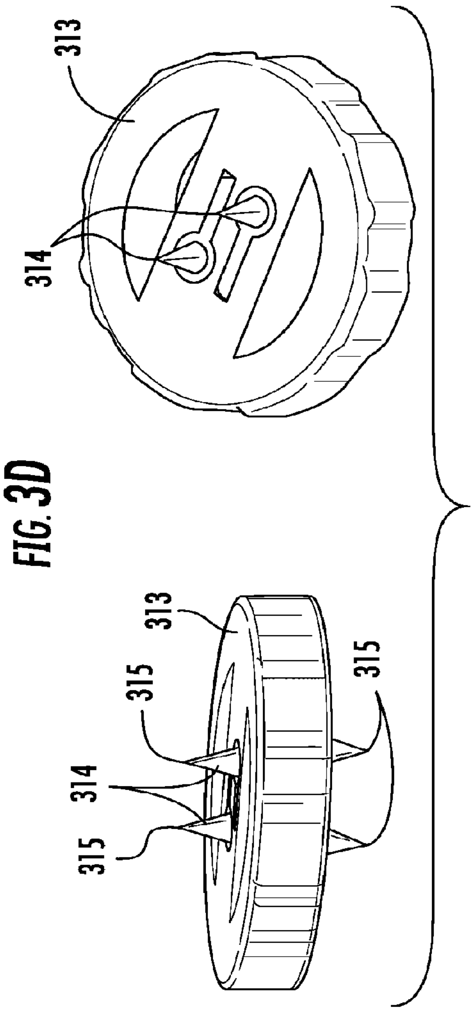

Referring now to FIG. 3D, the top assembly 310 is shown from various angles. The top clip 312 receives and retains a cable 304 in a similar fashion as the cable tray 110 of FIG. 1A in that the top clip has fingers 320, 322, 324, and 326. In various embodiments, such as the embodiment shown, one or more of the fingers 320, 322, 324, and 326 define both a vertical and a horizontal aperture on one or both ends (or edges) of the top clip 312. One or more of the fingers 320, 322, 324 and 326 can include a protrusion 320A, 322A, 324A, and 326A protruding to some extent in a transverse direction so that a cable-accommodating gap is defined between the protrusion(s) 320A, 322A and one end (or edge) of a cable-facing surface 388 and another cable-accommodating gap is defined between the protrusions 324A, 326A and the other end (or edge) of the cable-facing surface 388. This configuration assists in retaining the cable 304 during coupling of the top assembly 310 with the contact disc 313 and/or during manipulation of the top cap 308 in a predetermined manner (e.g., by rotating the top cap 308 so that it threadedly tightens against the cable tray 316 and/or top clip 312). The top clip 312, in this regard, constitutes a cable tray with a cable-facing surface 388 that faces away from the top cap 308, but which otherwise can be similar or identical to the cable tray 110 or 316. Referring now to FIG. 3E, the contact disc 313 is shown from different angles. The contacts 314, in this embodiment, are disposed within the contact disc 313 such that points 315 are exposed on both sides of the contact disc 313, thereby allowing coupling and establishing electrical connections with two cables, one on each side of the contact disc 313.

Figure 3F:
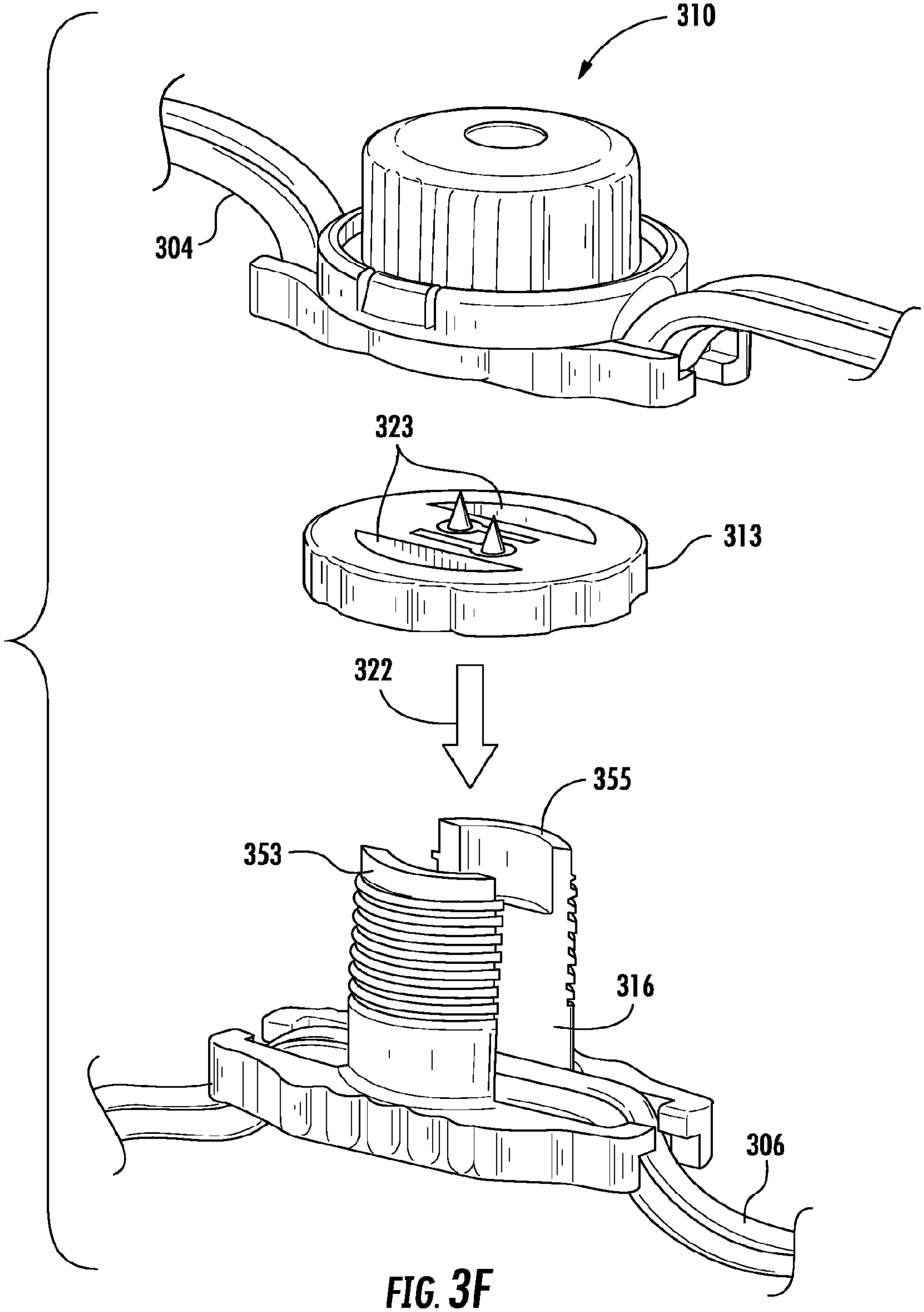
Figure 3G:
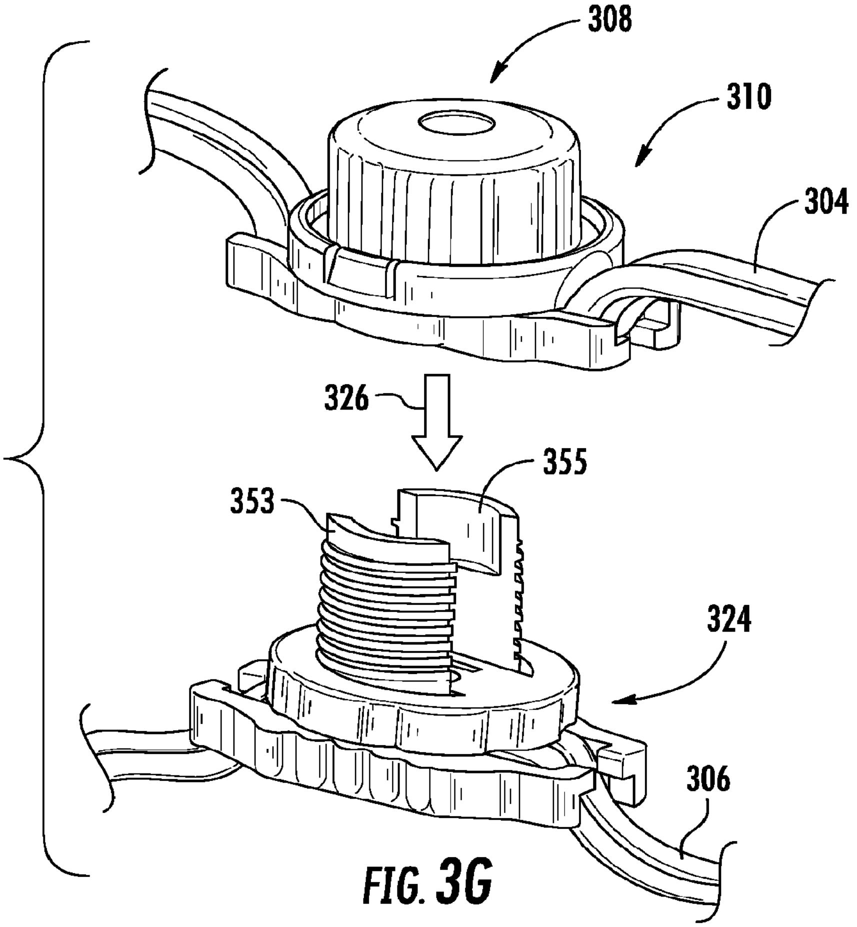
Figure 3H:
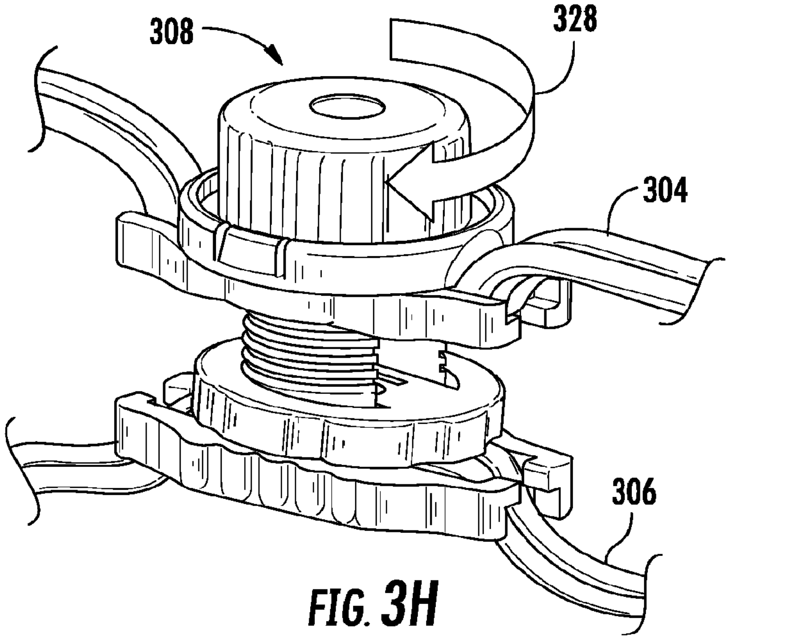
Figure 3I:
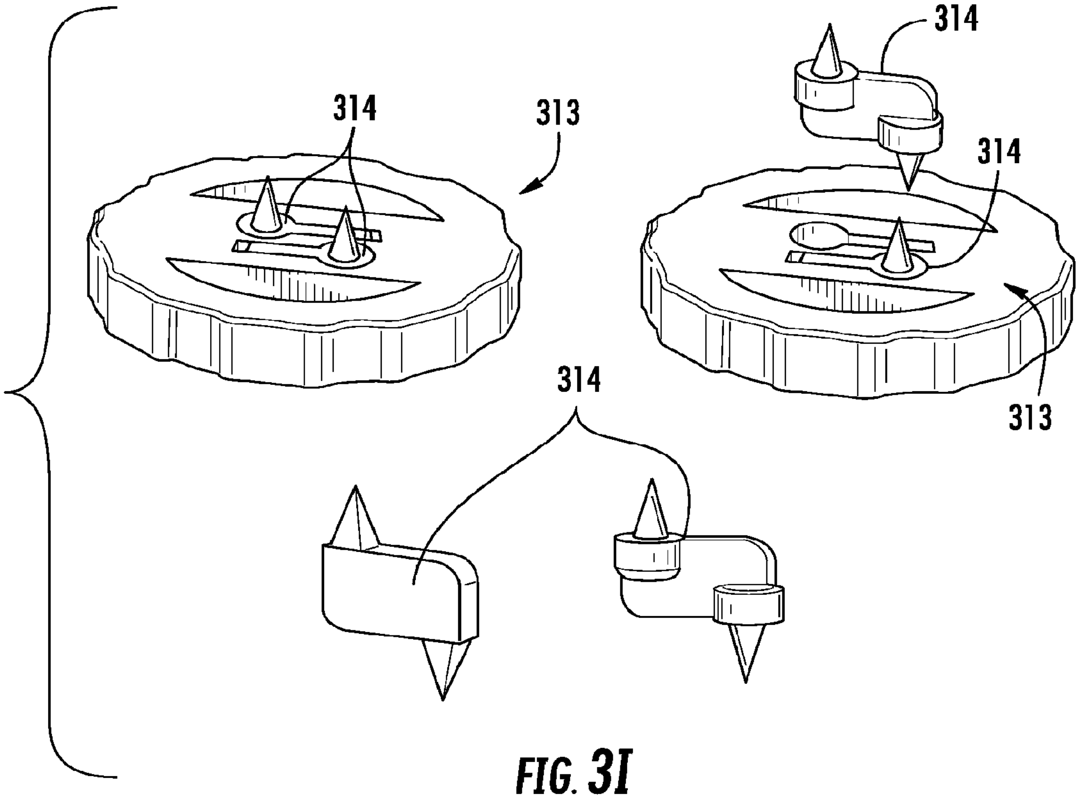

Referring now to FIG. 3F, the top assembly 310, the contact disc 313, and the cable tray 316 are shown in preparation for coupling with one another. First, the contact disc 313 is coupled with the cable tray 316 in the direction of arrow 322. The engagement members 353 and 355 of the cable tray 316 go through apertures 323 defined by the contact disc 313, thereby resulting in the bottom assembly 324 as shown in FIG. 3G. The top assembly 310 is coupled with the bottom assembly 324 as it is moved in the direction of arrow 326. Once the top cap 308 engages the engagement members 353 and 355, the user can manipulate the top cap 308 in the predetermined manner (e.g., by rotating the top cap 308 in the direction of arrow 328 as shown in FIG. 3H) in order to complete the coupling between the top assembly 310 and the bottom assembly 324. During the coupling and/or manipulation in the predetermined manner, the contacts 314 pierce the sheaths of both cables 304 and 306 such that an electrical connection is established among the cable 304, at least one of the contacts 314 and the cable 306 (e.g., an electrical connection can be established from each conductor in one of the cables 304,306, via a respective contact 314, to a respective conductor in the other cable 304 or 306). The connector 300 thus can be used to electrically connect the two cables 304 and 306 while the cable tray 316 and the top clip 312 (and the cable tray defined by at least the cable-facing surface 388 of the top clip 312) are in a stacked configuration. Referring now to FIG. 3I, alternate embodiments of the contacts 314 are shown.

Referring now to FIG. 3B, the cable tray 316 (and other parts of the connector 300) can include gripping features 316A (e.g., ribbing, protrusions, parallel grooves) that provide a better grip for the user during manipulation of the connector 300, than might otherwise be provided by a flat surface.

The cable tray 316 receives and retains a cable 306 in a similar fashion as the cable tray 110 of FIG. 1A in that the cable tray 316 has fingers 340, 342, 344, and 346. In various embodiments, such as the embodiment shown, one or more of the fingers 340, 342, 344, and 346 define both a vertical and a horizontal aperture on one or both ends (or edges) of the cable tray 316. One or more of the fingers 340, 342, 344 and 346 can include a protrusion 340A, 342A, 344A, and 346A protruding to some extent in a transverse direction so that a cable-accommodating gap is defined between the protrusion(s) 340A, 342A and one end (or edge) of an upper surface 388A of the cable tray 316 and another cable-accommodating gap is defined between the protrusions 344A, 346A and the other end (or edge) of the upper surface 388A. This configuration assists in retaining the cable 306 during coupling of the cable tray 316 with the top cap 308, top clip 312, and/or contact disc 313 and/or during manipulation of the top cap 308 in a predetermined manner (e.g., by rotating the top cap 308 so that it threadedly tightens against the cable tray 316 and/or top clip 312).

Figure 4A:
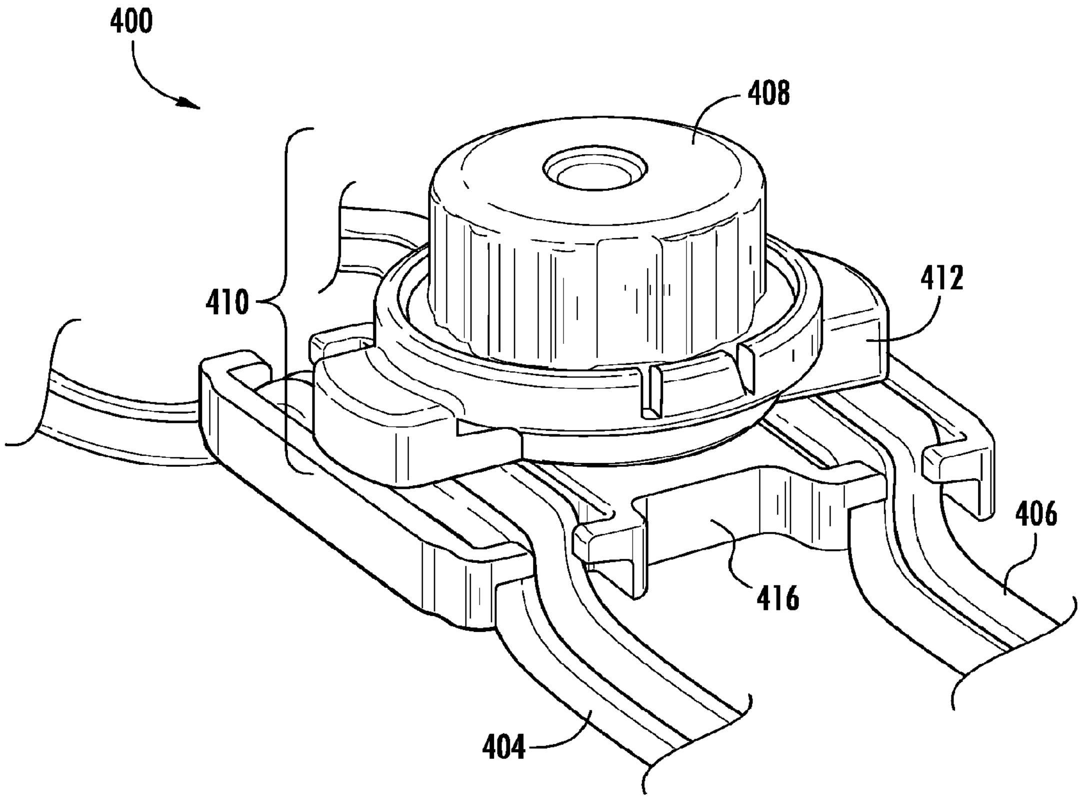
Figure 4B:
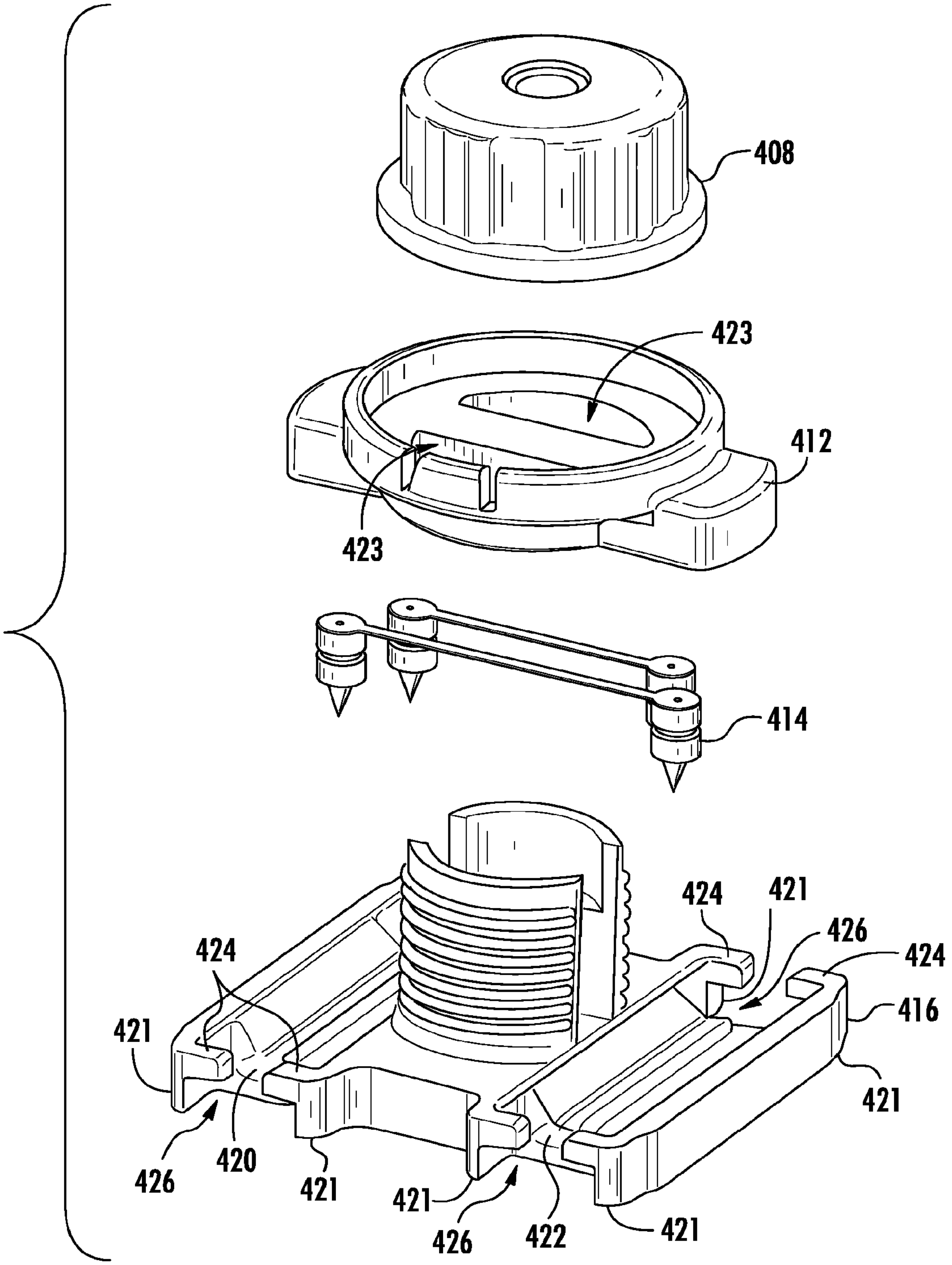

Referring now to FIG. 4A, a connector 400 in accordance with another embodiment of the invention is shown. The connector 400 is configured to provide an electrical connection between two cables, such as cables 404 and 406. A top cap 408 and a contact housing 412 together form a cap assembly 410 configured for retaining contacts 414 (shown in FIG. 4B) and coupling with a cable tray 416. Referring now to FIG. 4B, various components of the connector 400 are shown. The top cap 408 fits into the contact holder 412 in a manner similar to the other embodiments discussed above. The contact holder 412 receives and retains contacts 414 such that each of the contacts 414 is positioned to engage a respective aspect of one of the cables 404,406 when the cap assembly 410 couples with the cable tray 416 and/or the top cap 408 is manipulated in a predetermined manner (e.g., by rotating the top cap 408 in the direction of arrow 432 in FIG. 4F). In this embodiment, the cable tray 416 includes two elongate platforms 420 and 422 each configured for receiving and retaining a cable, such as cables 404 and 406. In this embodiment, both elongate platforms 420 and 422 have fingers 421 extending from the ends of the elongate platforms 420 and 422. Each of the fingers 421 can include a protrusion 424 that protrudes to some extent in a transverse direction so that a cable-accommodating gap is defined between the protrusion 424 and one end (or edge) of the elongate platform 420 or 422. The protrusions 424, together with the ends (or edges) of the elongate platforms 420 and 422, can define apertures 426 having both vertical and horizontal components, similar to the apertures defined by the fingers of the above-described embodiments. The apertures 426 are configured to receive and assist in retaining the cables 404,406 such that when the cable tray 416 is coupled with the cap assembly 410 and/or manipulated in the predetermined manner, the contacts 414 are positioned such that they pierce the sheaths of the cables 404,406, thereby establishing an electrical connection with corresponding conductive wires of the cables 404,406. Each such connection is established from one cable 404, through at least one of the contacts 414, to the other cable 406. If each cable 404,406 contains multiple conductive wires, an electrical connection can be established from each conductor wire in one of the cables 404,406, via a respective contact 414, to a respective wire in the other cable 404 or 406.

Referring now to FIG. 4C.1-4C.3, several uses for the connector 400 are shown. In FIG. 4C.1, the connector 400 is shown providing a connection between a cable 406 that ends near the beginning of another cable 404 such that cable 406 can be extended by cable 404, for example, to reach a fixture outside the normal reach of cable 406. The exemplary use shown in FIG. 4C.1 allows two cables to be electrically coupled to deliver electrical power over a distance that is greater than the length of each individual cable. Additional distances can be accommodated using additional cable spans and additional connectors 400. FIG. 4C.2 illustrates the connector 400 in use to create a cable 406 used as a branch line from a cable 404 used as a main power line. In FIG. 4C.3, the connector 400 is shown in use to run two electrically parallel power cables 404 and 406, which facilitates, for example, distribution of power from one power source to electrical devices located in three or more directions away from the power source.

Figure 4D:
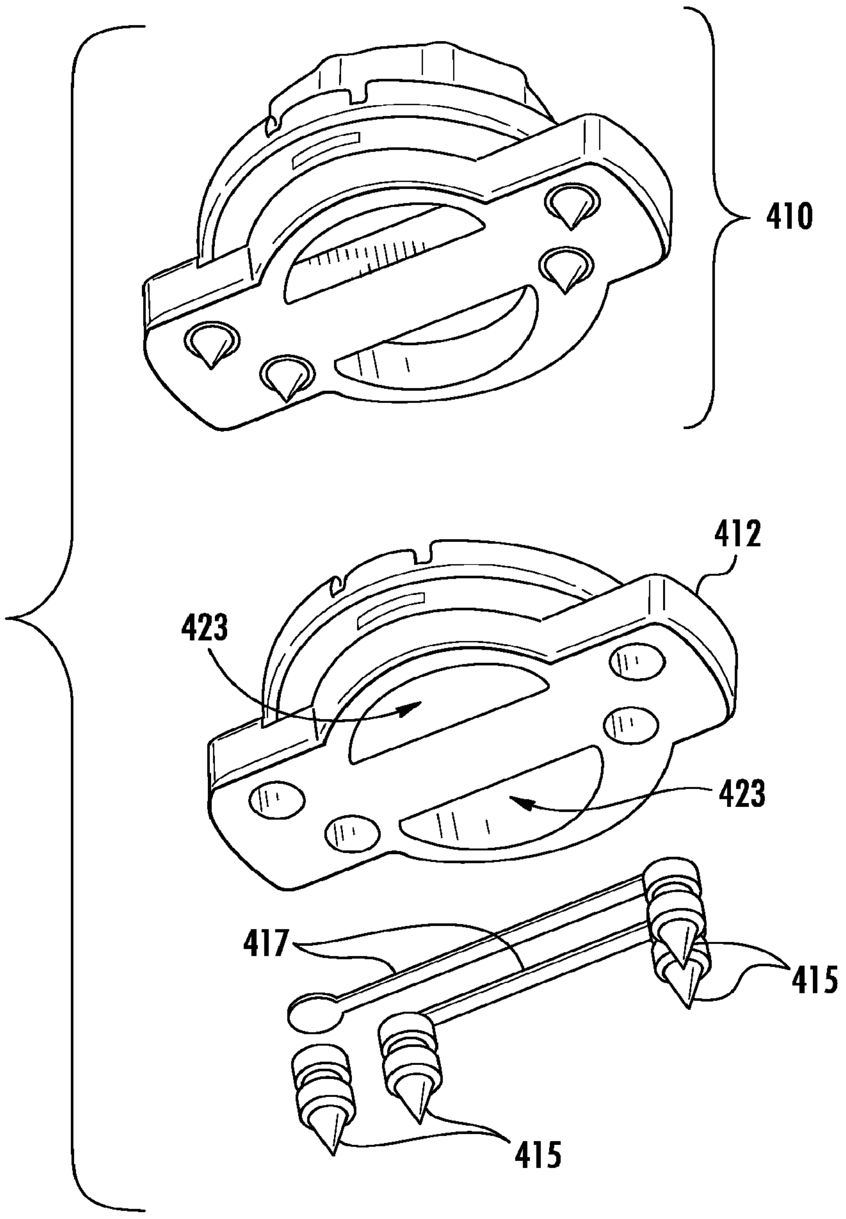
Figure 4E:
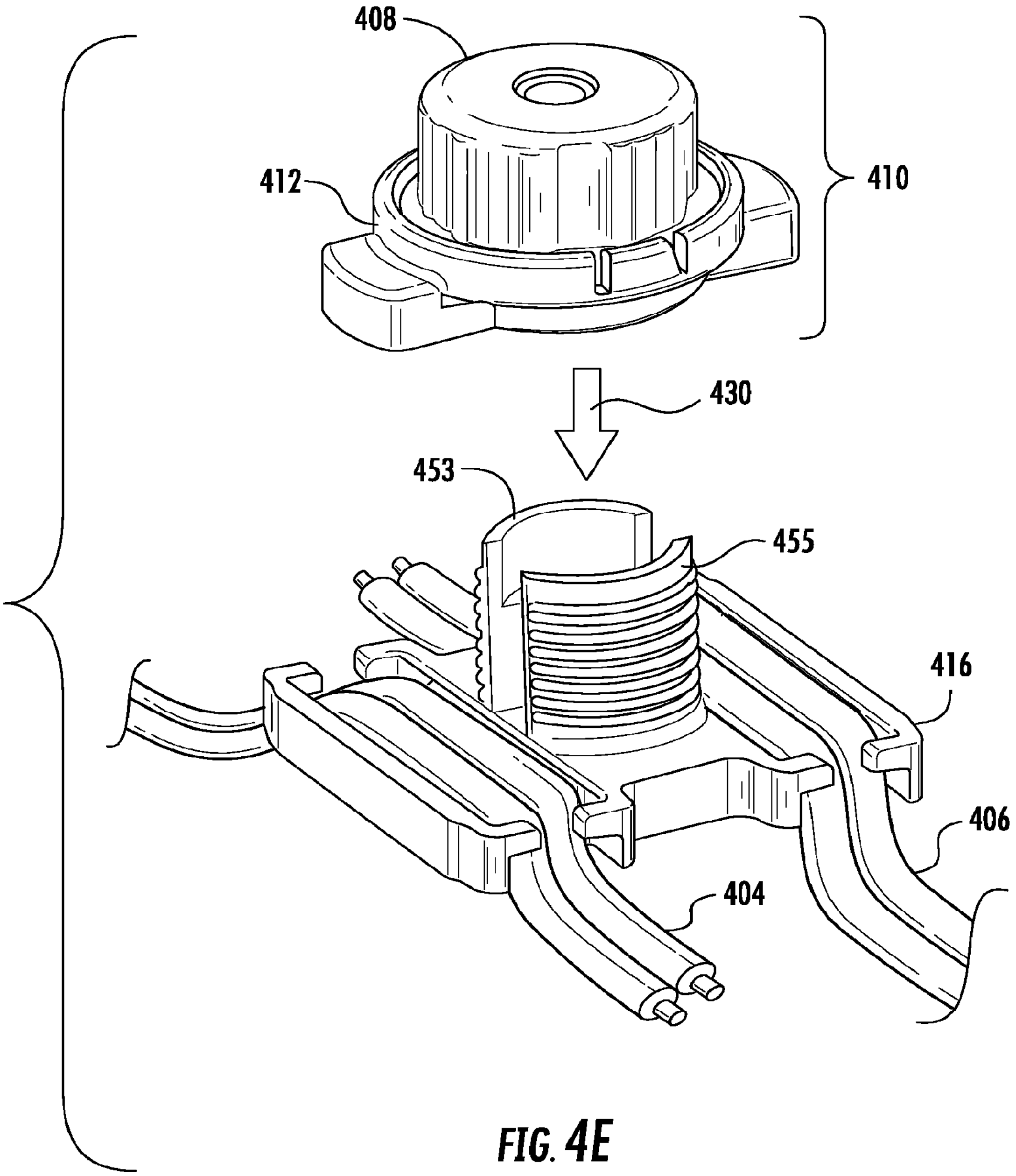

Referring now to FIG. 4D, the cap assembly 410 in its entirety as well as the contact holder 412 and the contacts 414 are shown individually from the bottom. In the embodiment shown, the contacts 414 include conical metal points 415 coupled with sheet metal bridges 417 both of which are insert molded into the contact housing 412. In other embodiments, the contacts 414 are continuous without separate components. As illustrated in FIGS. 4D and 4E, the contact holder 412 includes one or more apertures 423 configured to receive the engagement members 453,455 of the cable tray 416 such that the top cap 408 can be coupled with the cable tray 416 engagement members 453,455.

Figure 4F:
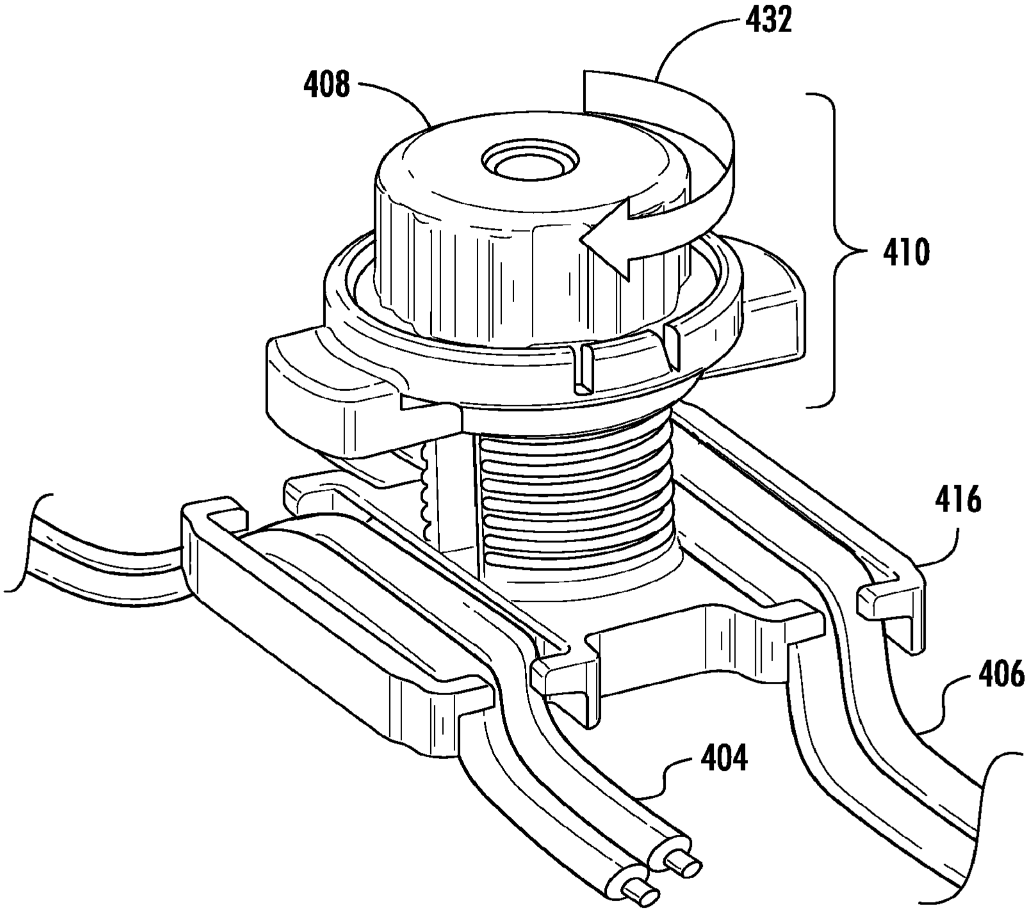

Referring now to FIG. 4E, once the cap assembly 410 is finished and the cables 404 and 406 are installed in the cable tray 416, the cap assembly 410 is moved in the direction of arrow 430 in order to couple the cap assembly 410 with the cable tray 416. As the cap assembly 410 couples with the cable tray 416, the engagement members 453 and 455, as discussed above with reference to other embodiments, pass through the contact holder 412 and engage the top cap 408. As shown in FIG. 4F, the top cap 408 is then manipulated in the predetermined manner (e.g., is rotated in the direction of arrow 432) so that the top cap 408 secures the cap assembly 410 to the cable tray 416. As the top cap 408 is rotated to engage the threads of the engagement members 453 and 455 more tightly, the contact holder 412 presses toward the cables 404 and 406 and the contacts 414 pierce the sheaths of the cables 404 and 406, thereby establishing electrical connections with the respective conductive wires of the cables 404 and 406. An electrical connection can be established in this manner from each conductor in one of the cables 404,406, via a respective contact pair 414 and interconnecting metal bridge 417, to a respective conductor in the other cable 404 or 406).

Figure 5A:
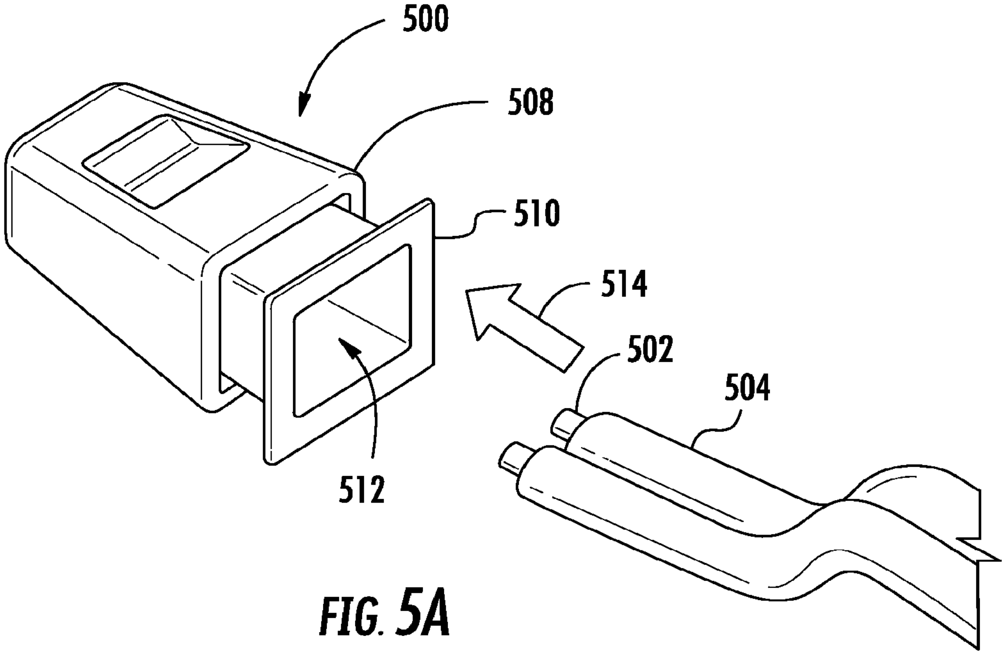
Figure 5B:
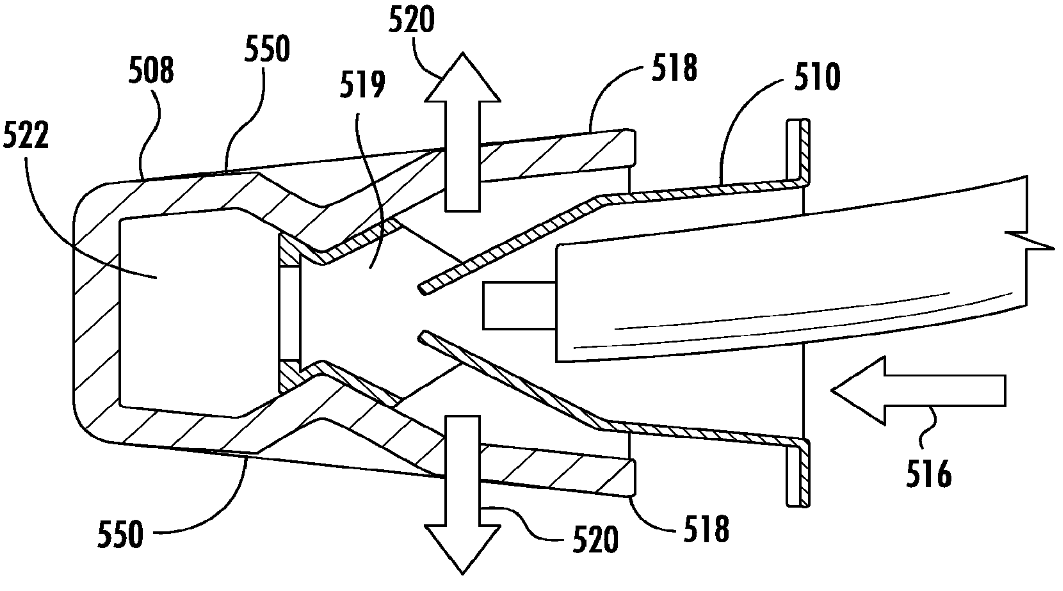

Referring now to FIGS. 5A-5F, a cable end cap 500 in accordance with embodiments of the invention is shown. Referring to FIG. 5A, the cable end cap 500 is configured to receive and secure an end 502 of a cable 504. The cable end cap 500 includes a housing 508 and a spring clip 510 configured to couple with the housing 508. The spring clip 510 defines, at least partially (e.g., by itself or in combination with the housing 508), an aperture 512 through which the end 502 may be inserted, for example, by moving the cable 504 in the direction of arrow 514. As the cable 504 is moved through the spring clip 510 and into the housing 508 as shown in FIG. 5B in the direction of arrow 516, spring tabs 518 of the spring clip 510 are pressed outward, that is, in the direction of arrows 520, thereby allowing the end 502 of the cable 504 to pass between the spring tabs 518 and into the housing 508. An insert 519 is configured to receive the end 502 of the cable 504 as it is inserted into the housing 508. In some embodiments, as shown, the housing 508 is filled with a nonconductive material 522, such as silicone.

Figure 5C:
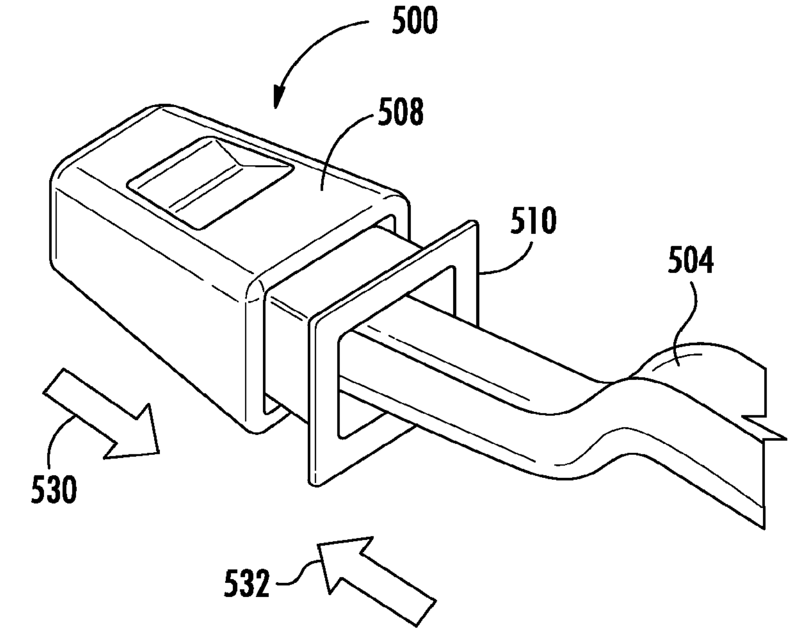
Figure 5D:
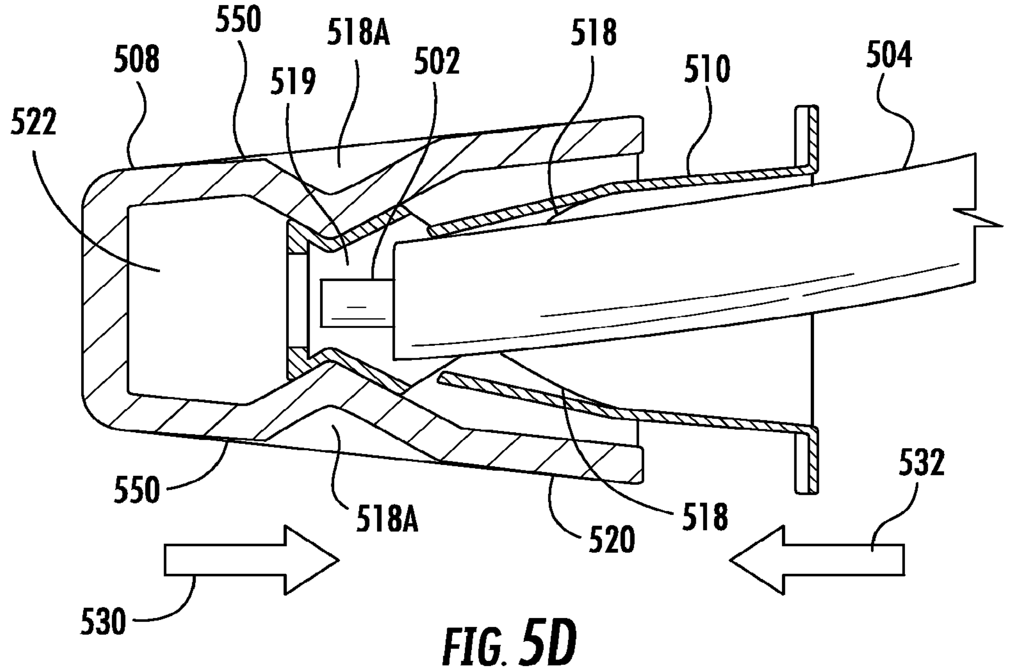
Figure 5E:
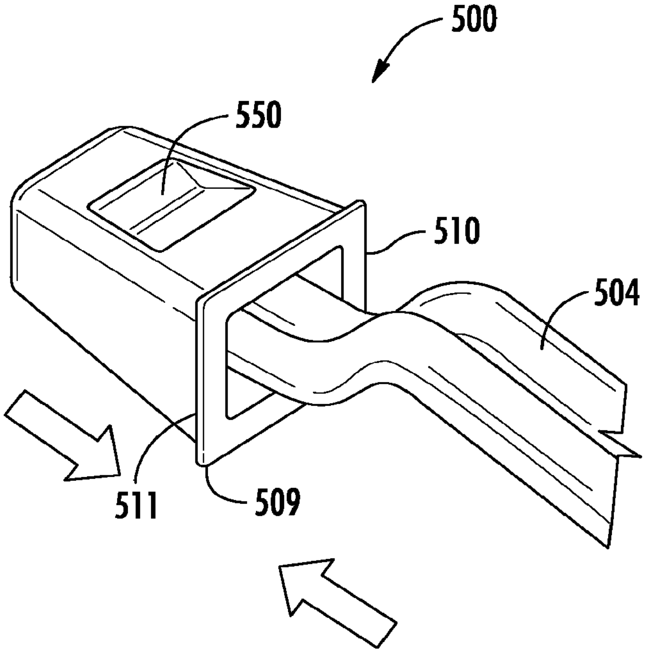

As shown in FIG. 5D, as the spring clip 510 and cable 504 are moved in the direction of arrow 532 with respect to the housing 508 and/or the housing 508 is moved in the direction of arrow 530 with respect to the spring clip 510, the end 502 of the cable 504 moves further inside the housing 508, along with the spring tabs 518. Referring now to FIG. 5E, the cable end cap 500 is shown with the end of the cable 504 secured inside the housing 508 of the cable end cap 500. In the position shown, the spring clip 510 is seated completely with respect to the housing 508 such that a rim 509 of the spring clip 510 rests against an edge 511 of the housing 508. Notably, one or more detents 550 are formed in the housing 508, and in the embodiment shown, the detents 550 are visible from the exterior of the housing 508. The detents 550, in this embodiment are configured to provide additional grip for a user manipulating the housing 508, for example, during movement of the housing 508 in relation to the spring clip 510 as discussed above. The insert 519, in some embodiments, is configured to pass over the detents 550 inside the housing 508 as the cable 504 is inserted, thereby assisting passage of the cable 504 over the detents 550.

Figure 5F:
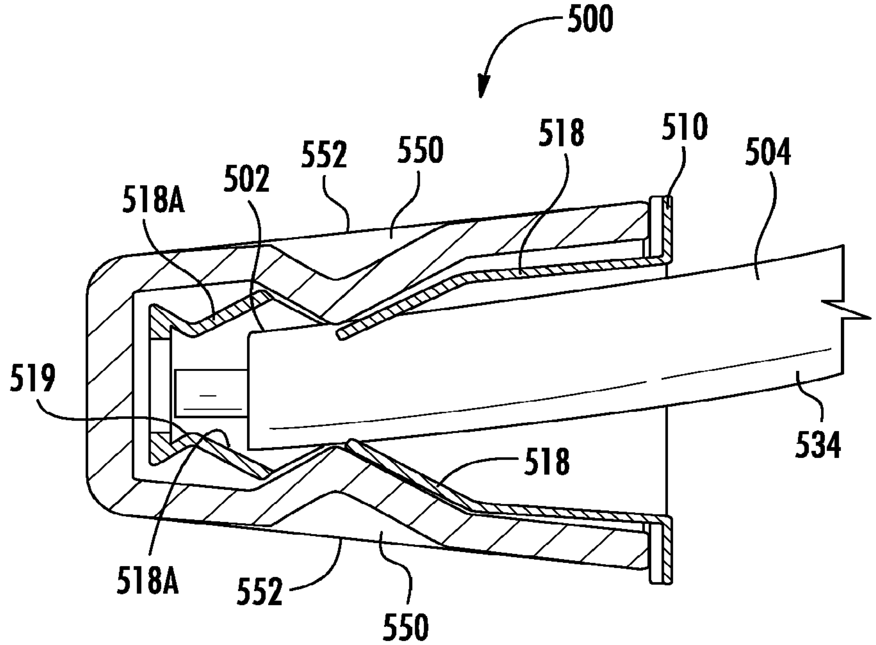

Referring now to FIG. 5F, the interior of the cable end cap 500 is shown. The end 502 of the cable 504 has been secured within the housing 508 of the cable end cap 500. The spring clip 510 is arranged so as to apply a compression force to the cable 504 after the cable end 502 is inserted through the aperture 512 and into the insert 519. For example, as the cable 504 and the spring clip 510 were moved in relation to the housing and/or the housing was moved in relation to the cable 504 and the spring clip 510, as illustrated in FIGS. 5C and 5D, the spring tabs 518 were compressed (or pressed toward one another) by the detents 550 formed in the sides of the housing 508. This pressing force was translated to the cable 504, thereby securing the end 502 of the cable 504 within the spring clip 510. In some embodiments, such as the embodiment shown, the ends 552 of the spring tabs 518 are configured to apply additional resistance to removal of the cable 504 from the housing 508, such as by grabbing the sheath 534 of the cable 504. For example, in the embodiment shown, the ends 552 of the spring tabs 518 are pointed such that they bite or depress and engage the sheath 534 of the cable 504. The spring tabs 518 are also angled such that the spring tabs 518, having engaged the sheath 534 apply a force against removal of the cable 504 from the housing 508. Therefore, in the illustrated embodiment, the one or more spring tabs 518 are arranged so that, when the housing 508 is in a first position with respect to the spring clip 510 (for example, the position shown in FIG. 5D), the aperture 512 allows the end 502 of the cable 504 to be inserted into the housing 508 and past the spring tab 518, and when the housing 508 is in a second position with respect to the spring clip 510 (for example, the position shown in FIG. 5F), the one or more spring tabs 518 are urged in a direction that constricts the aperture 512 more than when the housing 508 is in the first position, to apply a compression force to the cable 504. Notably, in some embodiments, such as the illustrated embodiment, the spring clip 510 can be configured so that a greater amount of the spring clip 510 is disposed outside the housing 508 when the housing 508 is in the first position than in the second position.

As shown in FIGS. 5D and 5F, the insert 519 can be equipped with one or more detent-engaging tabs 518A, each of which can be flexed inwardly by a respective detent 550 as the spring clip 510 is pushed deeper into the housing 508 (e.g., from the position shown in FIG. 5D to the position shown in FIG. 5F) and that can snap back outwardly as they pass beyond an inner-most extreme of the respective detent 550. After the insert 519 reaches the position shown in FIG. 5F, the one or more detent-engaging tabs 518A resist or prevent removal of the spring clip 510 from the housing 508, and the one or more tabs 518 resist or prevent removal of the end 502 of the cable 504 from inside the housing 508 and spring clip 510. The cable end 502, in this manner, can be retained securely inside the cable end cap 500.

Figure 6A:
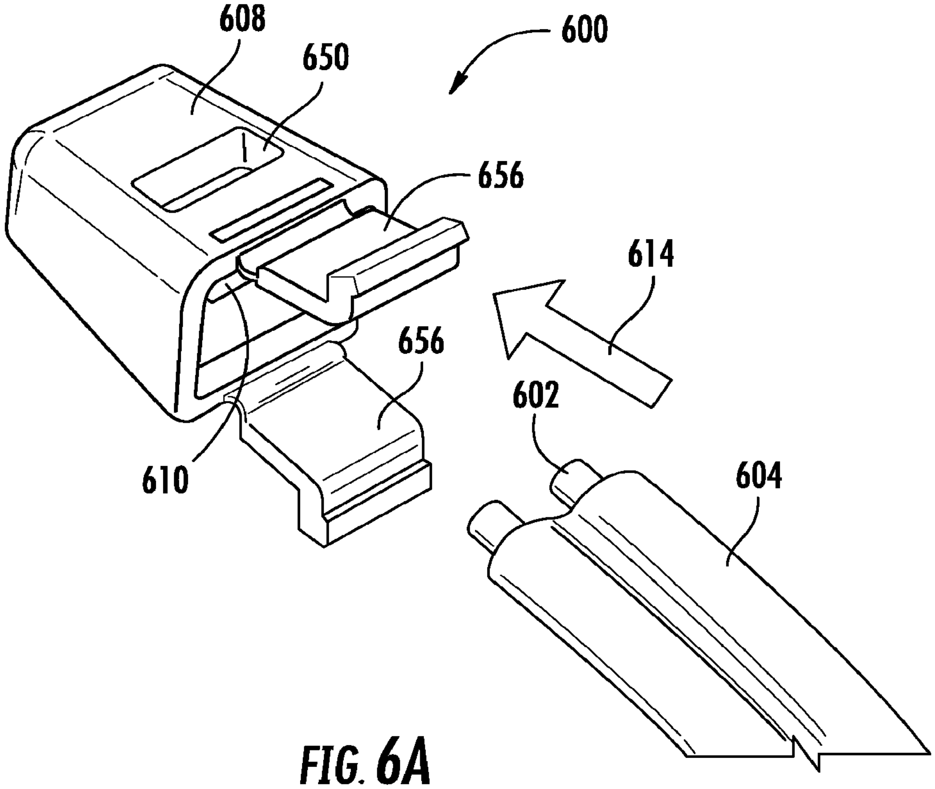
Figure 6B:
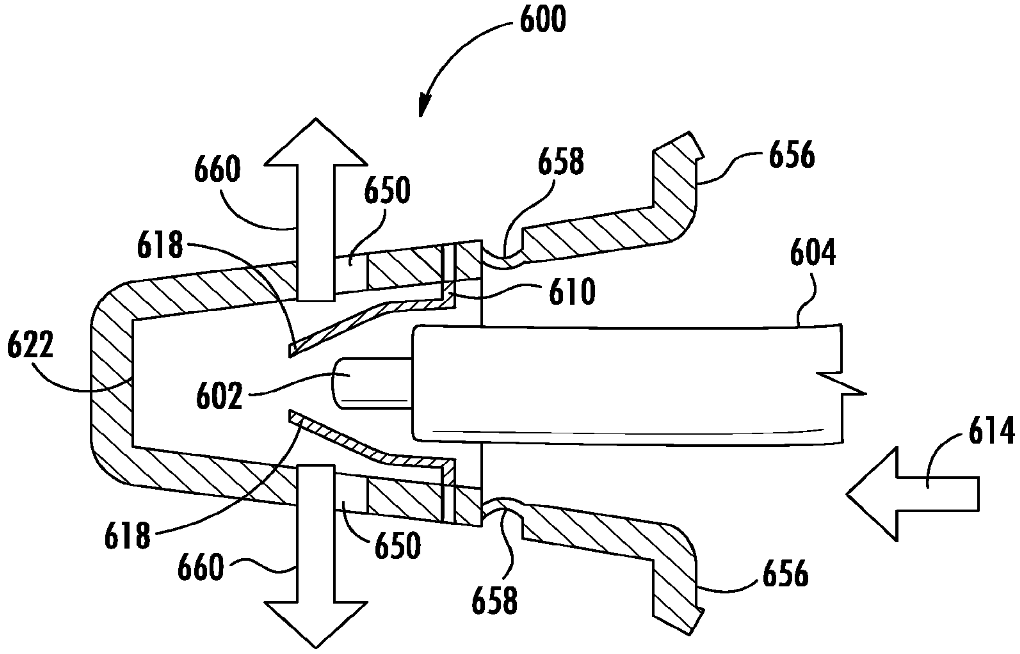

Referring now to FIGS. 6A-6F, a cable end cap 600 in accordance with embodiments of the invention is shown. In FIGS. 6A and 6B, the cable end cap 600 includes a housing 608 defining one or more apertures 650 for receiving one or more snaps 656 that are attached to the housing 608 by hinges 658. The housing is coupled with a spring clip 610 having one or more spring tabs 618. As the cable 604 is moved in the direction of arrow 614, the end 602 of the cable 604 enters the housing 608 and causes the spring tabs 618 to move in the direction of arrows 660. In some embodiments, such as the embodiment shown, the end 602 of the cable 604 enters the interior of the housing 608 and is surrounded by a nonconductive material 622 such as silicone.

Figure 6C:
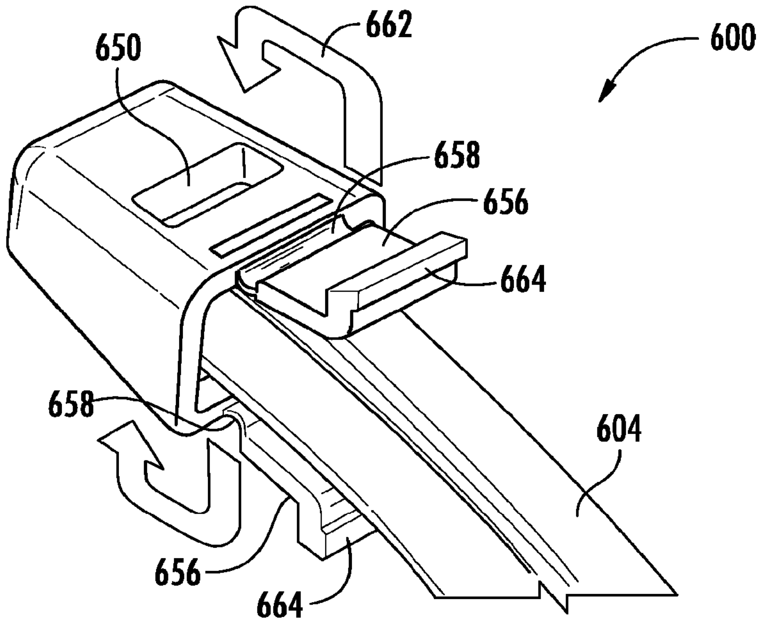
Figure 6D:
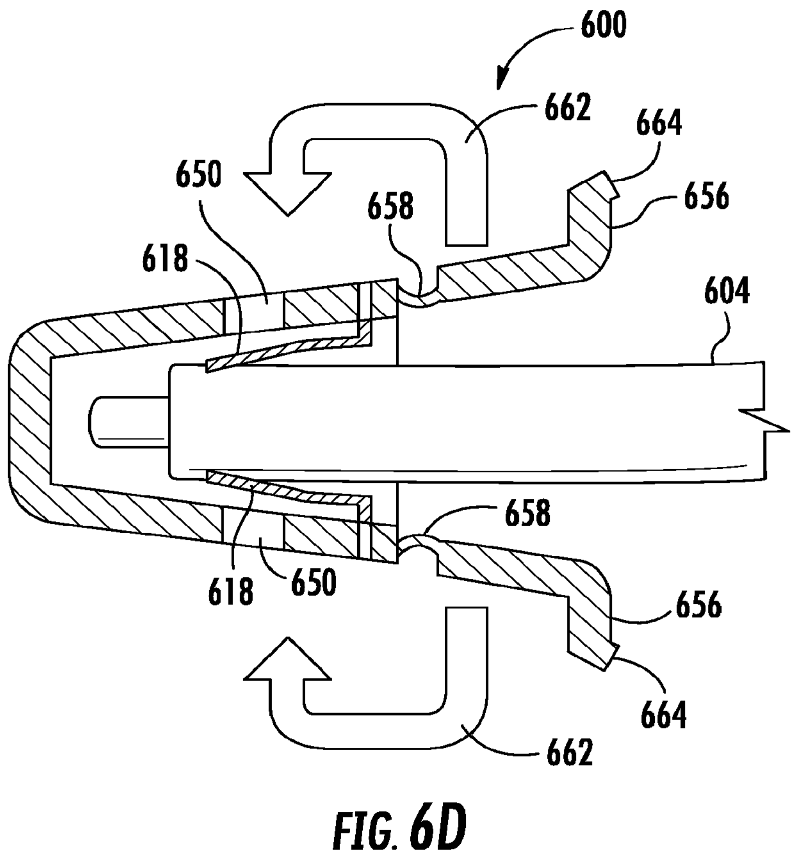
Figure 6E:
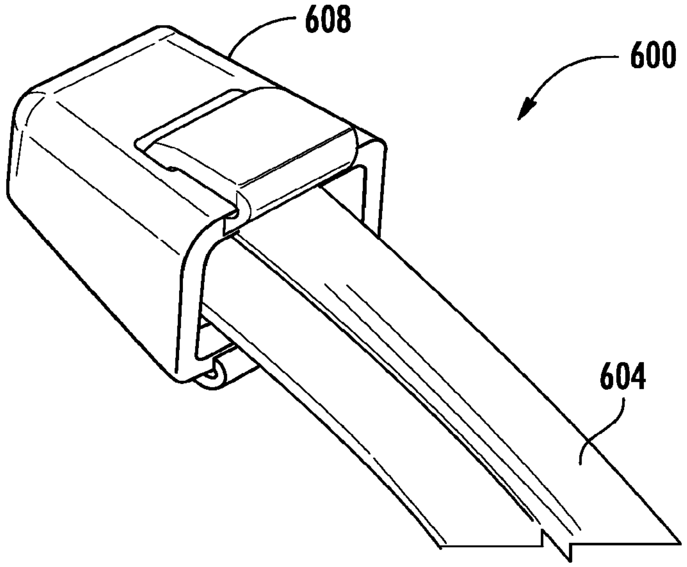
Figure 6F:
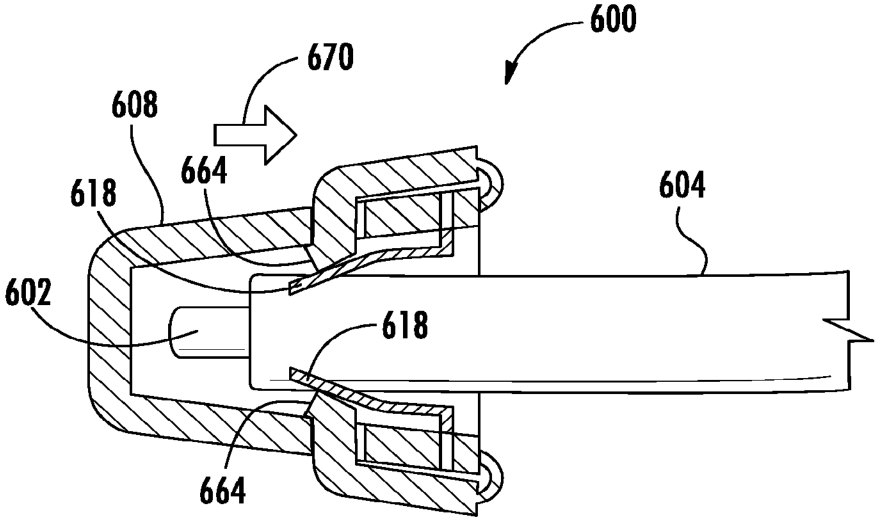

Referring now to FIGS. 6C and 6D, the snaps 656 can be moved in the direction of arrows 662 after insertion of the cable end 602 such that the snaps 656 rotate about the hinges 658 and engage the housing 608 proximate the apertures 650. The snaps 656, in some embodiments, such as the embodiment shown, include arms 664 configured to catch the interior of the housing 608 after moving through the apertures 650. Furthermore, the arms 664, depress the spring tabs 618 such that the spring tabs 618 are urged toward one another to apply a compression force against the cable 604 thereby retaining the cable 604 within the housing 608 (e.g., by biting the sheath of the cable 604). Referring now to FIGS. 6E and 6F, the cable end cap 600 is shown after the arms 664 have depressed the spring tabs 618, thereby securing the end 602 of the cable 604 within the housing 608. In some embodiments, when the user desires to remove the end 602 of the cable 604 from the end cap 600, the user may apply a force in the direction of arrow 670 to the arm(s) 664 in order to release the arm(s) 664 from the interior of the housing 608. With the arm(s) 664 out of the way, each spring tab 618 is free to spring out in the direction of arrows 660 and release the cable 604.

Referring now to FIG. 7, an environment 700 is shown in which various connectors and cable end caps according to embodiments of the invention function within a landscape lighting system. A power supply 702, in the embodiment shown, provides power to a cable 704 that is connected with connector 706. Connector 706 is a cable-to-fixture connector and, in various embodiments, represents the connectors discussed with reference to FIGS. 1A-1H and/or 2A-2K. The connector 706 maintains an electrical connection between the cable 704 and spur cable 708, which provides power to fixture 710, which may be, for example, a lighting fixture. Cable 704 is also connected with connector 712, which is a cable-to-cable connector such as, for example, the connectors discussed with reference to FIGS. 3A-3I and/or 4A-4F. Connector 712 is arranged in an extension configuration, or in other words, provides an extension for cable 704, which terminates at cable end cap 714, which may be, for example, a cable end cap as discussed with reference to FIGS. 5A-5F and/or 6A-6F. The connector 712 provides an electrical connection between cable 704 and cable 716, which also terminates at a cable end cap 714. Cable 716 is also connected with another connector 718, which may be, for example, a connector such those discussed with reference to FIGS. 3A-3I and/or 4A-4F. Connector 718 is arranged in a Y-configuration such that cable 716 extends remotely from the connector 718 and a branch cable 720 also extends from the connector 718. As shown, cable 716 and cable 720 each provide power to additional lighting fixtures 710 through spur cables 708 connected using connectors 706. Cable 716 and cable 720 finally terminate at cable end caps 714. In various other embodiments of landscape lighting systems, numerous other configurations and combinations of components such as power supplies, cables, connectors and fixtures may be arranged as desired by a user to accomplish landscape lighting goals. The arrangement illustrated in FIG. 7 is presented merely for illustrative purposes.

Referring now to FIGS. 8A-8G, a connector 800 in accordance with another embodiment of the invention is shown. The connector 800 can serve as a cable-to-fixture connector. A top cap 808 couples with a cable tray 810. The top cap 808 also couples with a contact holder 812. The cable tray 810 has an upper surface 890 that extends longitudinally from a first end (or edge) 891 to a second end (or edge) 892. The cable tray 810 is configured to receive and retain a cable in a stable position and couple with the top cap 808. The top cap 808 is configured to create an electrical connection between the cable and one or more contacts 814 as the top cap 808 is coupled with the cable tray 808 and/or manipulated in a predetermined manner (e.g., by rotating and/or tightening the top cap 808).

Figure 8A:
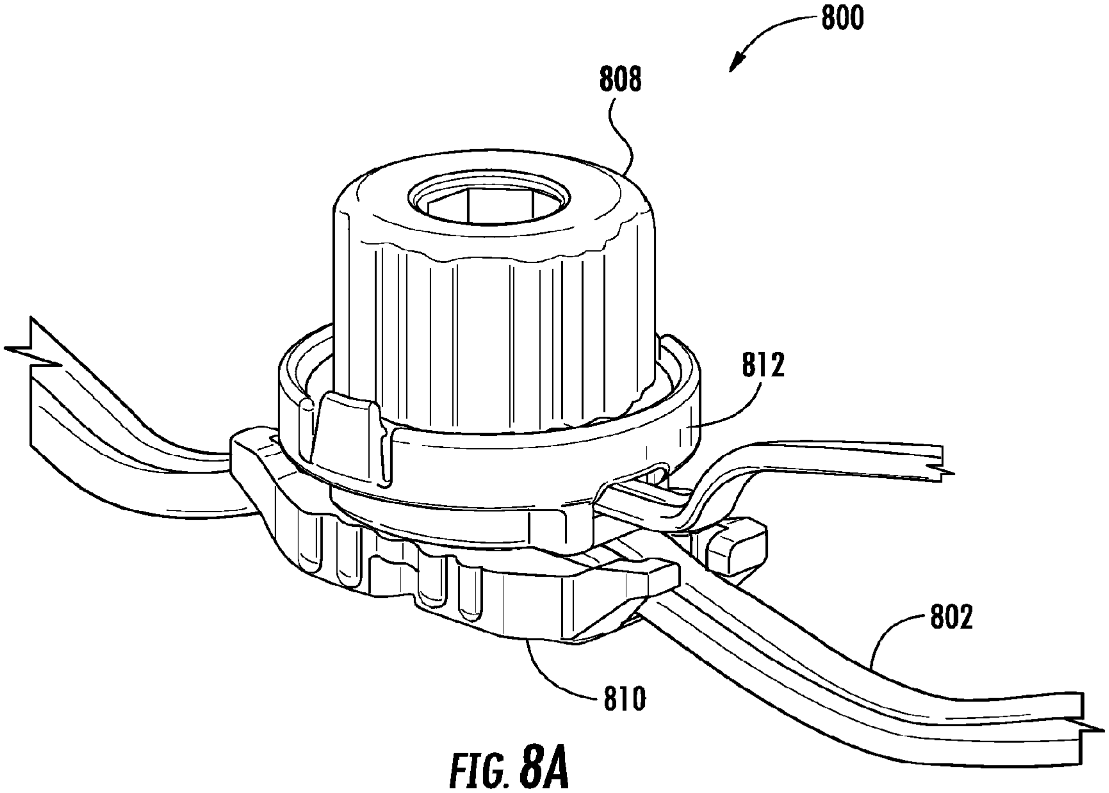
Figure 8B:
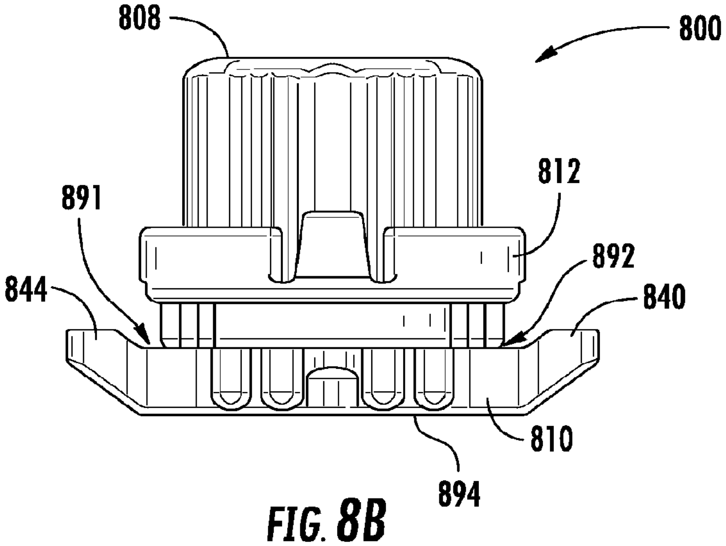

Referring now to FIG. 8B, the connector 800 is shown from the side. Fingers 840 and 844 extend longitudinally beyond opposite ends (or edges) 891 and 892 of an upper surface 890 of the cable tray 810. In the embodiment shown, as well as some other embodiments, one or more fingers, such as finger 840, extends to some extent in a transverse direction. Finger 840, for example, extends in a direction away from a lower surface 894 of the cable tray 810.

Figure 8C:
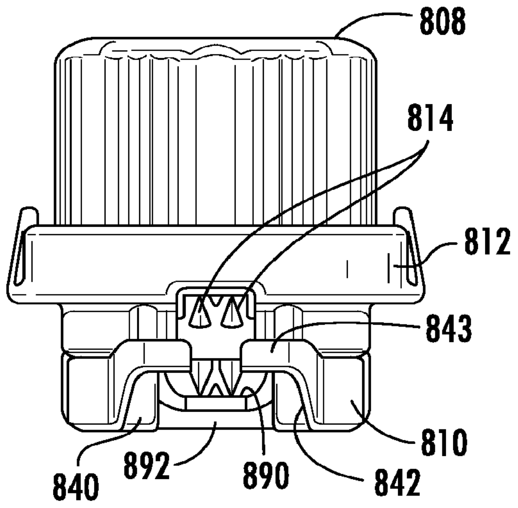

Referring now to FIG. 8C, the connector 800 is shown from an end. Contacts 814 are held by the contact holder 812 such that when the top cap 808 is manipulated in the predetermined manner (e.g., rotated and/or tightened), the contacts 814 pierce the cable 802, thereby forming an electrical connection with the cable 802. Each of fingers 840 and 842 has a protrusion 841 and 843 configured to bear against a cable (such as cable 802 shown in FIG. 8A) and retain the cable in a stable position when the cable is inserted between the protrusion(s) 841 and 843 and the end (or edge) 892 of the upper surface 890 of the cable tray 810.

Figure 8D:
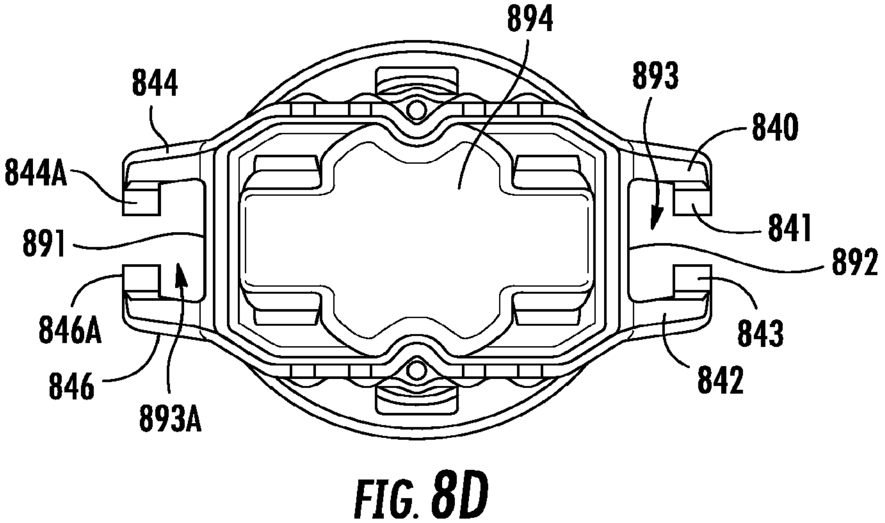

Referring now to FIG. 8D, the connector 800 is shown from underneath. The protrusions 841 and 843 extending from fingers 840 and 842, respectively, in some embodiments, protrude to some extent in a transverse direction so that a cable-accommodating gap 893 is defined between the protrusions and the end (or edge) 892 of the upper surface 890. In some such embodiments, fingers 844 and/or 846 can have a protrusion 844A and/or 846A protruding to some extent in a transverse direction so that another cable-accommodating gap 893A can be defined between the protrusions 844A, 846A and the other end (or edge) 891 of the upper surface 890. As shown in FIG. 8A, the protrusions 841, 843, 844A and/or 846A of the fingers 840, 842, 844 and 846 can be configured to bear against the cable (e.g., the cable 802 shown in FIG. 8A) and retain the cable in a stable position upon insertion of the cable between the protrusions 841, 843 and the edge 892, and between the protrusions 844A, 846A and the second edge 891. This facilitates retention of the cable by the cable tray 810 before, during and after the electrical connection is established between the contacts 814 and the cable.

Figure 8E:
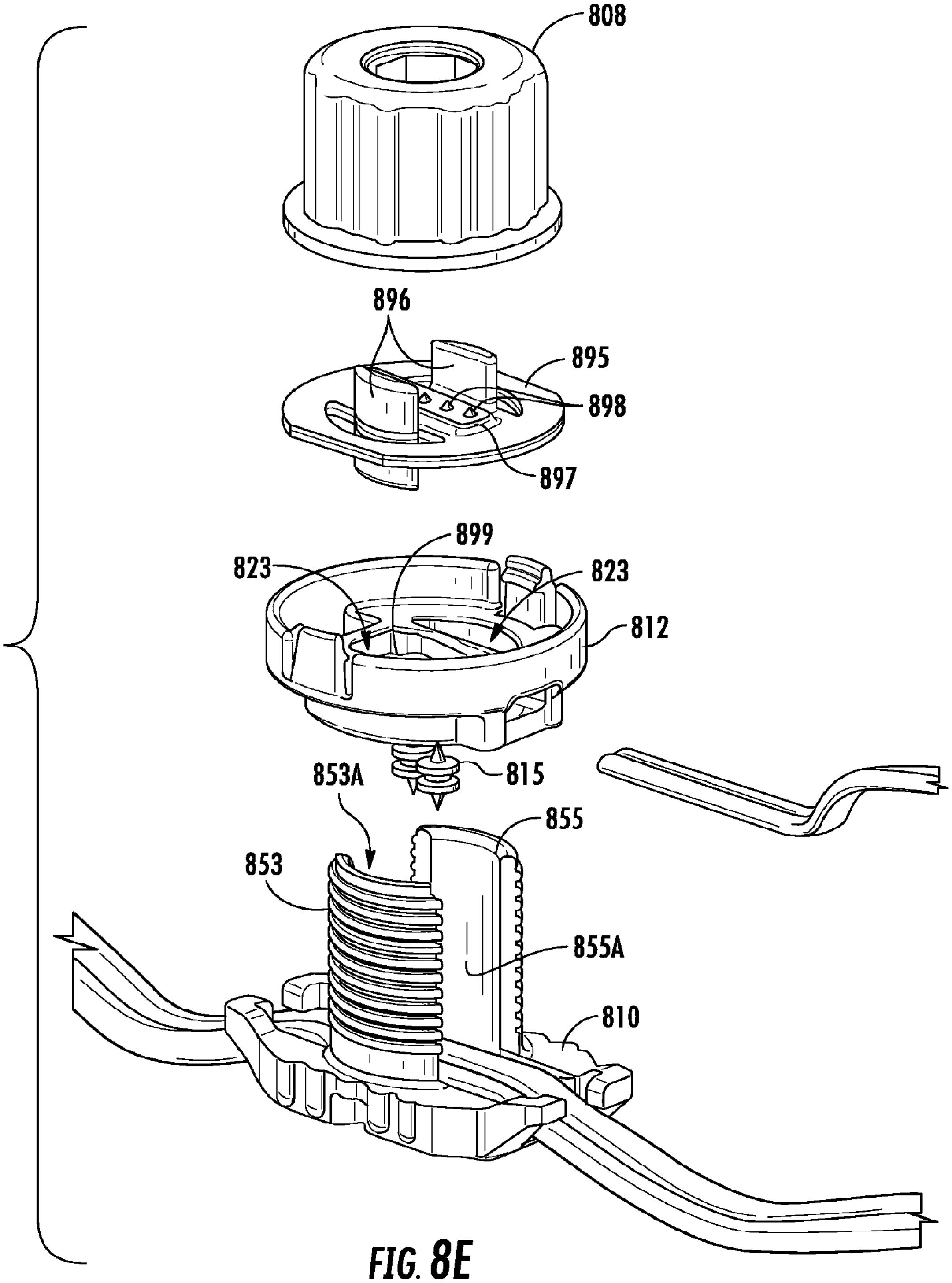

Referring now to FIG. 8E, the connector 800 is shown in an exploded view. The top cap 808 couples with the contact holder 812, which also couples with an intermediate component 895. The intermediate component 895 provides stability to the connector 800 during installation by the user. For example, as the top cap 808 is coupled with the cable tray 810 and/or manipulated in the predetermined manner (e.g., rotated and/or tightened), stabilizers 896 provide lateral support which prevents the engagement members 853 and 855 from bending toward one another. Thus, the engagement members 853 and 855 maintain physical contact with the interior of the top cap 808, which in some embodiments, such as the embodiment shown, is threaded for coupling with the engagement members 853 and 855. The stabilizers 896 can be arranged so that one or more of the stabilizers 896 fit into and/or through one or more respective apertures 823 in the contact holder 812. One or more of the engagement members 853, 855 can include a contoured inner surface 853A, 855A that is configured to accommodate and/or bear against a respective one of the stabilizers 896. The apertures 823 can be configured to receive the engagement members 853, 855 when the engagement members 853, 855 pass through the contact holder 812 to couple with the top cap 808. As shown in FIGS. 8A-8E, the dimensional and positional characteristics of the apertures 823, stabilizers 896 and engagement members 853, 855 can be selected so that they cooperate with one another to achieve (and/or maintain) a desired rotational orientation and/or positional alignment among the intermediate component 895, contact holder 812 and cable tray 810 as the latter components are brought together during assembly of the connector 800. This configuration and interaction among components can be implemented so as to prevent (or minimize the likelihood of) component misalignment and/or so as to ensure that piercing of the cables occurs and that it achieves the one or more intended electrical connections.

The intermediate component 895 also includes a raised platform 897 having one or more spikes 898. The raised platform 897 is configured to fit inside a trough 899 formed in the contact holder 812 and assist in retaining a cable in the trough 899. Likewise, spikes 898 push against the cable and assist in retaining the cable in the trough 899. The trough 899 can receive and retain a cable 804 configured for providing power to a fixture from the connector 800. The intermediate component 895, top cap 808 and contact holder 812 can be configured so that assembly (or snap-fitting) of the top cap 808 and the contact holder 812 together (with the intermediate component 895 disposed there between and the fixture cable 804 located in the trough 899) causes upper points 815 of the contacts 814 to pierce the sheath of the fixture cable 804, retain the cable 804 in the contact holder 812, and create an electrical connection between each conductor in the fixture cable 804 and a respective contact 814. The embodiments disclosed herein facilitate pre-installation of the connector 800 on the cable 804 prior to the sale or deployment of the fixture (e.g., at the facility where the fixture is manufactured and/or assembled) and they also facilitate retrofitting of the connector 800 onto a fixture cable 804 in the field. The latter can be advantageous in situations, for example, where the original connector associated with a fixture is unreliable, unsuitable, broken, or missing.

Another benefit provided by the stabilizers 896 is minimizing or eliminating tilt during user installation because the stabilizers bear against the engagement members 853 and 855, thereby keeping the intermediate component's major surfaces parallel or substantially parallel with the cable tray 810.

As shown, the intermediate component 895 may include stabilizers 896 extending outward from both sides of the intermediate component 895. Likewise, the intermediate component 895 may include a raised platform 897 and/or spikes 898 on both sides of the intermediate component 895. This provides a safeguard during user installation because the user need not position the intermediate component 895 with one or the other side facing a particular direction, but rather can install the intermediate component 895 with either side facing a particular direction. Various embodiments of the intermediate component 895 may be used in conjunction with one or more of the connector embodiments discussed herein. For example, an intermediate component similar to intermediate component 895 may be used in conjunction with the embodiment discussed with reference to FIGS. 1A-1H.

Referring now to FIGS. 9A-9F, another embodiment of a connector 900 is illustrated. Connector 900 can serve as a cable-to-cable connector. A top cap 908 couples with a lower cable tray 910B. The top cap 908 also couples with a contact holder 912. The lower cable tray 910B has an upper surface 990 that extends longitudinally from a first end (or edge) 991 to a second end (or edge) 992. The lower cable tray 910B is configured to receive and retain a first cable 902 in a stable position and couple with the top cap 908. The top cap 908 is configured to create an electrical connection between the first cable 902 and one or more contacts 914 as the top cap 908 is coupled with the lower cable tray 910B. An upper cable tray 910A is configured to couple with the lower cable tray 910B as the top cap 908 is coupled with the lower cable tray 910B and/or as the top cap 908 is manipulated in a predetermined manner (e.g., as the top cap 908 is rotated and/or tightened). The upper cable tray 910A has a lower (or cable-facing) surface 980 that extends longitudinally from a first end (or edge) 981 to a second end (or edge) 982. The upper cable tray 910A is configured to receive and retain a second cable 904 in a stable position as the top cap 908 couples with the lower cable tray 910B.

Figure 9A:
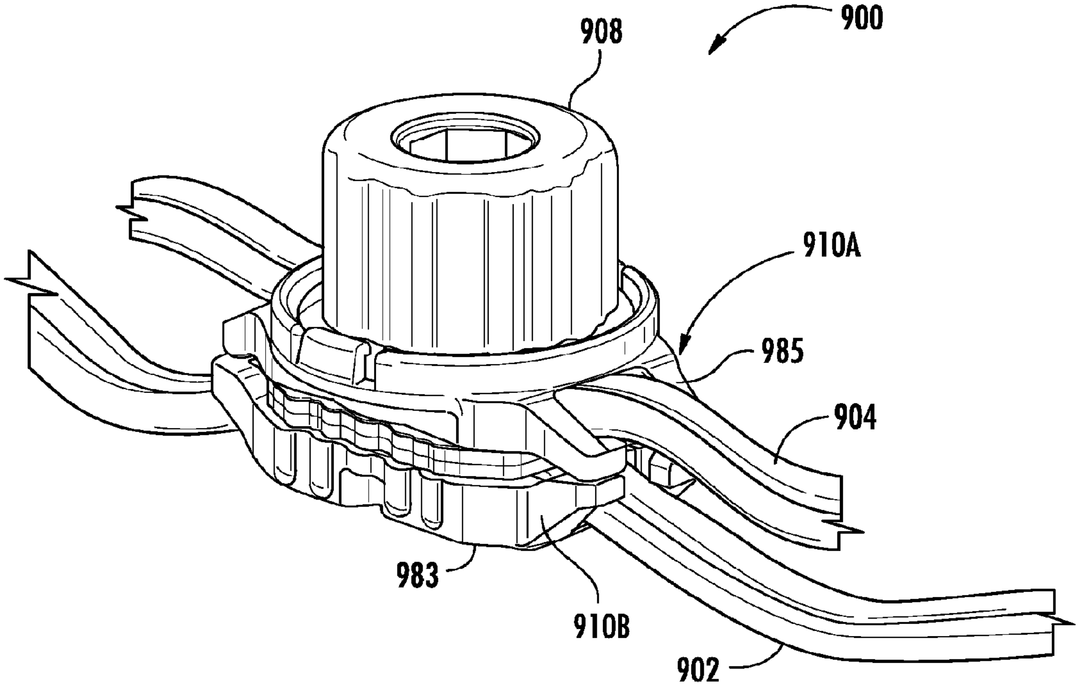
Figure 9B:
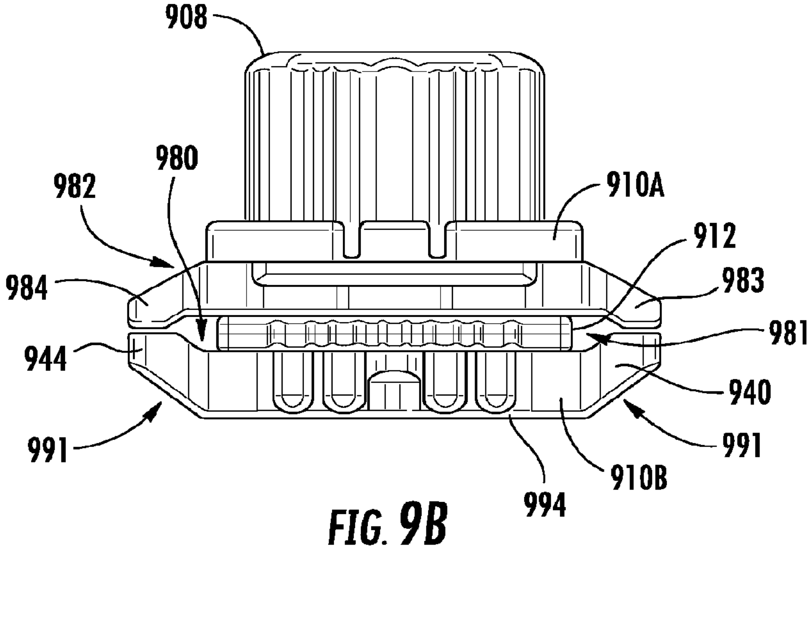

Referring now to FIG. 9B, the connector 900 is shown from the side. Fingers 940 and 944 of the lower cable tray 910B extend longitudinally beyond opposite ends (or edges) 991 and 992 of the upper surface 990 (shown in FIGS. 9A and 9E) of the lower cable tray 910B. Similarly, fingers 983 and 984 of the upper cable tray 910A extend longitudinally beyond opposite ends (or edges) 981 and 982 of the lower surface 980 of the upper cable tray 910A. In the embodiment shown, as well as some other embodiments, one or more fingers, such as finger 940, extends to some extent in a transverse direction. Finger 940, for example, extends in a direction away from a lower surface 994 of the lower cable tray 910.

Figure 9C:
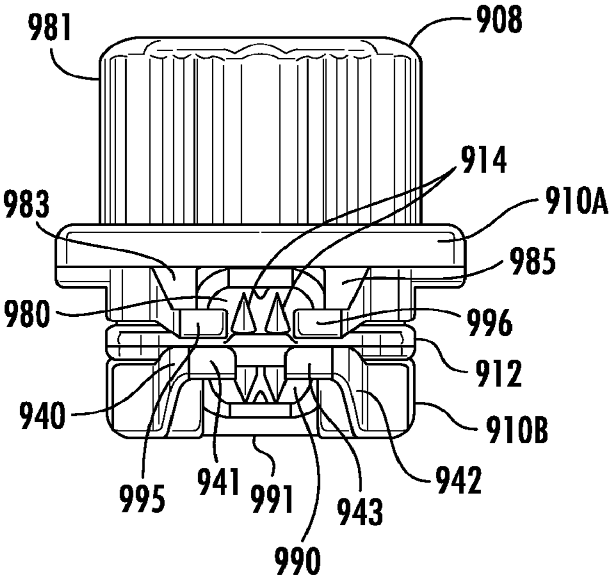

Referring now to FIG. 9C, the connector 900 is shown from an end. Contacts 914 are held by the contact holder 912 such that when the top cap 908 is manipulated in the predetermined manner (e.g., rotated and/or tightened), the contacts 914 pierce the cables 902 and 904, thereby forming an electrical connection between the cables 902 and 904. Each of fingers 940 and 942 has a protrusion 941 and 943, respectively, configured to bear against one of the cables 902 and retain the cable 902 in a stable position when the cable 902 is inserted between the protrusion(s) 941 and 943 and the end (or edge) 991 of the lower cable tray 910B. Similarly, fingers 983 and 985 each have protrusions 995 and 996, respectively, configured to bear against another cable 904 and retain the cable 904 in a stable position when the cable 904 is inserted between the protrusion(s) 995 and 996 and the end (or edge) 981 of the lower surface 980 of the upper cable tray 910A. The cable trays 910A and 910B can be provided with an identical or similar arrangement of fingers and protrusions for the opposite ends 982 and 992 of the lower surface 980 and upper surface 991.

Figure 9D:
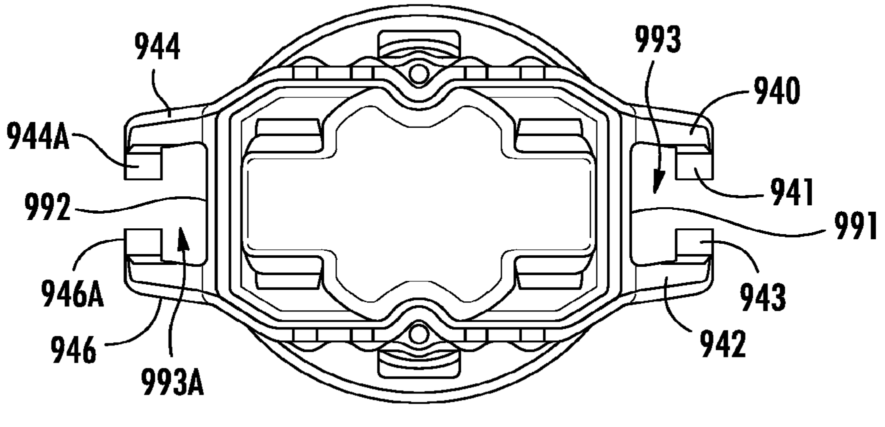

Referring now to FIG. 9D, the connector 900 is shown from underneath. The protrusions 941 and 943 extending from fingers 940 and 942, respectively, in some embodiments, protrude to some extent in a transverse direction so that a cable-accommodating gap 993 is defined between the protrusions 941 and 943 and the end (or edge) 991 of the upper surface 990. Similarly, protrusions 944A and 946A extend from fingers 944 and 946, respectively, and protrude to some extent in a transverse direction so that another cable-accommodating gap 993A is defined between the protrusions 944A and 946A and the opposite end (or edge) 992 of the upper surface 990. As shown in FIG. 9A, the protrusions 941, 943, 944A and/or 946A of the fingers 940, 942, 944 and 946 can be configured to bear against the cable (e.g., the cable 902 shown in FIG. 9A) and retain the cable in a stable position upon insertion of the cable between the protrusions 941, 943 and the edge 991, and between the protrusions 944A, 946A and the second edge 992. This facilitates retention of the cable 902 by the lower cable tray 910B before, during and after the electrical connection is established between the contacts 914 and the cable 902. As shown in FIGS. 9A and 9F, the upper cable tray 910A can retain the cable 904 in the same or a similar manner. For example, the protrusions 995, 984A, 996 and/or 986A of the fingers 983, 984, 985 and 986 can be configured to bear against the cable (e.g., the cable 904 shown in FIGS. 9A and 9F) and retain the cable in a stable position upon insertion of the cable between the protrusions 995, 996 and the edge 981, and between the protrusions 984A, 986A and the opposite edge 982.

Figure 9E:
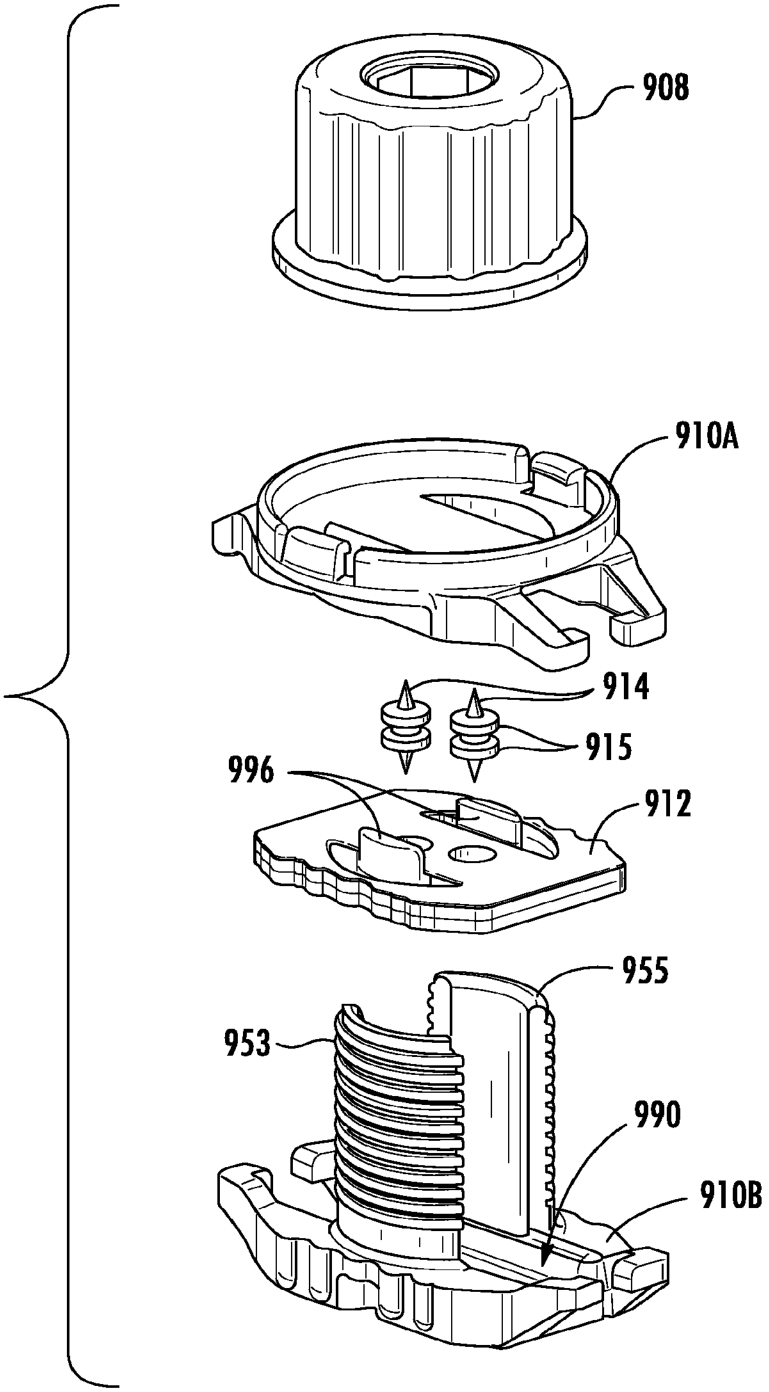
Figure 9F:
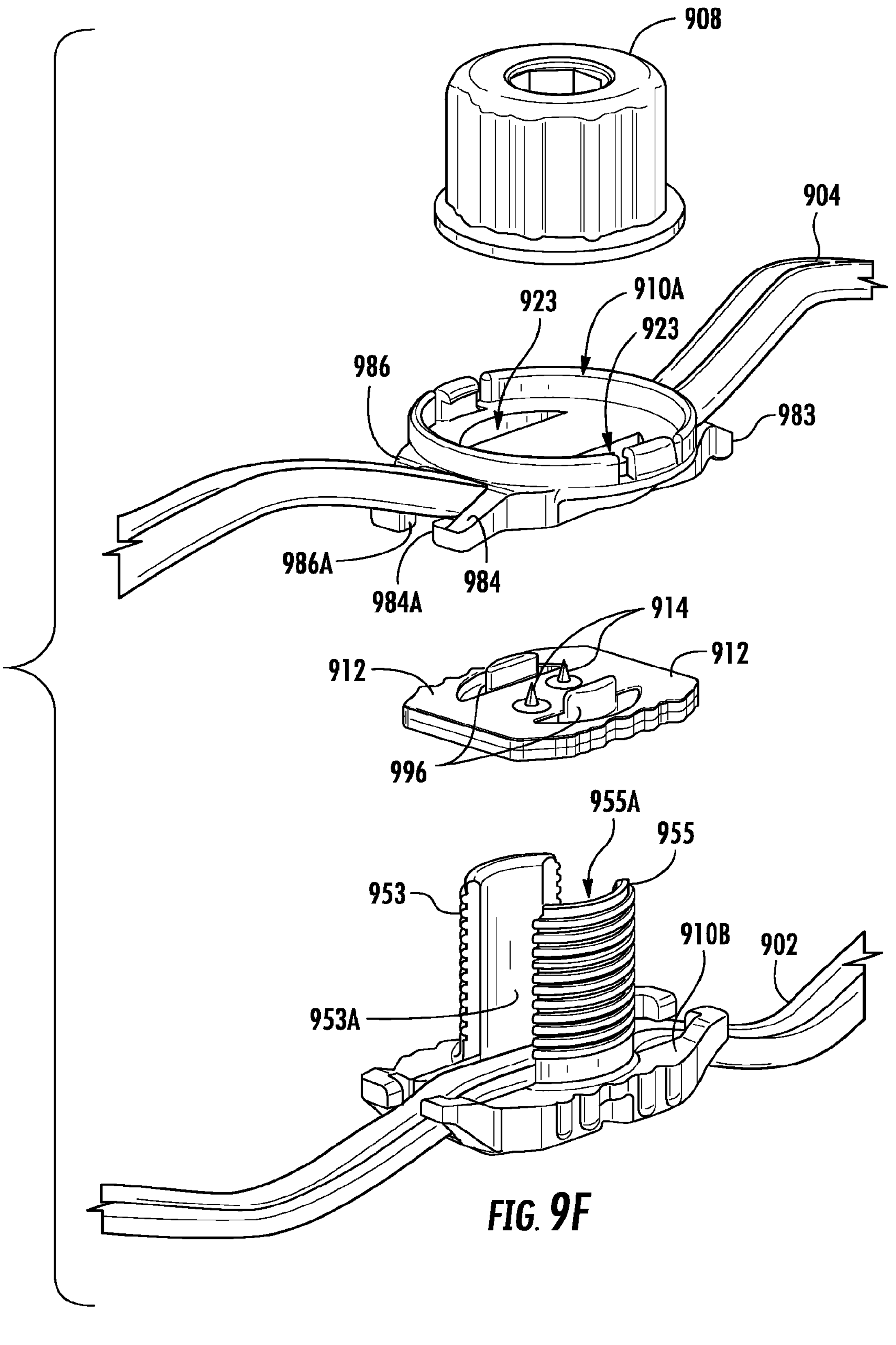

FIGS. 9E and 9F are exploded views of the connector 900. The top cap 908 couples with the lower cable tray 910B, which also couples with the contact holder 912 and the upper cable tray 910A. In some embodiments, such as the embodiment shown, the contact holder 912 exhibits some characteristics similar to characteristics of an intermediate component, such as intermediate component 895. For example, the contact holder 912 provides stability to the connector 900 during installation by the user. For example, as the top cap 908 is coupled with the lower cable tray 910B and/or manipulated in the predetermined manner (e.g., rotated and/or tightened), stabilizers 996 provide lateral support which prevents the engagement members 953 and 955 from bending toward one another. Thus, the engagement members 953 and 955 maintain physical contact with the interior of the top cap 908, which in some embodiments, such as the embodiment shown, is threaded for coupling with the engagement members 953 and 955.

The stabilizers 996 can be arranged so that one or more of the stabilizers 996 fit into and/or through one or more respective apertures 923 in the upper cable tray 910A. One or more of the engagement members 953, 955 can include a contoured inner surface 953A, 955A that is configured to accommodate and/or bear against a respective one of the stabilizers 996. The apertures 923 can be configured to receive the engagement members 953, 955 when the engagement members 953, 955 pass through the contact holder 912 and the upper cable tray 910B to couple with the top cap 908. As shown in FIGS. 9A-9F, the dimensional and positional characteristics of the apertures 923, stabilizers 996 and engagement members 953, 955 can be selected so that they cooperate with one another to achieve (and/or maintain) a desired rotational orientation and/or positional alignment among the upper cable tray 910A, contact holder 912 and lower cable tray 910B as the latter components are brought together during assembly of the connector 900. This configuration and interaction among components can be implemented so as to prevent (or minimize the likelihood of) component misalignment and/or so as to ensure that piercing of the cables occurs and that it achieves the one or more intended electrical connections.

Another benefit provided by the stabilizers 996 is minimizing or eliminating tilt during user installation because the stabilizers bear against the engagement members 953 and 955, thereby keeping the contact holder's 912 major surfaces parallel or substantially parallel with the upper cable tray 910A and the lower cable tray 910B.

The contact holder 912 in some embodiments is injection molded around the contacts 914. In some embodiments, the contacts 914, as shown in FIG. 9E, include one or more circumferential flanges 915. In such embodiments, the contact holder 912 may be injection molded about the circumferential flanges 915, thereby retaining the contacts 914 in place. In other embodiments, instead of, or in addition to the circumferential flanges 915, the contacts include radially extending projections, radially extending holes or the like.

As shown, the contact holder 912 may include stabilizers 996 extending outward from both sides of the contact holder 912. This provides a safeguard during user installation because the user need not position the contact holder 912 with one or the other side facing a particular direction, but rather can install the contact holder 912 with either side facing a particular direction.

Referring now to FIG. 10, an embodiment of a top cap 1000 is shown. This embodiment of the top cap 1000 may be used in conjunction with any of the various embodiments of the connector described herein. In this embodiment, the top cap 1000 includes a brace which is configured to prevent decoupling of the top cap 1000 (or its threaded interior) from the engagement members (e.g., engagement members 153 and 155 of the cable tray, such as cable tray 110). The brace can be implemented using a circumferential (or circular) projection (or protrusion) 1010 extending outward from an interior surface 1012 of the underside of the top cap 1000. This projection 1010 is configured to prevent the engagement members, such as engagement members 153 and 155 of the cable tray, such as cable tray 110, from flexing toward one another as the top cap 1000 is coupled with the cable tray 110 and/or as the top cap 1000 is manipulated in the predetermined manner (e.g., as the top cap 1000 is rotated and/or tightened). As the contacts, such as contacts 914, engage the cable, the forces on the threads of the engagement members increase as the top cap 1000 continues to be tightened. Thus, if flexing of the engagement members is allowed, the threads of the engagement members might tend to skip or jump in relation to the threads 1014 of the top cap 1000. This may prevent or hamper complete tightening of the connector and, thereby, prevent or hamper piercing of the cable and establishment of an electrical connection. These problems can be alleviated to some extent by using stronger and/or more expensive materials and/or by using a larger volume of materials and making the connector less compact. The disadvantages and costs associated with those solutions can be avoided by implementing the protrusion 1010 shown in FIG. 10. In some embodiments, such as the embodiment shown, the brace or protrusion 1010 (which can be continuous or segmented) is a ridge, and in other embodiments, the protrusion 1010 is a platform or some other structure configured to prevent flexing of the engagement members.

Referring now to FIG. 11, a finger and end configuration 1100 for implementation as part of a cable tray according to an embodiment of the invention is shown. The configuration 1100 has a body 1104 and a platform 1110 extending from the end (or edge) of the body 1104. The platform 1110, in this embodiment and others, has an upper surface 1106 lower than an upper surface 1104 of the body 1102. The platform 1110, as shown, has two fingers 1120 and 1130, each having a protrusion 1140 and 1150, respectively. In some embodiments, the platform 1110 is referred to as a finger, and the fingers 1120 and 1130, in combination with their respective protrusions 1140 and 1150, are referred to as protrusions from the finger. As represented by arrow 1160 and arrow 1170, one or more cable-accommodating gaps are defined by the body 1102, platform 1110, fingers 1120 and 1130, and/or protrusions 1140 and 1150. In some embodiments, one or more fingers 1120 and/or 1130 extend beyond the upper surface 1104 of the body, and in other embodiments, one or more fingers 1120 and/or 1130 do not extend beyond the upper surface 1104 of the body, and in yet other embodiments, one or more fingers 1120 and/or 1130 extend to substantially even with the upper surface 1104. In some embodiments, one or more of the fingers 1120 and/or 1130 and/or one or more of the protrusions 1140 and/or 1150 extend partially or completely longitudinally in relation to the body 1102, and in some embodiments, one or more of the fingers 1120 and/or 1130 and/or one or more of the protrusions 1140 and/or 1150 extend partially or completely transversely in relation to the body 1102.

Figure 12A:
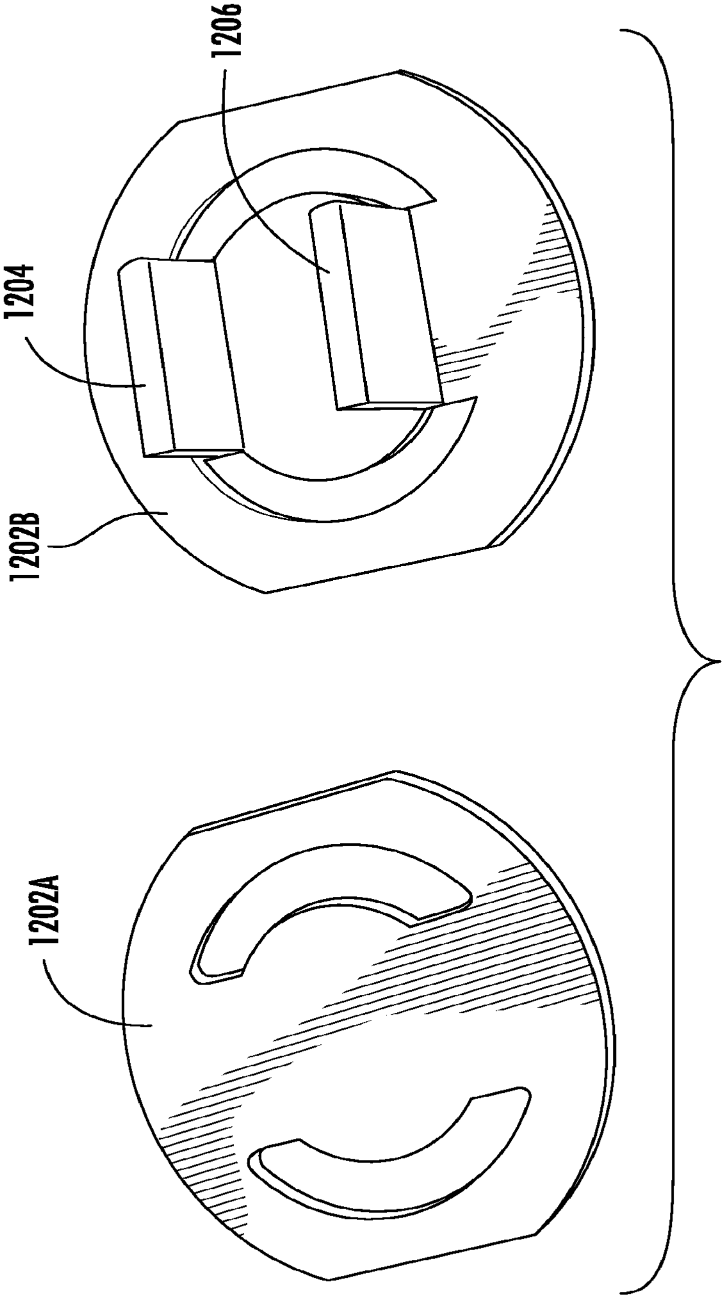
Figure 12B:
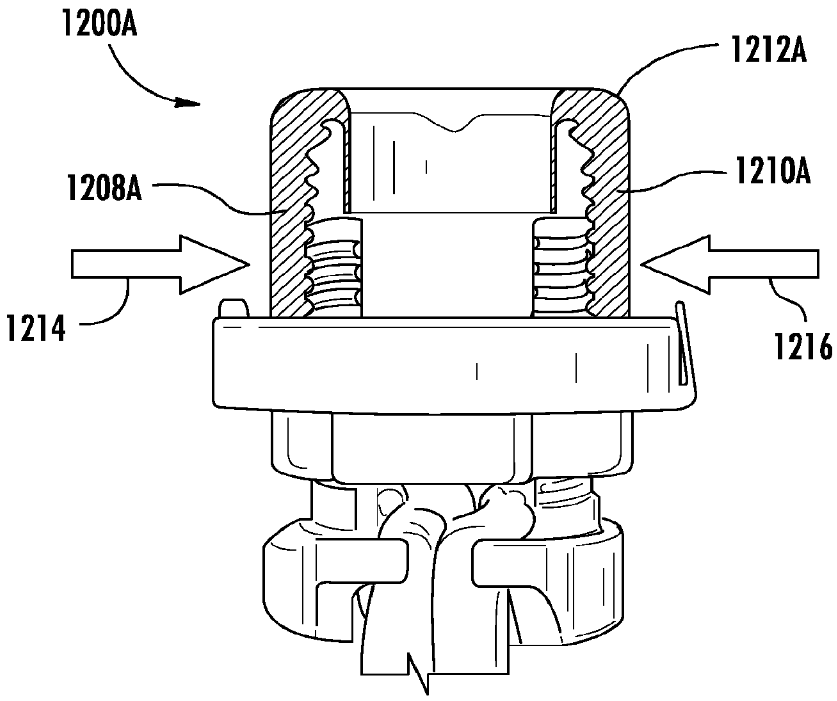
Figure 12C:
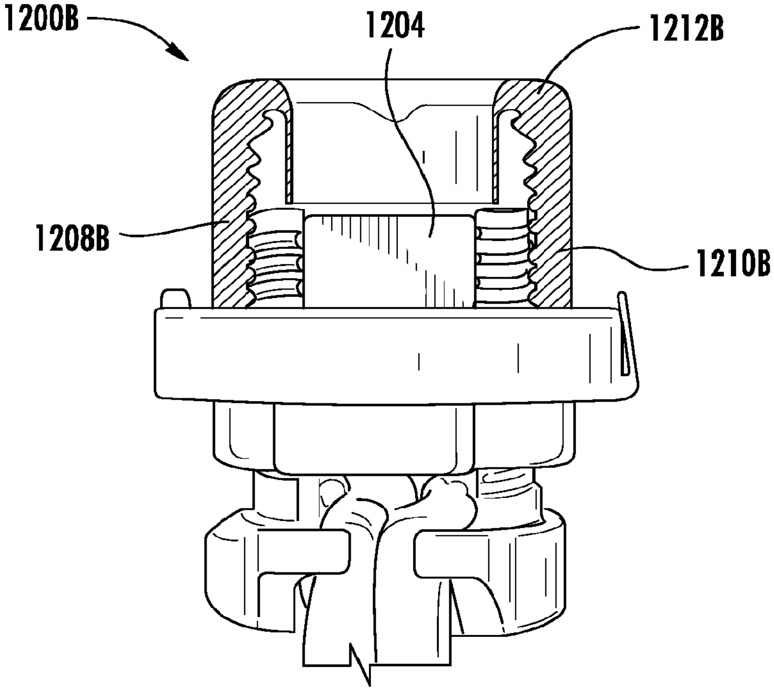
Figure 12D:
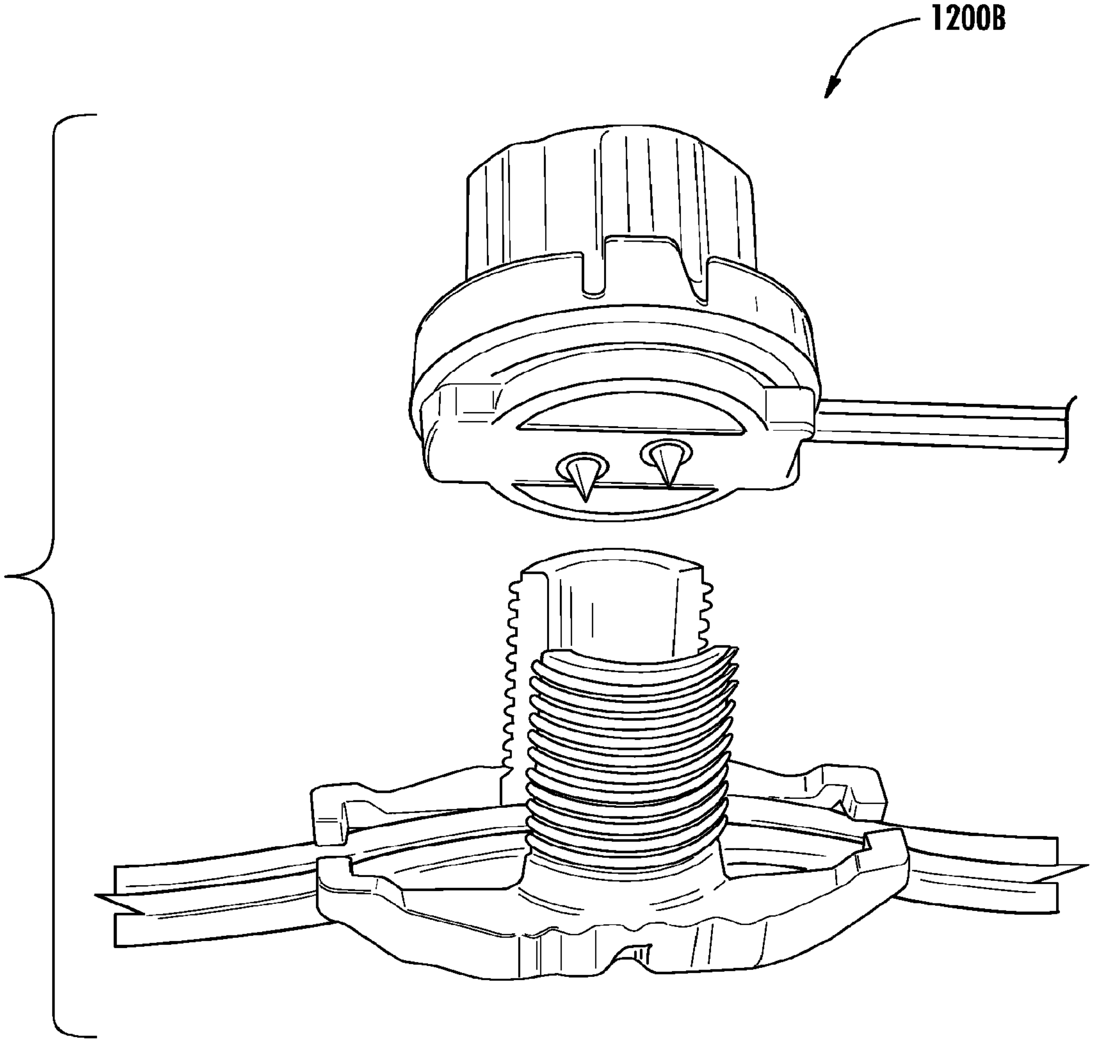

Referring to FIGS. 12A-12D, another embodiment of a cable-to-fixture connector 1200B is illustrated. In FIG. 12A, an intermediate component 1202A similar to intermediate component 895 of FIGS. 8A-8E is shown. Intermediate component 1202B includes support guides 1204 and 1206, whereas intermediate component 1202A has no support guides. The support guides 1204 and 1206 are configured to support engagement members 1208B and 1210B as the connector 1300B is tightened. As shown in FIG. 12B, top cap 1212A has a portion removed so that the interior of connector 1200A may be shown. Connector 1200A has no support guides, and as the top cap 1212A is tightened and couples with engagement members 1208A and 1210A, an inward force, in the direction of arrows 1214 and/or 1216 may cause the engagement members 1208A and 1210A to bend inwardly such that some or all the threads of engagement members 1208A and/or 1210A may disengage some or all the threads on the inner circumference of top cap 1212A, thereby resulting in decoupling of the top cap 1212A and the engagement members 1208A and/or 1210A. If the threads disengage, then tightening the top cap 1212A may be impossible. Furthermore, even if the engagement members 1208A and 1210A effectively engage and retain the top cap 1212A, the top cap 1212A may be prone to undesired easy removal from engagement members 1208A and/or 1210A. As shown in FIG. 12C, the support guide 1204 prevents the engagement members 1208B and 1210B from bending inwardly as a result of tightening the top cap 1212B. The forces represented by arrows 1214 and 1216 are absorbed by the support guide(s), and in some instances, the forces counteract one another, thereby eliminating the tendency for the engagement member (s) bending inwardly.

Figure 13A:
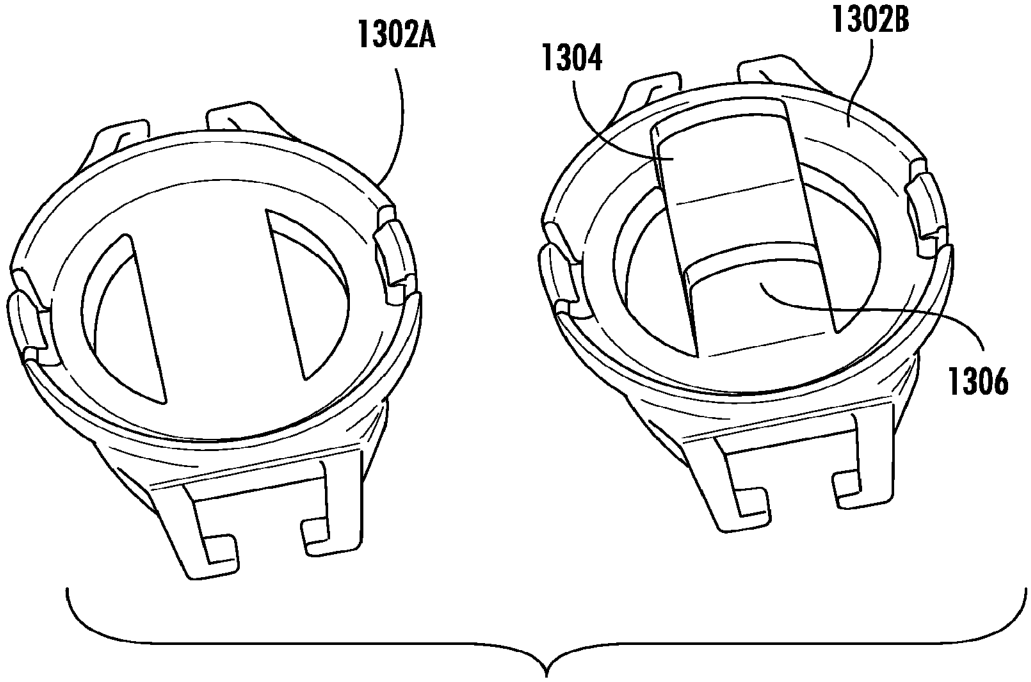
Figure 13B:
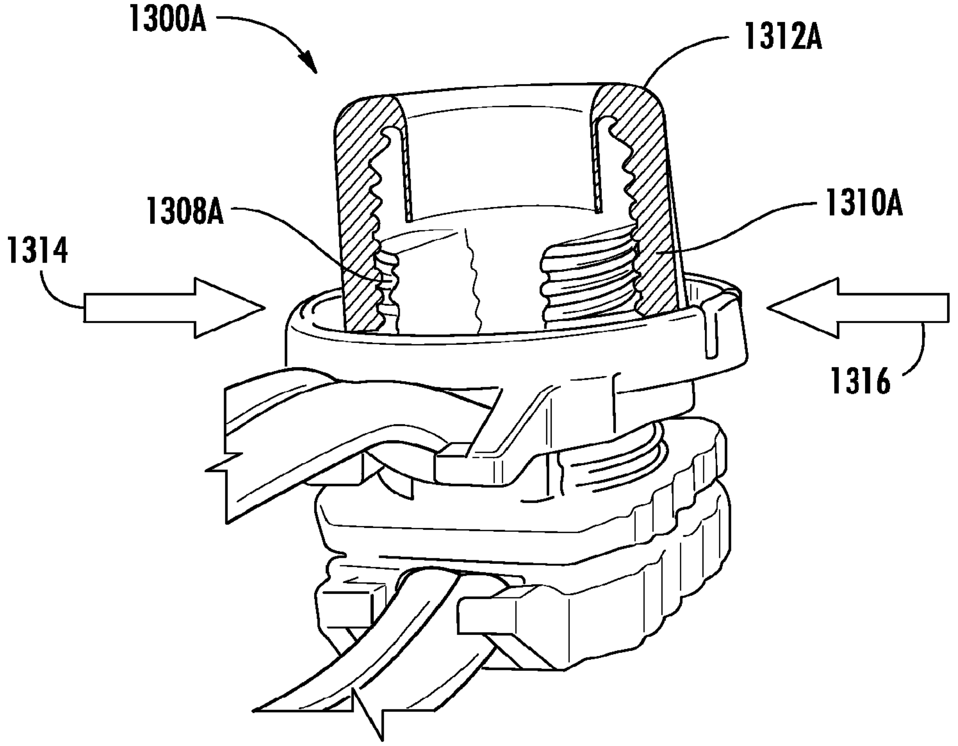
Figure 13C:
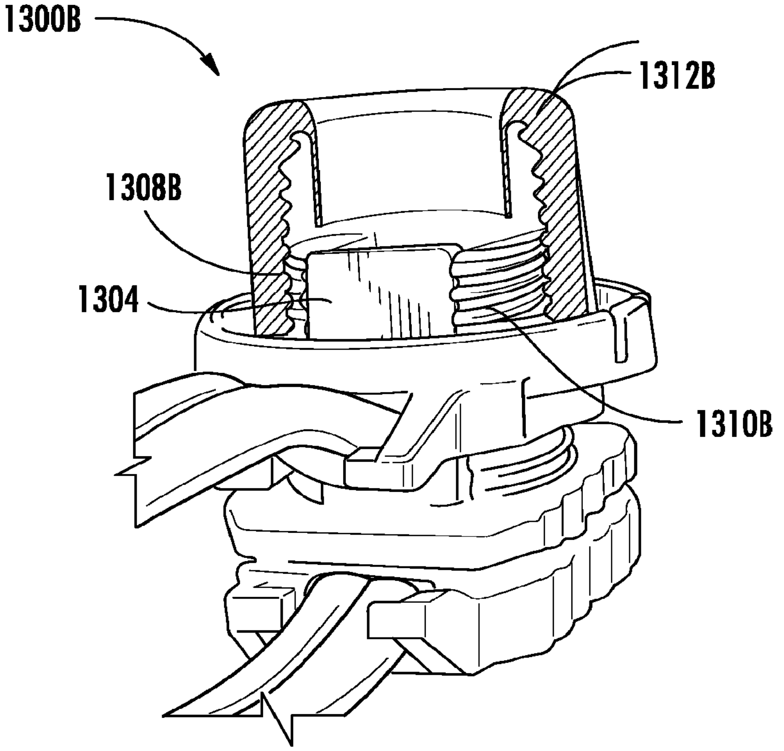
Figure 13D:
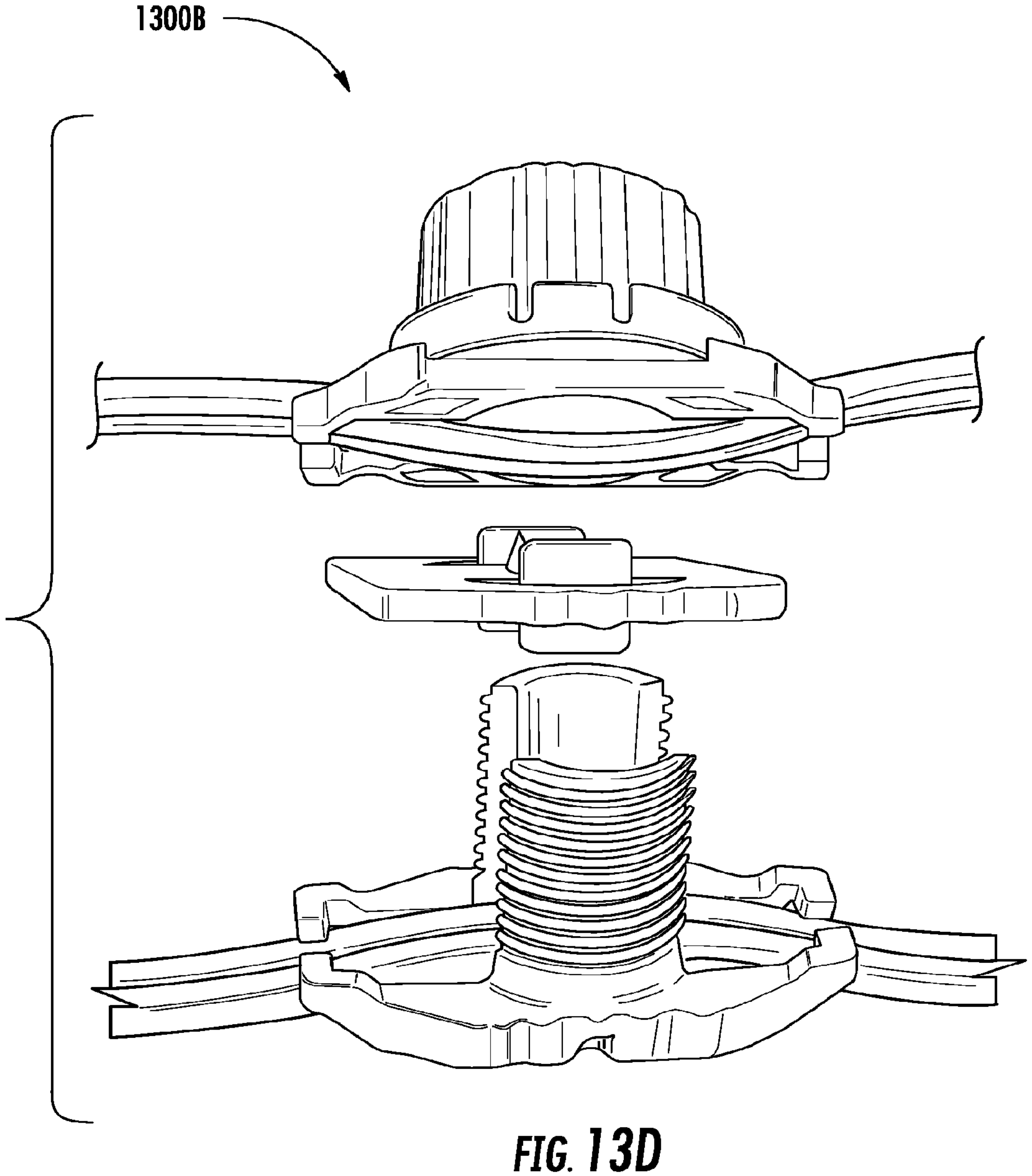

Referring now to FIGS. 13A-13D, another embodiment of a cable-to-cable connector 1300B is illustrated. In FIG. 13A, a top clip 1302A similar to top clip 312 of FIGS. 3A-3I is shown. Top clip 1302B includes support guides 1304 and 1306, whereas top clip 1302A has no support guides. The support guides 1304 and 1306 are configured to support engagement members 1308B and 1310B as the connector 1300B is tightened. As shown in FIG. 13B, top cap 1312A has a portion removed so that the interior of connector 1300A may be shown. Connector 1300A has no support guides, and as the top cap 1312A is tightened and couples with engagement members 1308A and 1310A, an inward force, in the direction of arrows 1314 and/or 1316 may cause the engagement members 1308A and 1310A to bend inwardly such that some or all the threads of engagement members 1308A and/or 1310A may disengage some or all the threads on the inner circumference of top cap 1312A, thereby resulting in decoupling of the top cap 1312A and the engagement members 1308A and/or 1310A. If the threads disengage, then tightening the top cap 1312A may be impossible. Furthermore, even if the engagement members 1308A and 1310A effectively engage and retain the top cap 1312A, the top cap 1312A may be prone to undesired easy removal from engagement members 1308A and/or 1310A. As shown in FIG. 13C, the support guide 1304 prevents the engagement members 1308B and 1310B from bending inwardly as a result of tightening the top cap 1312B. The forces represented by arrows 1314 and 1316 are absorbed by the support guide(s), and in some instances, the forces counteract one another, thereby eliminating the tendency for the engagement member(s) bending inwardly.

In the various embodiments described above, such as, but not limited to, those shown in FIGS. 1A-1H, FIGS. 2A-2K, FIGS. 3A-3I, FIGS. 4A-4F, FIGS. 8A-8E, and/or FIGS. 9A-9F, one or more support guides, similar or identical to one or more of support guides 1204, 1206, 1304, and/or 1306 may be implemented to provide support for engagement members of the respective connector.

Components and features of each embodiment disclosed herein can be implemented with one or more of the other embodiments and/or adapted for use therewith. For example, any of the embodiments can include (or be adapted to include) the longitudinally extending rib(s), gripping features, slanted wall portion(s), finger configuration(s), protrusion(s), gaskets, keying features, stabilizers, brace(s), alignment tabs (with or without ratchet teeth), tooth-engaging structures, or the like, from any of the other embodiments to achieve the same or similar benefits and/or advantages.

While the exemplary embodiments have been described using directional descriptors, such as "top," "upper," "lower," and the like, those descriptors are intended to convey only exemplary spatial relationships among the components of the exemplary embodiments and the cables that they accommodate; the spatial descriptors are not to be construed as limitations on the orientation of the embodiments or their components. Each of the disclosed embodiments can be implemented, assembled and deployed in any desired orientation (e.g., sideways, inverted, at an angle, and the like). Thus, a component described herein as being an "upper" or "top" component might be deployed as a bottom component if the particular implementation is assembled or deployed while inverted (when compared to the orientations shown in the appended drawings).

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, combinations, and modifications of the just described embodiments can be configured without departing from the scope and spirit of the invention. Therefore, it is to be understood that, within the scope of the appended claims, the invention may be practiced other than as specifically described herein.

What is claimed is:

1. A connector comprising:

a cable tray configured to receive and retain a cable in a stable position, the cable tray comprising an upper surface that extends longitudinally from a first end to a second end of the upper surface and at least one engagement member extending from the cable tray;

a contact holder configured to retain at least one contact;

a top cap configured for coupling to the at least one engagement member of the cable tray and to create an electrical connection between the cable and the at least one contact as the top cap is manipulated in a predetermined manner while coupled with the cable tray, whereby the at least one contact pierces the cable to create the electrical connection with the cable; and at least one stabilizer in contact with at least one of the contact holder or the at least one engagement member of the cable tray.

2. The connector of claim 1 further comprising an intermediate component located adjacent to an upper surface of the contact holder, said intermediate component comprising the at least one stabilizer.

3. The connector of claim 2, wherein the contact holder is positioned adjacent to an upper surface of the cable tray and the intermediate component is positioned adjacent to an upper surface of the contact holder.

4. The connector of claim 1, wherein the at least one stabilizer is a protrusion extending from an upper surface of the contact holder, wherein the protrusion extends into an aperture in the cable tray.

5. The connector of claim 2, wherein the stabilizer comprises a first extension that extends from an upper surface of the intermediate component, such that when the intermediate component is positioned adjacent to an upper surface of the contact holder, the first extension of the stabilizer contacts the at least one engagement member of the cable tray to thereby support the engagement member relative to the top cap.

6. The connector of claim 1, wherein the contact holder comprises at least one aperture in the contact holder, wherein aperture is sized to receive the at least one engagement member of the cable tray, such that when the contact holder is placed adjacent to the upper surface of the cable tray, the at least one engagement member is positioned within the at least one aperture of the contact holder.

7. The connector of claim 6, wherein said stabilizer comprises a second extension that extends from a lower surface of the intermediate component, such that when the intermediate component is placed adjacent to the contact holder and the contact holder is placed adjacent to the upper surface of the cable tray, the stabilizer is positioned within the at least one aperture of the contact holder.

8. The connector of claim 6, wherein the stabilizer is position relative to an inner surface of the at least one engagement member.

9. The connector of claim 1, wherein the cable tray further comprises:

a finger extending beyond the first end for some distance longitudinally, the finger having a protrusion that protrudes to some extent in a transverse direction so that a cable-accommodating gap is defined between the protrusion and the first end, the protrusion being configured to bear against the cable and retain the cable in the stable position when the cable is inserted between the protrusion and the first end.

10. The connector of claim 1, wherein the cable tray further comprises a rib extending from the upper surface of the cable tray and oriented or generally parallel with the longitudinal axis of the cable tray, the rib configured to engage a groove in the cable, and assist in maintaining alignment of the cable in the stable position.

11. The connector of claim 1, wherein the contact holder further comprises one or more arms extending from the top surface of the contact holder, wherein the arms are configured to fit over a portion of the top cap while the top cap is coupled to the cable tray preventing the top cap from being manipulated.

12. The connector of claim 1, wherein the cable tray further comprises:

a first wall extending from a first side of the upper surface of the cable tray; and a second wall extending from a second side of the upper surface of the cable tray;

wherein the first wall and the second wall are angled such that a distance between the first wall and the second wall proximate the upper surface is smaller than a distance between the first wall and the second wall distal from the upper surface, the first wall and the second wall in combination configured to assist in maintaining alignment of the cable in the stable position as the top cap in manipulated in the predetermined manner while couple with the cable tray.

13. A connector comprising:

a cable tray configured to receive and retain a cable in a stable position, the cable tray comprising an upper surface that extends longitudinally from a first end to a second end of the upper surface and at least one engagement member extending from the cable tray;

a contact holder configured to retain at least one contact;

a top cap configured for coupling to the at least one engagement member of the cable tray and to create an electrical connection between the cable and the at least one contact as the top cap is manipulated in a predetermined manner while coupled with the cable tray, whereby the at least one contact pierces the cable to create the electrical connection with the cable; and at least one stabilizer located at a position so as to be adjacent to an inner surface of the at least one engagement member of the cable tray.

14. The connector of claim 13 further comprising an intermediate component located adjacent to an upper surface of the contact holder, said intermediate component comprising the at least one stabilizer.

15. The connector of claim 14, wherein the contact holder is positioned adjacent to an upper surface of the cable tray and the intermediate component is positioned adjacent to an upper surface of the contact holder.

16. The connector of claim 13, wherein the at least one stabilizer is a protrusion extending from an upper surface of the contact holder, wherein the protrusion extends into an aperture in the cable tray.

17. The connector of claim 14, wherein the stabilizer comprises a first extension that extends from an upper surface of the intermediate component, such that when the intermediate component is positioned adjacent to an upper surface of the contact holder, the first extension of the stabilizer contacts the at least one engagement member of the cable tray to thereby support the engagement member relative to the top cap.

18. The connector of claim 13, wherein the contact holder comprises at least one aperture in the contact holder, wherein aperture is sized to receive the at least one engagement member of the cable tray, such that when the contact holder is placed adjacent to the upper surface of the cable tray, the at least one engagement member is positioned within the at least one aperture of the contact holder.

19. The connector of claim 18, wherein said stabilizer comprises a second extension that extends from a lower surface of the intermediate component, such that when the intermediate component is placed adjacent to the contact holder and the contact holder is placed adjacent to the upper surface of the cable tray, the stabilizer is positioned within the at least one aperture of the contact holder.

* * * * *